United States Patent [19]
Kamio et al.

[11] Patent Number: 6,154,265
[45] Date of Patent: Nov. 28, 2000

[54] LIQUID CRYSTAL DEVICE AND PRODUCTION PROCESS THEREOF

[75] Inventors: Masaru Kamio, Sagamihara; Hisanori Tsuda, Atsugi; Akira Tsuboyama, Sagamihara; Hiroyuki Tokunaga, Fujisawa; Yutaka Inaba, Hino; Hideaki Takao; Haruo Tomono, both of Machida; Koichi Sato, Atsugi; Yuji Matsuo, Machida; Hidetoshi Tsuzuki, Yokohama, all of Japan

[73] Assignee: Canon Kabushiki Kaisha, Tokyo, Japan

[21] Appl. No.: 08/878,113

[22] Filed: Jun. 18, 1997

[30] Foreign Application Priority Data

Jun. 18, 1996 [JP] Japan .................................. 8-178437

[51] Int. Cl.$^7$ .......................... G02F 1/1333; C09K 19/52
[52] U.S. Cl. .......................... 349/122; 349/106; 349/138; 349/184; 252/299.01
[58] Field of Search .................. 252/299.01, 299.61, 252/299.62, 299.63; 349/122, 147, 148, 106, 138, 184

[56] References Cited

U.S. PATENT DOCUMENTS

| | | | |
|---|---|---|---|
| 5,082,587 | 1/1992 | Janulis | 252/299.01 |
| 5,101,289 | 3/1992 | Takao et al. | 359/68 |
| 5,150,241 | 9/1992 | Joffre et al. | 359/89 |
| 5,212,575 | 5/1993 | Kojima et al. | 349/147 |
| 5,467,209 | 11/1995 | Hotta et al. | 359/74 |
| 5,641,427 | 6/1997 | Shinjo et al. | 252/299.01 |
| 5,717,475 | 2/1998 | Kamio et al. | 349/147 |
| 5,909,266 | 6/1999 | Matsuo et al. | 349/287 |

FOREIGN PATENT DOCUMENTS

| | | |
|---|---|---|
| 228740 | 1/1990 | Japan . |
| 263019 | 3/1990 | Japan . |
| 2142753 | 5/1990 | Japan . |
| 619497 | 3/1994 | Japan . |
| 6347810 | 12/1994 | Japan . |
| 9322396 | 11/1993 | WIPO . |

OTHER PUBLICATIONS

Japanese Journal of Applied Physics, vol. 27, No. 5, May, 1988 pp. L729–L732.

Proceedings Of The Sixth International Conference On The Chemistry Of The Organic Solid State, vol. 93, Nos.1/4 (1983).

Primary Examiner—Shean C. Wu
Attorney, Agent, or Firm—Fitzpatrick, Cella, Harper, & Scinto

[57] ABSTRACT

A liquid crystal device is constituted by a pair of electrode plates and a liquid crystal composition disposed between the electrode plates. One of the electrode plates comprises a light-transmissive substrate, a plurality of electrodes including principal electrodes and auxiliary electrodes supported on the light-transmissive substrate, a plurality of color filters disposed on the light-transmissive substrate and an insulating layer disposed on the color filters. Each auxiliary electrode is disposed between an associated principal electrode and the light-transmissive substrate so as to be electrically connected with at least a part of the associated principal electrode, and the auxiliary electrodes are disposed with spacings therebetween which are filled with the color filters and the insulating layer. The liquid crystal composition comprises at least one species of a fluorine-containing mesomorphic compound comprising a fluorocarbon terminal portion and a hydrocarbon terminal portion, the terminal portions being connected with a central core, and having smectic mesophase or latent smectic mesophase. The combination of the above specific cell structure and the specific liquid crystal composition is effective in improving display qualities (e.g., brightness and contrast) while minimizing a voltage waveform deformation.

38 Claims, 19 Drawing Sheets

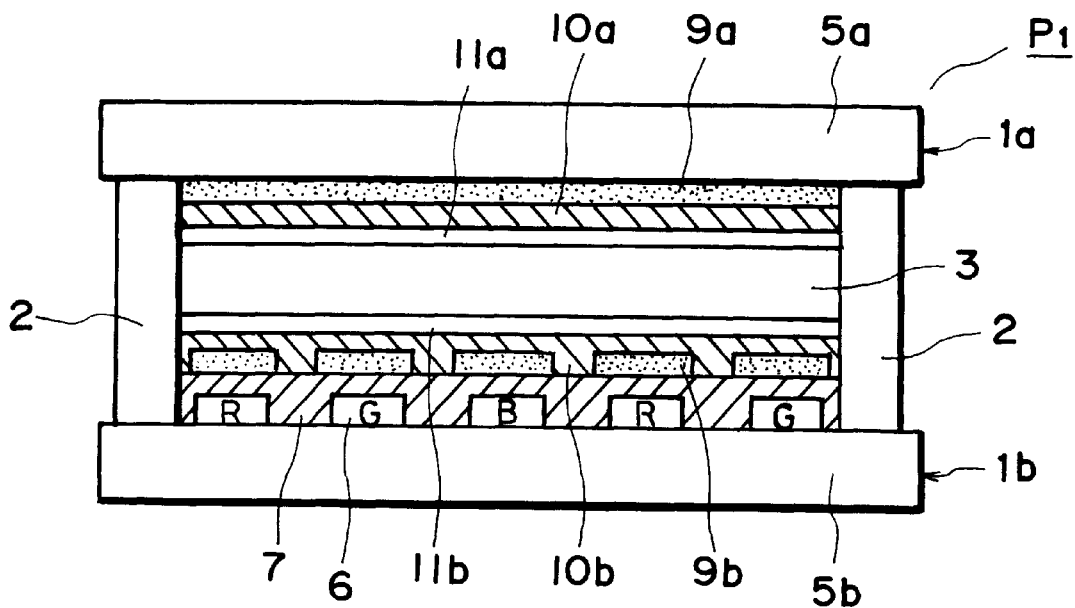
FIG. IA
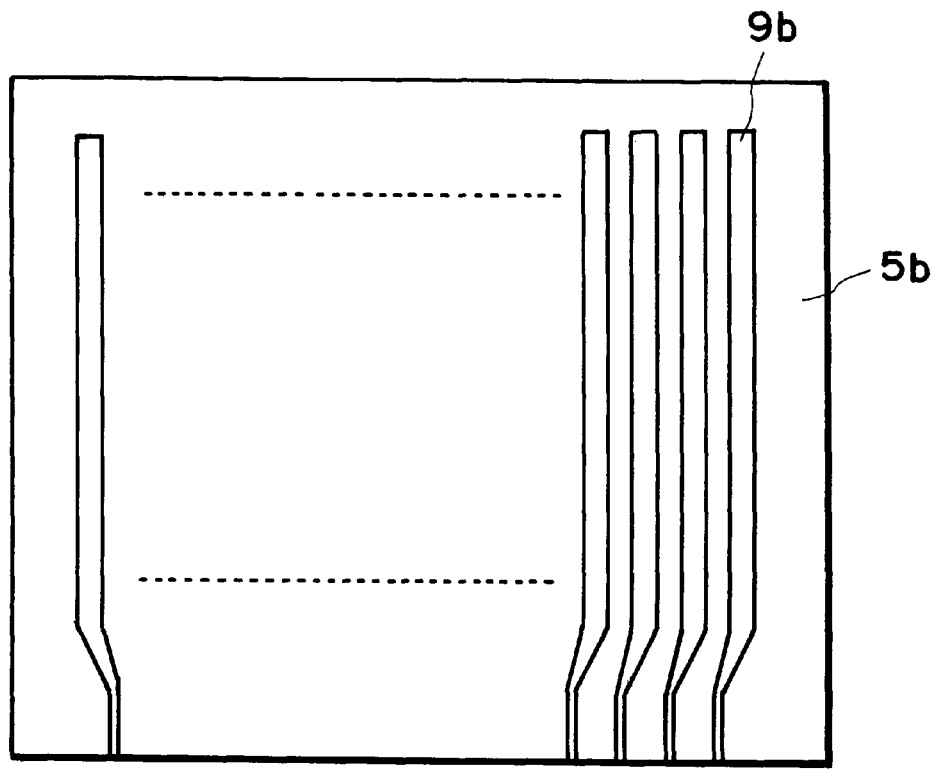
FIG. IB

LIQUID CRYSTAL DEVICE AND PRODUCTION PROCESS THEREOF

FIELD OF THE INVENTION AND RELATED ART

The present invention relates to a liquid crystal device used as various optical modulation devices on self emission-type devices, such as terminal displays for computers, various flat panel displays for word processors, typewriters and television receivers, view finders for video cameras, light valves for projectors, and light valves for liquid crystal printers. The present invention also relates to a process for producing the liquid crystal device.

The liquid crystal device (or panel) using a liquid crystal material has been used for displaying information in various fields.

FIG. 1A shows an embodiment of a light-transmission type (chiral smectic) liquid crystal panel P1.

Referring to FIG. 1A, the liquid crystal panel P1 includes a pair of electrode plates 1a and 1b disposed opposite to each other, and a chiral smectic liquid crystal 3 disposed between the electrode plates 1a and 1b and sealed with a sealing member 2.

The electrode plates 1b includes a glass substrate 5b on which a plurality of color filters 6 of red (R), green (G) and blue (B) are formed in a thickness of ca. 5000–20000 Å. The color filters are covered with a ca. 5000–20000 Å thick protective film 7, on which a plurality of ca. 500–1500 Å thick transparent electrodes 9b of ITO (indium tin oxide) are formed. The transparent electrodes 9b are patterned in a stripe form as shown in FIG. 1B. On the transparent electrodes 9b, a ca. 500–3000 Å thick insulating film 10b of, e.g., silicon oxide or titanium oxide, for preventing short-circuit is formed. On the insulating film 10b, an alignment film 11b of, e.g., a polyimide resin is formed.

The other electrode plate 1a includes a glass substrate 5a on which a plurality of transparent electrodes 9a are formed. The transparent electrodes 9a is coated with an insulating film 10a, which is coated with an alignment film 11a.

The chiral smectic liquid crystal 3 may generally comprise a liquid crystal assuming chiral smectic C phase (SmC*) or H phase (SmH*) and may preferably be a ferroelectric liquid crystal exhibiting ferroelectricity in such a chiral smectic phase. The ferroelectric liquid crystal shows in a bulk state such an alignment that long axes of liquid crystal molecules are twisted but such a twisting of long axes of liquid crystal molecules is unwound or loosened by providing a small cell thickness (e.g., 1–3 $\mu$m) to the liquid crystal panel P1 (N. A. Clark et al., MCLC, Vol. 94 (1983), pp. 213–233). It is also possible to use an anti-ferroelectric liquid crystal showing three stable states as the chiral smectic liquid crystal 3 (Chandani, Takezoe et al., Japanese Journal of Applied Physics, Vol. 27 (1988), pp. L729–L732).

The liquid crystal panel P1 is driven by applying a signal to the transparent electrodes 9a and 9b. In this instance, if the transparent electrodes per se have a low transmittance of light, a resultant contrast is lowered and a display quality is also deteriorated due to a recognizable state of the transparent electrodes.

In order to solve the above problems, the transparent electrodes 9a and 9b have been formed in a smaller thickness.

Further, the transparent electrodes 9a and 9b (of ITO) generally have a fairly high resistivity (sheet resistance= 20–400 ohm; volume resistivity (Rv)=200×10$^{-8}$–4000×10$^{-8}$ ohm·m) when compared with a metallic material (e.g., volume resistivity (Rv) of Al=ca. 3×10$^{-8}$ ohm·m), thus causing a problem of voltage waveform deformation (or distortion) due to electrical signal delay.

The liquid crystal panel is used by applying an electric field to a liquid crystal disposed between a pair of electrode plates thus being considered as an electric circuit providing a capacitive load. As a result, the voltage waveform distortion is liable to be caused in such a liquid crystal panel. Particularly, in the case of a liquid crystal panel P1 using a ferroelectric liquid crystal 3, a cell thickness thereof becomes small (1–2 $\mu$m), which is ⅓–⅕ of that of the conventional TN (twisted nematic)-type liquid crystal device, so that the problem of the voltage waveform distortion is noticeable.

In recent years, a liquid crystal panel of a large picture area and a high resolution has been required, so that it has been necessary to solve the above-mentioned voltage waveform distortion.

Japanese Patent Publication (JP-B) 6-19497 discloses a liquid crystal panel wherein metal electrodes are formed on the (upper) surface (where the insulating films 10a and 10b and the alignment films 11a and 11b are disposed as shown in FIG. 1A) of associated transparent electrodes (9a and 9b in FIG. 1A) in order to solve the voltage waveform distortion.

However, such a liquid crystal panel, when thick metal electrodes are employed therein, is accompanied with problems such that an unevenness including a recess portion and a projection portion is caused at the surface of the alignment film (11a, 11b) due to the metal electrodes to provide an optical difference between the recess and projection portions, thus lowering a display quality and that rubbing treatment of the alignment film cannot be performed uniformly to cause alignment defects, thus also leading to a deterioration in display quality. As a result, the problem of the voltage waveform distortion has not sufficiently been solved.

According to our study, in order to solve the problem of the voltage waveform distortion, it is necessary to provide metal electrodes having a relatively large thickness.

More specifically, a relationship among a metal electrode thickness, a degree of voltage waveform distortion (degree of delay) and a drive frequency in a large-area (21 in. in diagonal) liquid crystal panel is summarized in the following table.

TABLE

| Ps of LC material | Thickness of metal layer (nm) | | | Degree of delay | Drive frequency (Hz) | | Temp. rise (° C.) | |
|---|---|---|---|---|---|---|---|---|
| | Al—Si—Cu | Cu | Mo | | One-terminal | Two-terminal | One-terminal | Two-terminal |
| 7 nc/cm$^2$ | (150)*230 | (84)*164 | 423 | 1 | 1.9 | 7.5 | 0.63 | 2.5 |
| | (268)*348 | (150)*230 | 887 | 0.56 | 4.4 | 17.7 | 1.5 | 5.9 |
| 100 nc/cm$^2$ | (150)*230 | (84)*164 | 423 | 1.83 | 1.0 | 4.1 | 0.4 | 1.55 |
| | (275)*355 | (154)*234 | 710 | 1 | 1.9 | 7.5 | 0.73 | 2.85 |
| | (549)*629 | (307)*387 | 1337 | 0.5 | 3.8 | 15 | 1.43 | 5.7 |

TABLE-continued

| Ps of LC material | Thickness of metal layer (nm) | | | Degree of delay | Drive frequency (Hz) | | Temp. rise (° C.) | |
|---|---|---|---|---|---|---|---|---|
| | Al—Si—Cu | Cu | Mo | | One-terminal | Two-terminal | One-terminal | Two-terminal |
| | (1098)* 1178 | (615)*695 | 2594 | 0.25 | 7.5 | 30 | 2.85 | 11.4 |
| | (2196)* 2276 | (1230)* 1310 | 5109 | 0.125 | 15 | 60 | 5.75 | 22.8 |
| | (4392)* 4472 | (2460)* 2540 | 10138 | 0.063 | 30 | 120 | 11.5 | 45.5 |

*Data in parentheses represent thicknesses of uncoated metal layers (Al—Si—Cu, alone, Cu alone), respectively.

In the above table, "One-terminal" with respect to the drive frequency and the temperature rise means that each metal electrode is connected to an electric source at one terminal and is supplied therefrom with a signal, and "Two-terminal" means that each metal electrode is connected to an electric source at two (both) terminals and is supplied therefrom with an identical signal.

With respect to a material for the metal electrodes, Al-Si-Cu alloy (Rv=4.0×10$^{-8}$ ohm·m), Cu (Rv=2.23×10$^{-8}$ ohm·m) and Mo (Rv=12.0×10$^{-8}$ ohm·m) are used. Each of the Al-Si-Cu alloy layer and the Cu layer is undercoated with a 30 nm-thick Mo layer and overcoated with a 50 nm-thick Mo layer, thus having a three-layer structure (e.g., Mo/Al-Si-Cu/Mo). With respect to a material for the liquid crystal, a liquid crystal having a spontaneous polarization (Ps) of 7 nC/cm$^2$ and a liquid crystal having a Ps of 100 nC/cm$^2$ are used.

A sample liquid crystal panel has 2048 scanning lines (electrodes) constituting one frame. The "drive frequency (Hz)" in the table means one-frame frequency (for scanning 2048 scanning lines). The liquid crystal panel includes a pair of glass substrates each provided with the metal electrodes described above and an alignment film ("LQ-1802", mfd. by Hitachi Kasei Kogyo K.K.) which has been subjected to rubbing so that the resultant rubbing treatment axes are directed in an identical direction. The cell thickness of the liquid crystal panel is set to ca. 1 μm for the panel using the liquid crystal material having Ps=7 nC/cm$^2$ or ca. 2 μm for the panel using the liquid crystal material having Ps=100 nC/cm$^2$.

The "degree of delay" in the table is evaluated based on a time from voltage application until the voltage value change reaches 90% of the peak value. More specifically, the liquid crystal panel using the liquid crystal material having Ps=7 nC/cm$^2$ and a 230 nm-thick (in total) Al-Si-Cu alloy layer is taken as a reference sample showing a degree of delay of "1" in the above table.

In order to drive the liquid crystal panel (device) at high speed, the drive frequency may preferably be at least 15 Hz, thus requiring a decrease in degree of delay. More specifically, when the combination of the liquid crystal material (Ps=7 nC/cm$^2$) and the metal electrodes of Al-Si-Cu alloy is adopted, it is necessary to form the metal electrodes in a thickness of 348 nm and each connected with the electric source at two terminals as is understood from the table.

Further, in the case of using the liquid crystal material (Ps=100 nC/cm$^2$), in order to provide a drive frequency of at least 15 Hz, the metal electrodes of Al-Si-Cu alloy require a (total) thickness of 629 nm for the two-terminal connection and a thickness of 2276 nm for the one-terminal connection. Similarly, the metal electrodes of Cu require a thickness of 387 nm for the two-terminal connection and a thickness of 1310 nm for the one-terminal connection.

Generally, the two-terminal connection is effective in improving the drive frequency when compared with the one-terminal connection, but the one-terminal connection is preferred in respect of cost saving of ICs (electric source).

As described above, in order to prevent the voltage waveform delay, the thickness of the metal electrodes is generally required to be made thick.

A liquid crystal panel having solved the voltage waveform distortion while preventing a deterioration in display quality has been disclosed in Japanese Laid-Open Patent Application (JP-A) 2-63019 etc.

FIG. 2A is a schematic sectional view for illustrating such a liquid crystal panel.

Referring to FIG. 2A, a liquid crystal panel P2 includes a pair of electrode plates 20a and 20b applied to each other by using a sealing member (not shown) while leaving a cell gap, which is filled with a liquid crystal 3 together with spacer beads.

Each electrode plate 20a or 20b includes a glass substrate 5a or 5b on which a plurality of metal electrodes 21a or 21b are formed with spacings filled with an insulating film 22a or 22b so as to cover the metal electrodes 21a or 21b. The insulating film 22a or 22b coated with a plurality of transparent electrodes 9a or 9b each electrically connected with an associated metal electrode 21a or 21b. On the transparent electrodes 9a or 9b, an alignment film 11a or 11b is formed.

FIG. 2B shows an electrode plate for a color liquid crystal panel disclosed in JP-A 2-63019.

Referring to FIG. 2B, an electrode plate 20c has a structure identical to that of the electrode plate 20b except that a plurality of color filters 6 of three colors comprising red (R), green (G) and blue (B) are disposed between a glass substrate 5a and an insulating film 22 at spacings between metal electrodes 21b. In this case, the insulating film 22 also functions as a protective layer for protecting the color filters 6 from, e.g., heat generated during production steps.

In the above-described electrode plates 20a, 20b and 20c, the transparent electrodes 9a (9b) are electrically connected with the corresponding metal electrodes 21a (21b), respectively, via through-holes or elongated cut (exposed) portions (e.g., 23 shown in FIG. 2B). Such through-holes are formed through a photolithographic process including steps of exposure, development and etching. The insulating film 22 (22a, 22b) may be a photosensitive film or a film having no photosensitivity. Exposure to light is performed directly with respect to the former film or is performed with a photoresist applied to the surface of the latter film.

According to the above liquid crystal panel (as disclosed in JP-A 2-63019, the cell thickness is kept substantially uniform even if thicker metal electrodes 21a (21b) are formed, thus suppressing a lowering in display quality and solving the problem of the voltage waveform distortion.

Incidentally, when a photolithographic process is employed for producing a liquid crystal panel of a high resolution an a large panel size, the production process generally requires the use of a photomask and large-sized equipments or apparatus (e.g., those for aligning (positioning) a photomask, exposure to light, development and etching) which are generally expensive, thus resulting in high production costs. The production process also involves a problem such that it is difficult to effect an accurate positioning at the time of light-exposure, thus leading to a lowering in production yield.

In production of the above-described liquid crystal panel P2 (JP-A 2-63019), it is necessary to perform a photolithographic process for forming the through-holes 23 in addition to an ordinary production process, so that production steps are complicated that much, thus increasing production costs and also causing a lowering in production yield. Particularly, in the above production process, the lowering in production yield is noticeable since the through-holes 23 are required to be accurately formed at positions corresponding to the metal electrodes 21a (21b) to make their positioning difficult.

In order to alleviate the lowering in production yield, it may be possible to allow some latitude in positioning by making the width of the through-holes 23 narrow. In such a case, however, the metal electrodes 21a (21b) are not readily electrically connected with the transparent electrodes 9a (9b) due to the narrow through-holes 23, thus being liable to cause a deterioration in display quality.

JP-A 6-347810 discloses a liquid crystal panel using metal electrodes electrically connected with transparent electrodes without using through-holes as mentioned above. However, the problem of voltage waveform distortion has not been solved sufficiently even in such a liquid crystal panel.

SUMMARY OF THE INVENTION

In view of the above-mentioned problems, an object of the present invention is to provide a liquid crystal device having solved a problem of voltage waveform distortion by ensuring a sufficient electrical conduction between metal electrodes and associated transparent electrodes.

Another object of the present invention is to provide a liquid crystal device excellent in display quality free from alignment defects.

A still another object of the present invention is to provide a liquid crystal device improved in a contrast in a display area.

A further object of the present invention is to provide a process for producing the liquid crystal device described above capable of reducing production costs through simplified steps while preventing a lowering in production yield.

A still further object of the present invention is to provide a process for producing a liquid crystal device capable of preventing a change in color of color filters.

According to the present invention, there is provided a liquid crystal device, comprising: a pair of electrode plates and a liquid crystal composition disposed between the electrode plates, wherein one of the electrode plates comprises a light-transmissive substrate, a plurality of electrodes including principal electrodes and auxiliary electrodes supported on the light-transmissive substrate, a plurality of color filters disposed on the light-transmissive substrate and an insulating layer disposed on the color filters; each auxiliary electrode being disposed between an associated principal electrode and the light-transmissive substrate so as to be electrically connected with at least a part of the associated principal electrode, and the auxiliary electrodes being disposed with spacings therebetween which are filled with the color filters and the insulating layer, and the liquid crystal composition comprises at least one species of a fluorine-containing mesomorphic compound comprising a fluorocarbon terminal portion and a hydrocarbon terminal portion, the terminal portions being connected with a central core, and having smectic mesophase or latent smectic mesophase.

According to the present invention, there is also provided a liquid crystal device, comprising: a pair of electrode plates and a liquid crystal composition disposed between the electrode plates, wherein one of the electrode plates comprises a light-transmissive substrate, a plurality of color filters disposed on the light-transmissive substrate, a protective layer disposed on the color filters, a plurality of electrodes including principal electrodes and auxiliary electrodes supported on the protective layer, and an insulating layer disposed on the protective layer; each auxiliary electrode being disposed between an associated principal electrode and the protective layer so as to be electrically connected with at least a part of the associated principal electrode, and the auxiliary electrodes being disposed with spacings therebetween which are filled with the color filters and the insulating layer, and the liquid crystal composition comprises at least one species of a fluorine-containing mesomorphic compound comprising a fluorocarbon terminal portion and a hydrocarbon terminal portion, the terminal portions being connected with a central core, and having smectic mesophase or latent smectic mesophase.

According to the present invention, there is further provided a process for producing a liquid crystal device including a pair of electrode plates and a liquid crystal disposed between the electrode plates, the process including steps for producing one of the electrode plates, the steps comprising:

forming a plurality of auxiliary electrodes on a light-transmissive substrate, disposing a layer of an ink-receptive resin on the light-transmissive substrate and auxiliary electrodes, coloring the ink-receptive resin layer by means of an ink jet apparatus, removing the ink-receptive resin remaining on the auxiliary electrodes so as to leave color filters comprising the colored ink-receptive resin layer at spacings between the auxiliary electrodes, forming an insulating layer on the color filters, and forming a plurality of principal electrodes on the insulating layer and the auxiliary electrodes so that at least a part of each principal electrode is electrically connected with an associated auxiliary electrode.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1A is a schematic sectional view of an embodiment of a conventional color liquid crystal panel, and FIG. 1B is a schematic plan view of an electrode plate used in the panel.

DESCRIPTION OF THE PREFERRED EMBODIMENTS

Figure 2A:
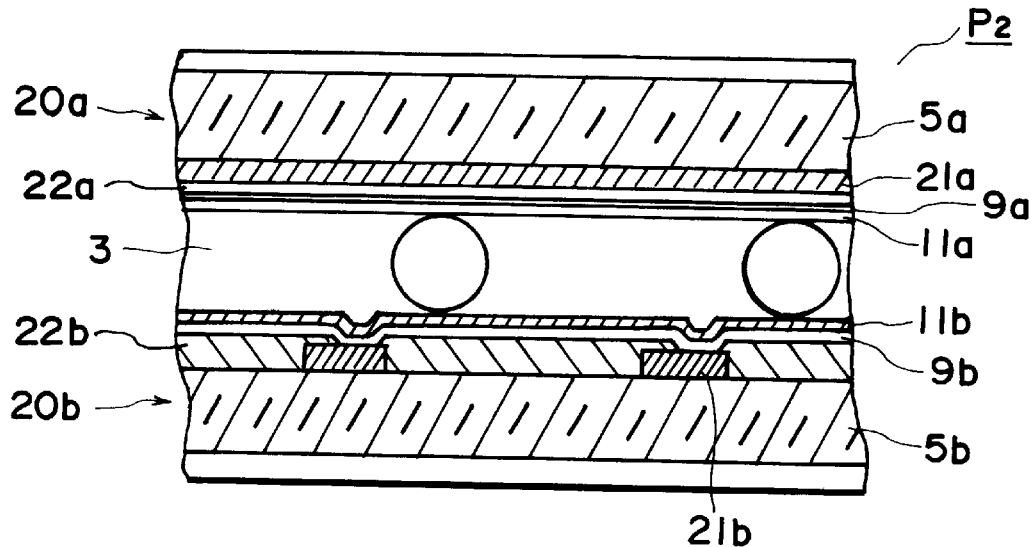
FIG. 2A is a schematic sectional view of another embodiment of a conventional liquid crystal panel.
Figure 2B:
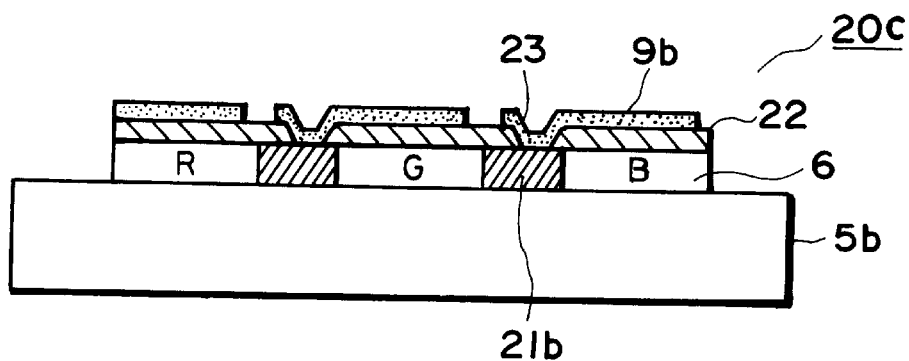
FIG. 2B is a schematic sectional view of an electrode plate for use in a conventional color liquid crystal panel.

Hereinbelow, preferred embodiments of the present invention will be described specifically with reference to FIGS. 3–21. In the following, identical reference numerals are used for describing identical structural members or materials, respectively.

First Embodiment

A first embodiment of the present invention will be explained with reference to FIGS. 3–5.

A liquid crystal panel P3 according to this embodiment, as shown in FIG. 4, includes a pair of electrode plates 30a and 30b disposed substantially parallel to each other.

The (lower) electrode plate 30b includes a light-transmissive substrate 31b on which a plurality of auxiliary electrodes 32b are formed with prescribed spacings. At the spacings, color filters 33 of red (R), green (G) and blue (B) are partially formed on the light-transmissive substrate 31b while leaving recesses together with the auxiliary electrodes 32b. The recesses are filled with an insulating layer 35b of a polymeric material (curable resin) so as to provide a substantially flat (smooth) surface together with the auxiliary electrodes 32b (e.g., a difference in height therebetween (35b and 32b) of at most 200 nm and a surface unevenness of the polymeric material layer 35b within ±30 nm). On the flat surface, a plurality of principal electrodes 36b are formed so as to come into intimate contact with the associated auxiliary electrodes 32b, respectively, thus ensuring a good electrical connection therebetween. On the principal electrodes 36b, an insulating film 10b and an alignment film 11b are formed in succession.

In the present invention, the polymeric material layer 35b is required not to be at least protruded from the level of the auxiliary electrodes 32b. In other words, the auxiliary electrodes 32b provide a flat surface in combination with the polymeric material layer 35b or are somewhat protruded from the level of the polymeric material layer 35b, whereby the formation of through-holes (as described in the conventional liquid crystal panel) in the polymeric material layer 35b (after curing) becomes unnecessary while stably ensuring an electrical connection between the principal electrodes 36b and the auxiliary electrodes 32b.

The other (upper) electrode plate 30a has a similar layer structure as in the above-mentioned electrode plate 30b except for omitting the color filters 33. Specifically, the electrode plate 31a includes a light-transmissive substrate 31a, a plurality of auxiliary electrodes 32a, a polymeric material layer 35a, a plurality of principal electrodes 36a, an insulating film 10a and an alignment film 11a.

The light-transmissive substrate 31a (31b) may comprise any sheet or plate of glass or plastic generally used as a substrate for a liquid crystal device if it has a sufficient light-transmissive property and smooth surface. Specifically, the glass sheet (plate) may preferably be used in view of its excellent light-transmissive property and a processability for providing a smooth surface. Examples of such a glass sheet may include a ca. 0.7–1.1 mm thick sheet of a blue plate glass which has been double side-polished to improve parallelism.

The auxiliary electrodes 32a (32b) may comprise any material if it has a low resistivity and an excellent adhesiveness with the light-transmissive substrate 31a (31b) and is readily formed in a thickness of at least 0.3 μm.

Examples of the material for the auxiliary electrodes 32a (32b) may include a metallic material or a resin containing electroconductive fine particles dispersed therein. The metallic material may include aluminum, chromium, molybdenum, tantalum, nickel, copper and silver. The auxiliary electrodes 32a (32b) may be formed in an appropriate thickness (height) depending on the material used and electrical resistance (resistivity). In a preferred embodiment, the auxiliary electrodes 32a (32b) may have a thickness of ca. 0.3–3 μm. Further, the auxiliary electrodes 32a (32b) may be formed in plural layers comprising different materials.

The polymeric material 35a (35b) may comprise an ultraviolet (UV)-curable resin (a resin cured by irradiation with UV light), a thermosetting resin, a room temperature setting (curing) resin, a reactive-type curing resin consisting of two liquid components, and other polymeric materials free from a resinous component. Of these materials, the UV-curable resin may preferably be used in view of its excellent molding properties.

The UV-curable resin may generally comprise a resin composition of acrylate-type or epoxy-type or ene-thiol type (having a double bond and an SH group) including a UV-curable monomer or oligomer and a photopolymerization initiator. Such a resin composition may preferably possesses resistances to heat, chemicals and washing(s) in view of production steps, such as a step of forming transparent principal electrodes and a step of baking an alignment film. More specifically, the resin composition may, e.g., include one comprising a reactive oligomer, as a main component, into which a heat-resistant molecular structure is introduced and one improved in crosslink density by using a polyfunctional monomer.

The principal electrodes 36a (36b) may preferably be transparent electrodes of, e.g., indium tin oxide (ITO).

The liquid crystal composition (the liquid crystal 3 shown in FIG. 1) used in the present invention may desirably contain a fluorine-containing mesomorphic compound which preferably has a structure including a fluorocarbon terminal portion and a hydrocarbon terminal portion connected by a central core and has smectic phase or latent smectic phase. The term "latent smectic phase" refers to a property of a compound concerned that the compound alone does not exhibit smectic phase but can be a component compatibly contained in smectic phase of a liquid crystal composition.

In a preferred class of the fluorine-containing mesomorphic compound, the fluorocarbon terminal portion may preferably be:

a group represented by the formula —$D^1$—$C_{xa}F_{2xa}$—X, where xa is 1–20; X is —H or —F; —$D^1$— is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO—; where ra and rb are independently 1–20; and pa is 0–4; or a group represented by —$D^2$—$(C_{xb}F_{2xb}$—O$)_{za}$—$C_{ya}F_{2ya+1}$, wherein xb is 1–10 independently for each $(C_{xb}F_{2xb}$—O); ya is 1–10; za is 1–10; —$D^2$— is —CO—O—$C_{rc}H_{2rc}$, —O—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N$(C_{pb}H_{2pb+1})$—$SO_2$—, —$C_{rc}H_{2rc}$—N$(C_{pb}H_{2pb+1})$—CO—, or a covalent bond, where rc and rd are independently 1–20; sa is independently 1–10 for each $(C_{sa}H_{2sa}$—O); ta is 1–6; and pb is 0–4.

In the fluorine-containing mesomorphic used in the present invention, the mesomorphic compound may preferably have a central core comprising at least two rings independently selected from aromatic ring, heteroaromatic ring, cycloaliphatic ring, or substituted aromatic ring, substituted heteroaromatic ring, and substituted cycloaliphatic ring, which may be connected one with another by a covalent bond or by groups selected from 'COO—, —COS—, —HC=N—, —COSe—. Rings may be fused or non-fused. Heteroatoms within the heteroaromatic ring comprise at least one atom selected from N, O or S. Non-adjacent methylene groups in cycloaliphatic rings may be substituted by O atom. The central core may preferably comprise a benzene ring and a pyrimidine ring.

It is particularly preferred to use a fluorine-containing mesomorphic compound of the following general formula (I) or (II):

Formula (I):

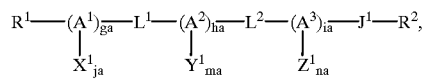

wherein $A^1$, $A^2$ and $A^3$ are each independently

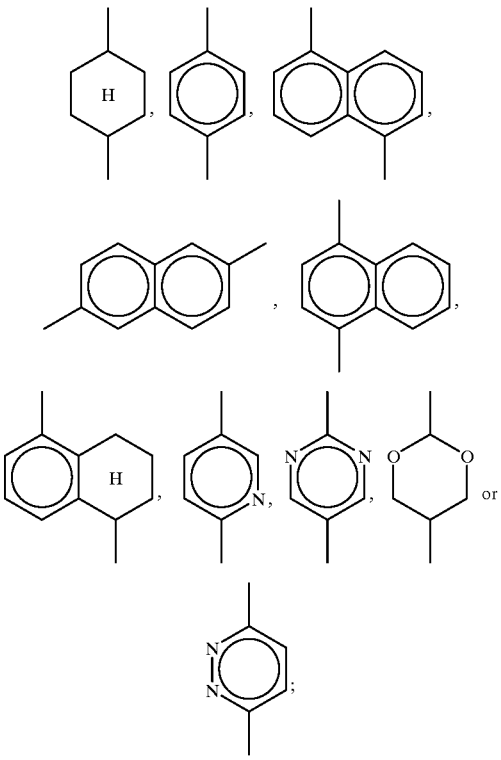

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C—C—, —CH=N—, —N=CH—, —$CH_2$—O—, —O—$CH_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —$OCH_3$, —$CH_3$, —CN or —$NO_2$;

each ja, ma and na are independently an integer of 0–4;

$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO—; where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{2qa}$—$R^3$, —CO—O—$C_{qa}H_{2qa}$—$R^3$, or —O—CO—$C_{qa}H_{2qa}$—$R^3$ which may be either straight chain or branched; where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;

$R^2$ is $C_{xa}F_{2xa}$—X, where X is —H or —F, xa is an integer of 1–20.

Formula (II):

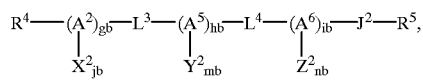

wherein $A^4$, $A^5$ and $A^6$ are each independently

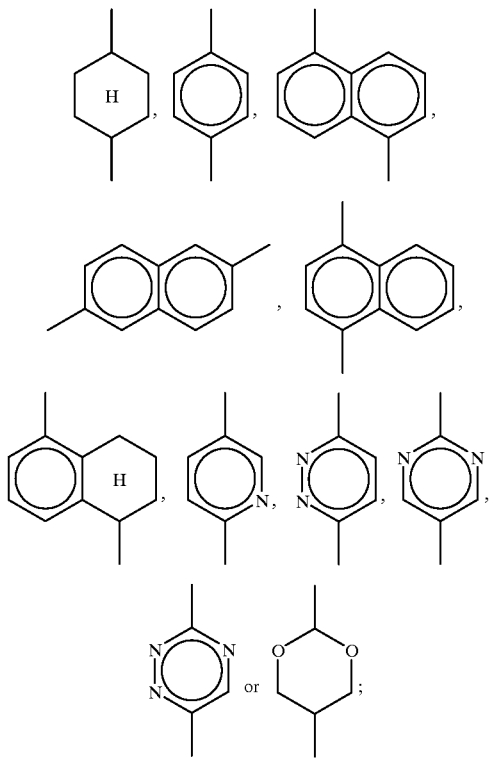

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—$C_{rc}H_{2rc}$—, —O—$C_{rc}H_{2rc}$—, —$C_{rc}H_{2rc}$—, —O—($C_{sa}H_{2sa}$—O)$_{ta}$—$C_{rd}H_{2rd}$—, —O—SO$_2$—, —SO$_2$—, —SO$_2$—$C_{rc}H_{2rc}$, —$C_{rc}H_{2rc}$—N($C_{pb}H_{2pb+1}$)—SO$_2$— or —$C_{rc}H_{2rc}$—N($C_{pb}H_{2pb+1}$)—CO—; rc and rd are independently 1–20; sa is independently 1–10 for each ($C_{sa}H_{2sa}$—O) ta is 1–6; pb is 0–4;

$R^4$ is —O—($C_{qc}H_{2qc}$—O)$_{wa}$—$C_{qd}H_{2qd+1}$, —($C_{qc}H_{2qc}$—O)$_{wa}$—$C_{qd}H_{2qd+1}$, —$C_{qc}H_{2qc}$—$R^6$, —O—$C_{qc}H_{2qc}$—$R^6$, —CO—O—$C_{qc}H_{2qc}$—$R^6$, or O—CO—$C_{qc}H_{2qc}$—$R^6$ which may be either straight chain or branched; $R^6$ is —O—CO—$C_{qd}H_{2qd+1}$; —CO—O—$C_{qd}H_{2qd+1}$, —Cl, —F, —CF$_3$, —NO$_2$, —CN or —H; qc and qd are independently an integer of 1–20; wa is an integer of 1–10;

$R^5$ is ($C_{xb}F_{2xb}$—O)$_{za}$—$C_{ya}F_{2ya+1}$, wherein xb is independently 1–10 for each ($C_{xb}F_{2xb}$—O); ya is 1–10; and za is 1–10.

The fluorine-containing mesomorphic compound represented by the formula (I) may be synthesized through processes similar to those descried in JP-A (Kokai) 2-142753 and U.S. Pat. No. 5,082,587. Specific examples of such a mesomorphic compound of the formula (I) may include those (Example Compound Nos. I-1 to I-103) shown below.

I-1
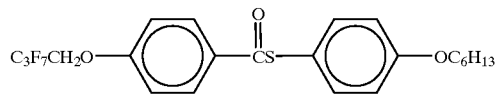

I-2
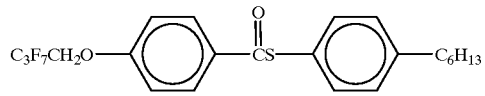

I-3
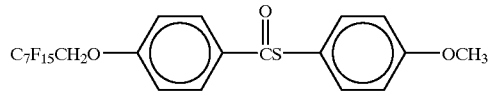

I-4
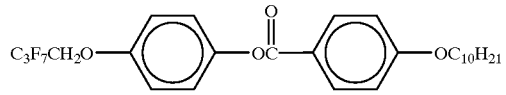

I-5
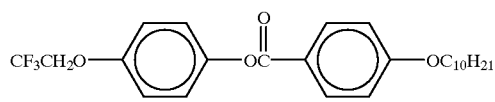
I-6
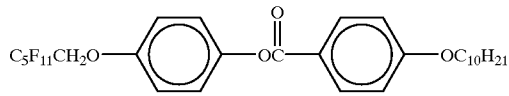
I-7
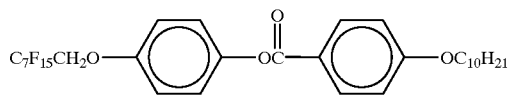
I-8
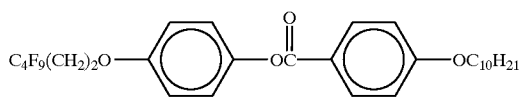
I-9
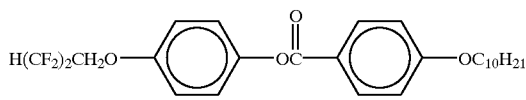
I-10
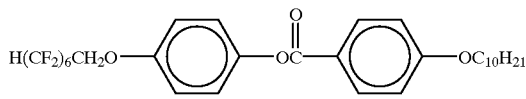
I-11
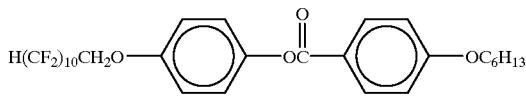
I-12
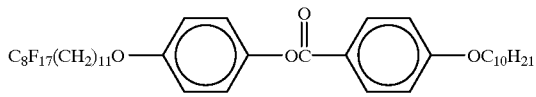
I-13
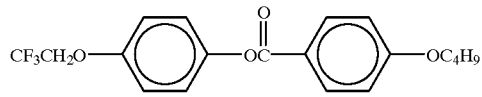
I-14
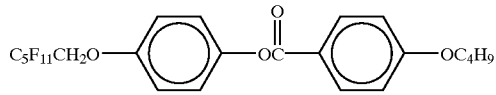
I-15
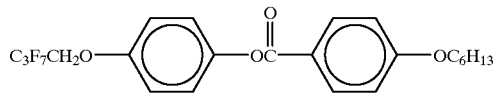
I-16
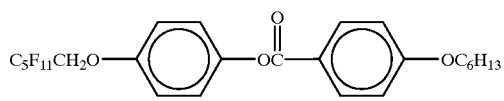
I-17
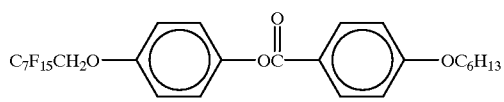

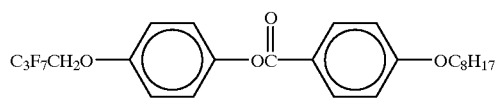
I-18
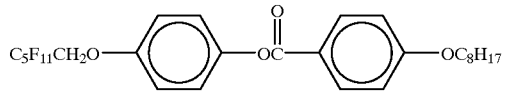
I-19
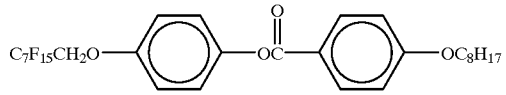
I-20
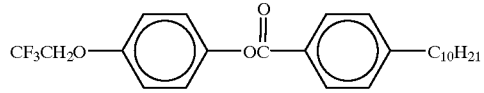
I-21
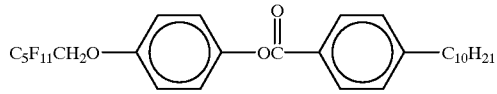
I-22
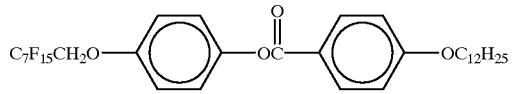
I-23
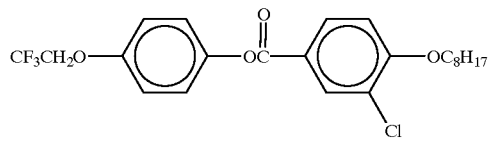
I-24
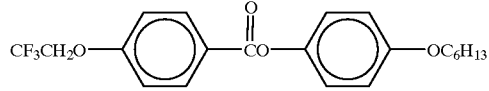
I-25
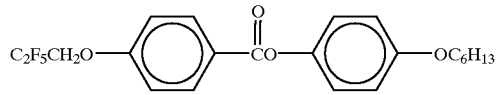
I-26
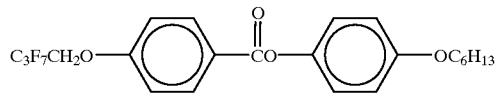
I-27
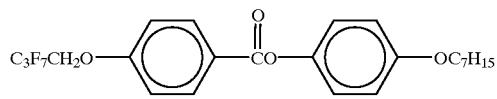
I-28
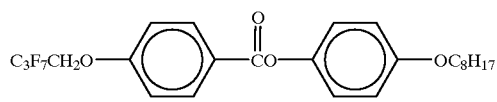
I-29
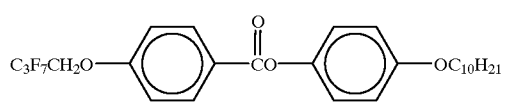
I-30

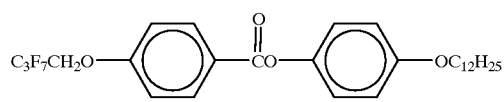 I-31
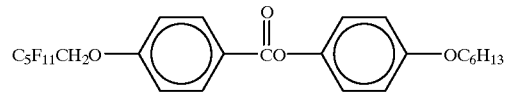 I-32
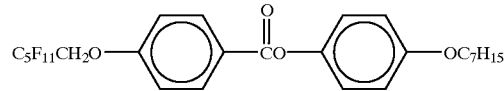 I-33
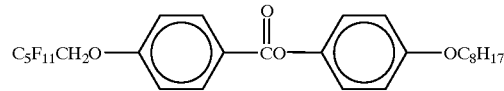 I-34
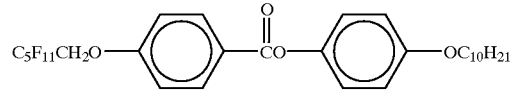 I-35
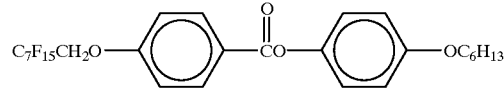 I-36
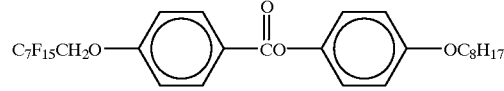 I-37
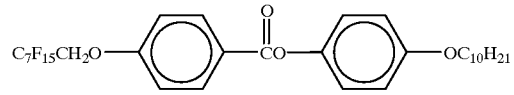 I-38
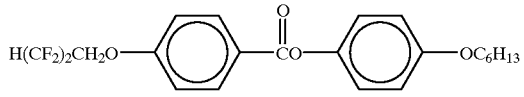 I-39
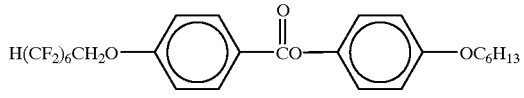 I-40
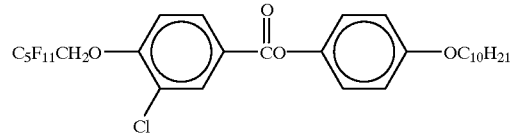 I-41
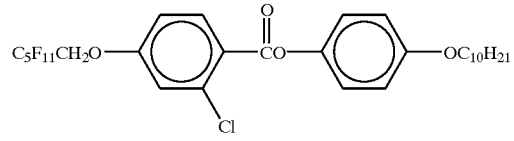 I-42

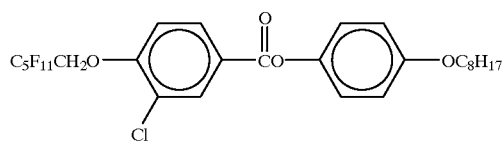
I-43
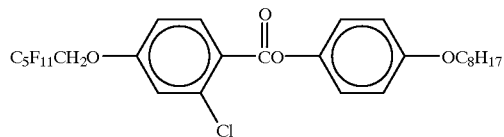
I-44
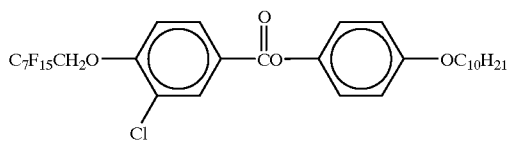
I-45
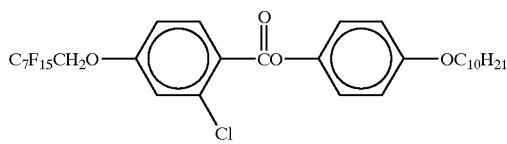
I-46
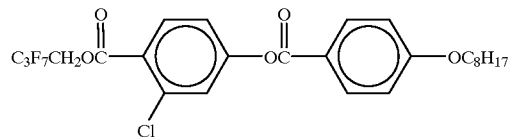
I-47
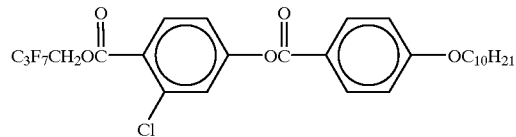
I-48
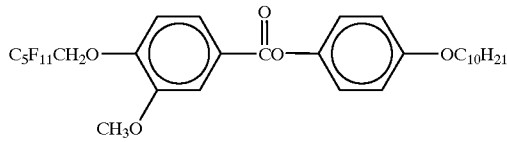
I-49
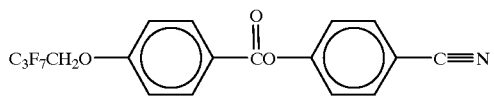
I-50
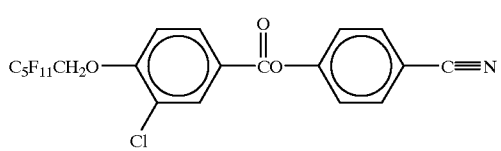
I-51
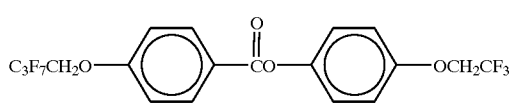
I-52
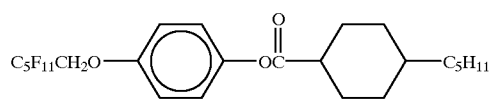
I-53

-continued
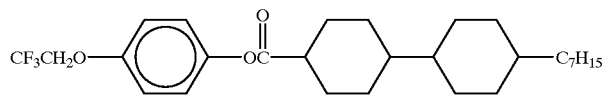
I-54
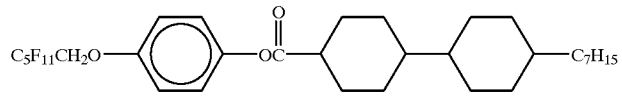
I-55
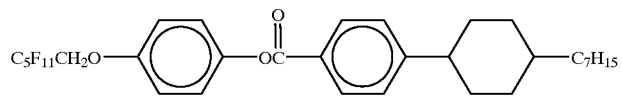
I-56
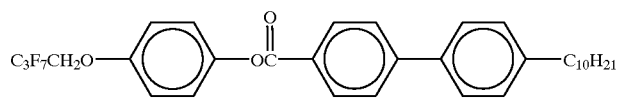
I-57
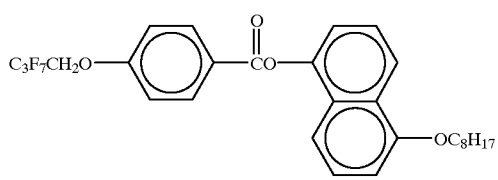
I-58
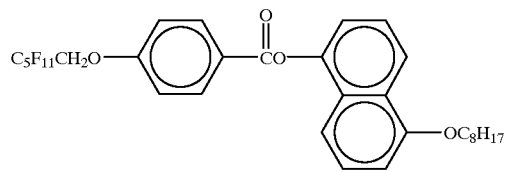
I-59
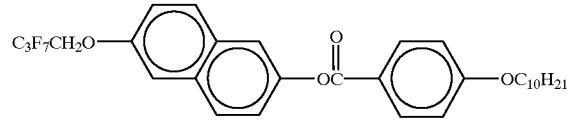
I-60
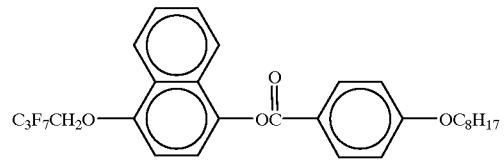
I-61
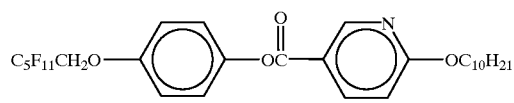
I-62
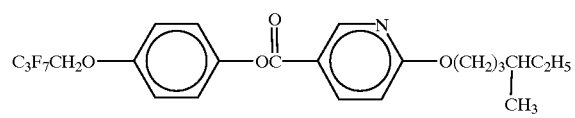
I-63
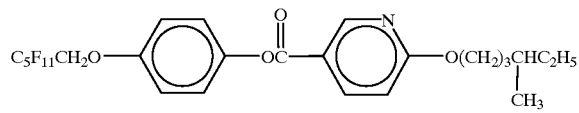
I-64

-continued
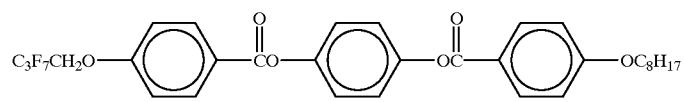
I-65
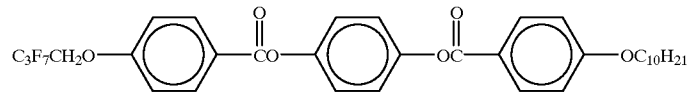
I-66
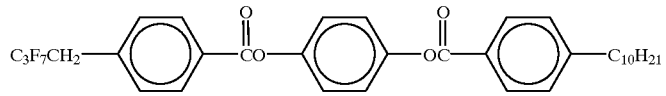
I-67
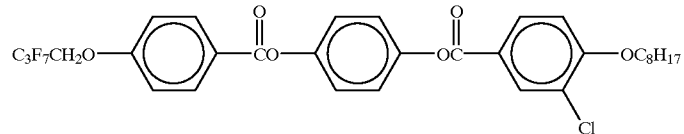
I-68
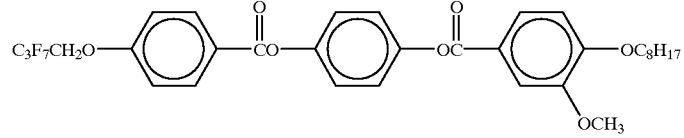
I-69
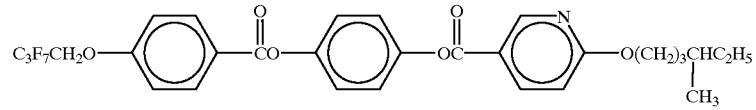
I-70
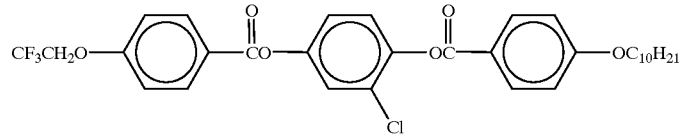
I-71
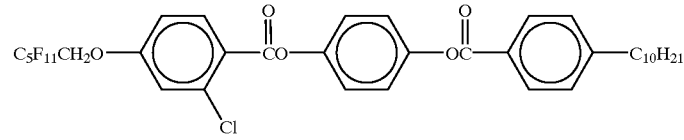
I-72
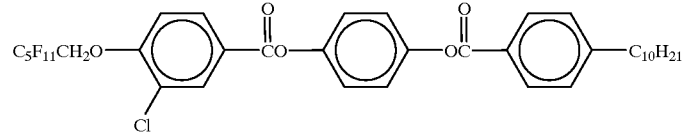
I-73
I-74
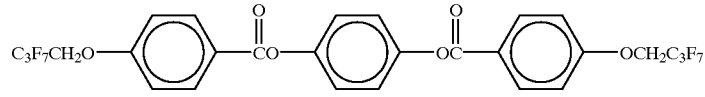
I-75

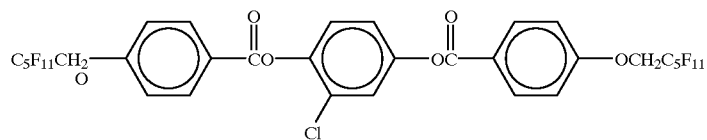
I-76
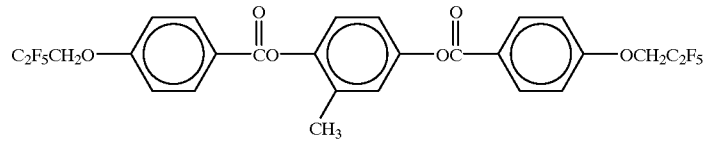
I-77
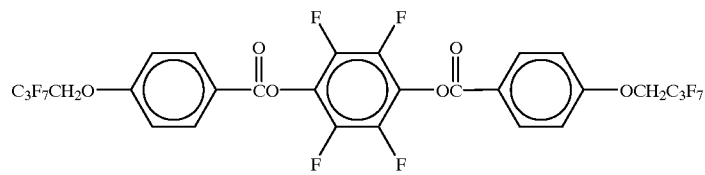
I-78
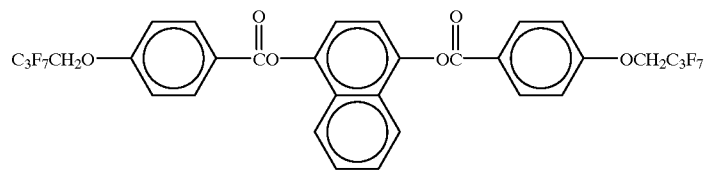
I-79
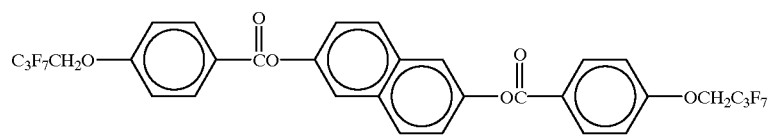
I-80
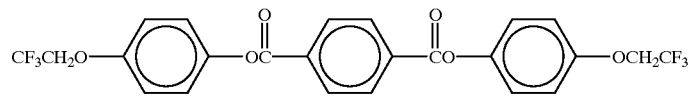
I-81
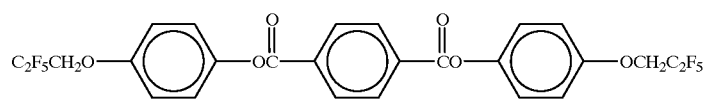
I-82
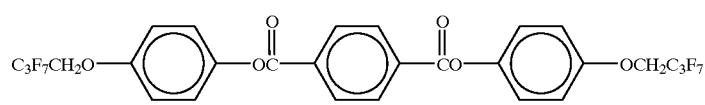
I-83
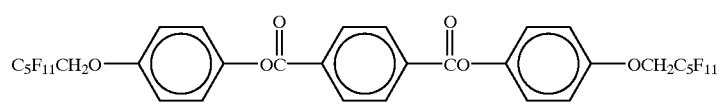
I-84
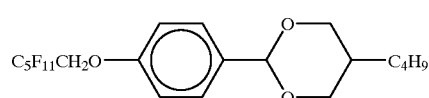
I-85
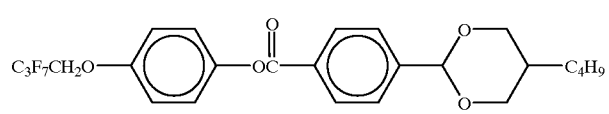
I-86

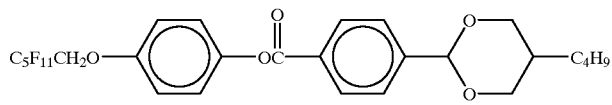
I-87
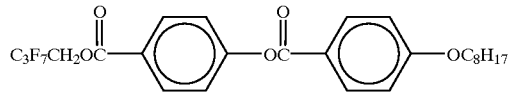
I-88
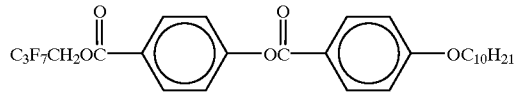
I-89
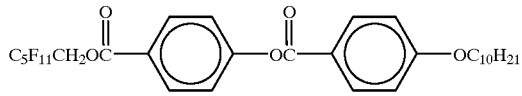
I-90
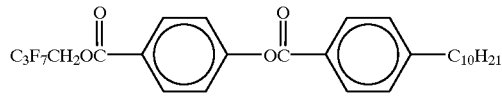
I-91
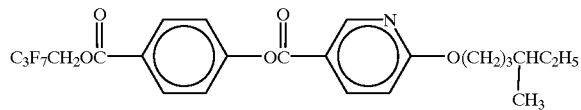
I-92
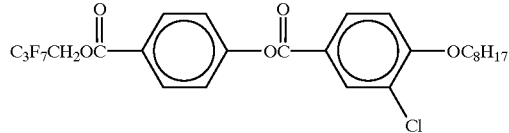
I-93
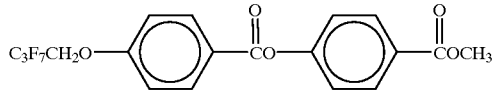
I-94
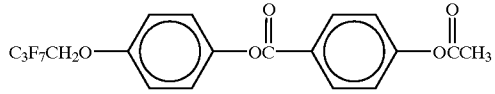
I-95
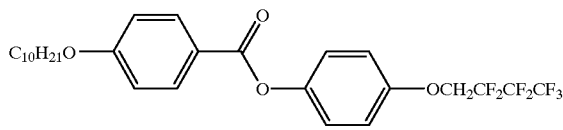
I-96
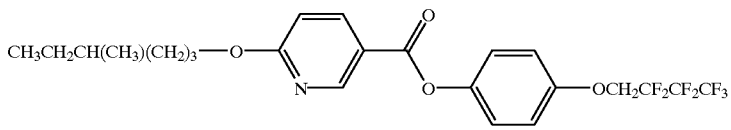
I-97
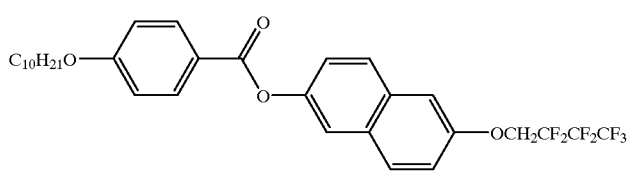
I-98

-continued
I-99
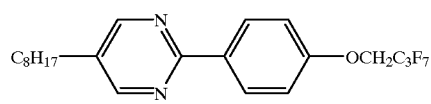
I-100
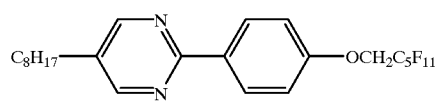
I-101
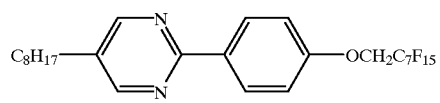
I-102
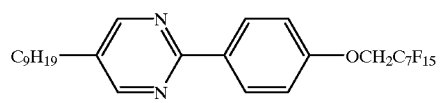
I-103
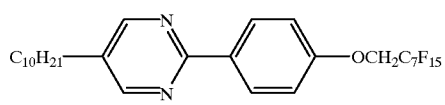
The fluorine-containing mesomorphic compound represented by the formula (II) may be synthesized through processes similar to those descried in JP-A (Kohyo) 7-506368 and WO93/22396. Specific examples of such a mesomorphic compound of the formula (II) may include those (Example Compound Nos. II-1 to II-45) shown below.
II-1
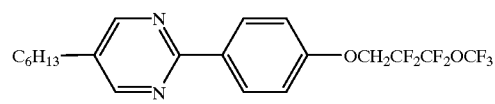
II-2
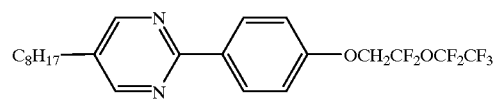
II-3
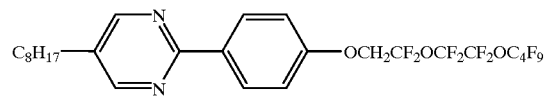
II-4
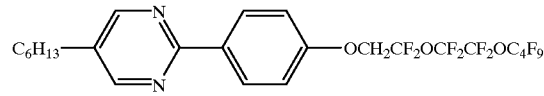
II-5
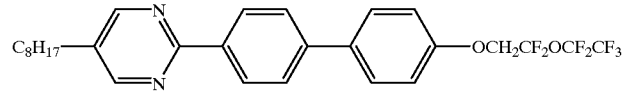
II-6
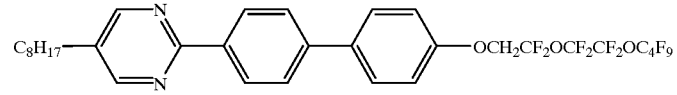

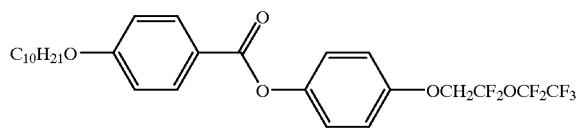
II-7
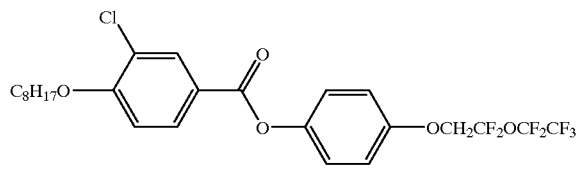
II-8
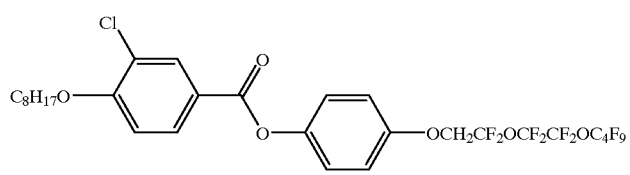
II-9
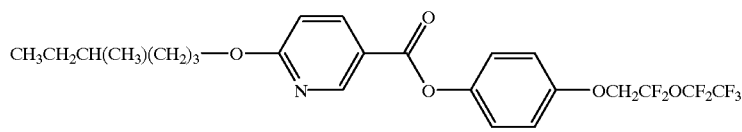
II-10
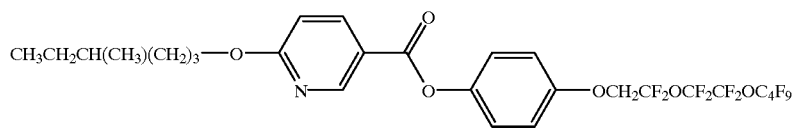
II-11
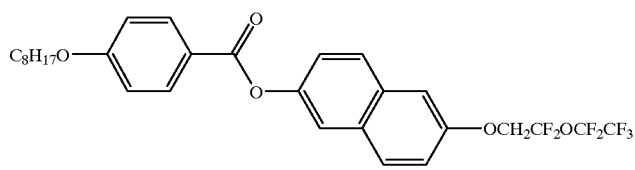
II-12
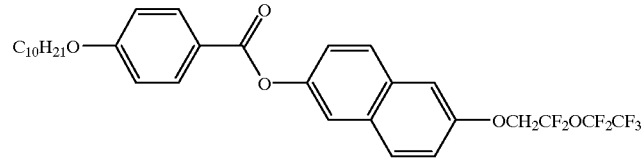
II-13
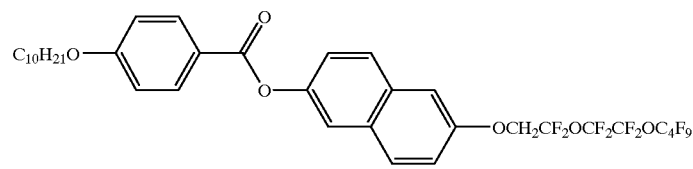
II-14
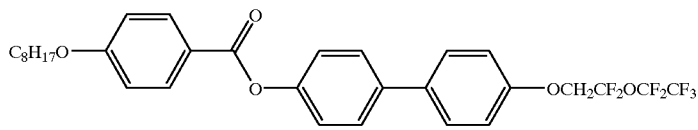
II-15

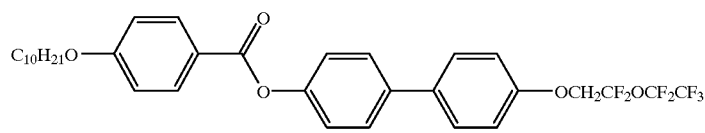
II-16
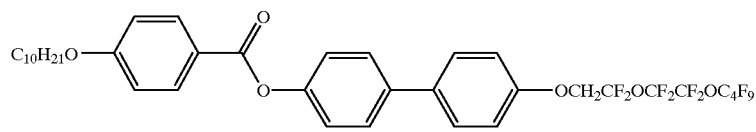
II-17
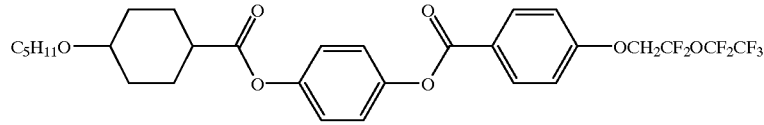
II-18
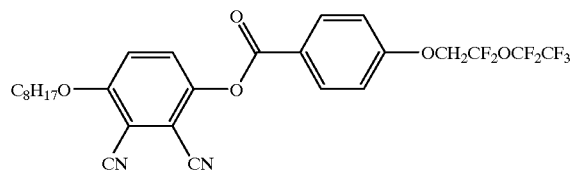
II-19
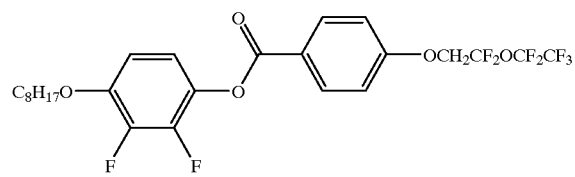
II-20
II-21
II-22
II-23
II-24
II-25
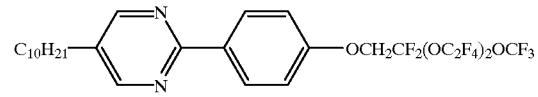
II-26

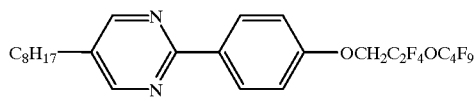
II-27
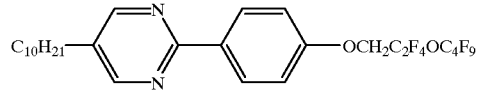
II-28
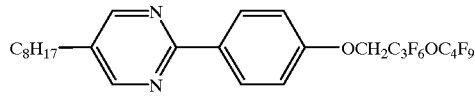
II-29
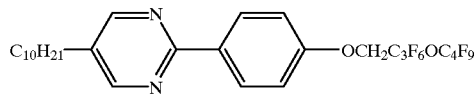
II-30
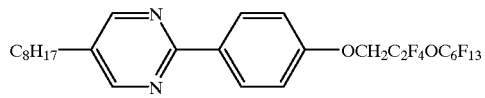
II-31
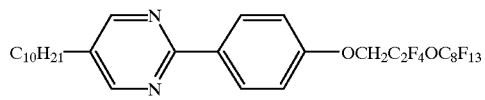
II-32
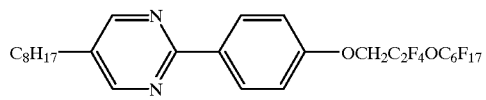
II-33
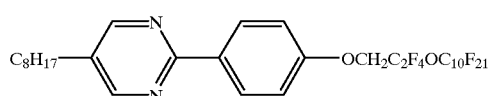
II-34
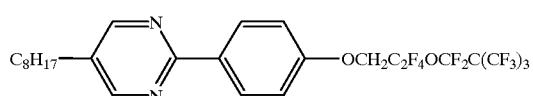
II-35
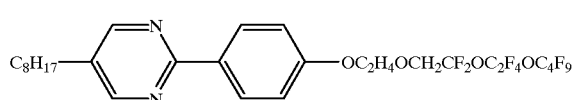
II-36
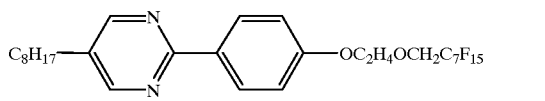
II-37
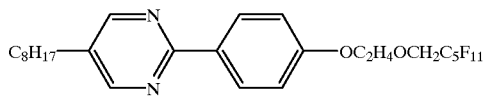
II-38
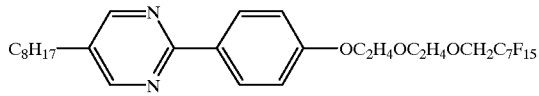
II-39

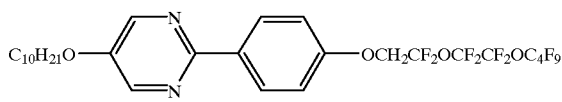

II-40

II-41

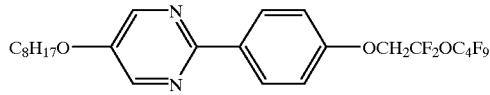

II-42

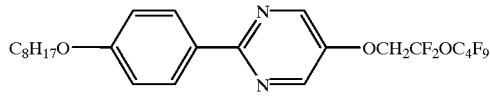

II-43

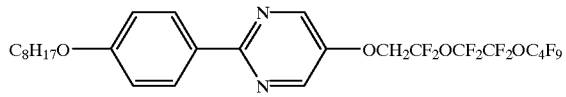

II-44

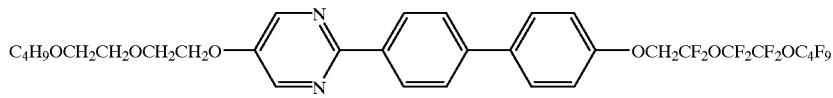

II-45

The alignment control layer 11a (11b) may comprise films of an organic material and an inorganic material. Examples of such an organic material may include: polyimide, polypyrrole, polyvinyl alcohol, polyamide-imide, polyester-imide, polyparaxylylene, polyester, polycarbonate, polyvinyl acetal, polyvinyl chloride, polyamide, polystyrene, polyaniline, cellulosic resin, acrylic resin and melamine resin. The inorganic film may, e.g., be an SiO film formed by an oblique vapor deposition method or a film of polysiloxane.

At least one of the alignment control layers 11a and 11b may preferably be subjected to a uniaxial aligning treatment, such as rubbing. As a combination of the alignment control layers 11a and 11b; it is possible to employ a uniaxial aligning-treated film of, e.g., nylon or polyimide and a layer of, e.g., silane coupling agent, polyimide or polysiloxane, which has not been subjected to a uniaxial aligning treatment. In such a case, the resultant cell structure of the liquid crystal panel is suitable for uniformly aligning a chiral smectic liquid crystal composition comprising a liquid crystal material, having a bookshelf structure or a closer structure thereto, such as one containing at least one liquid crystal free from a cholesteric phase. Specifically, as the chiral smectic liquid crystal composition, the liquid crystal composition containing the fluorine-containing mesomorphic compound as described above may preferably be used.

As a material for the alignment film which has been subjected to the uniaxial aligning treatment, a uniaxial aligning-treated (particularly rubbing-treated) polyimide film obtained by applying and hot-baking a polyamic acid may preferably be used in view of ease of film formation and high alignment control ability. On the other hand, as a material for the alignment film not subjected to the uniaxial aligning treatment, a film capable of controlling a withstand voltage and a surface energy (tension), such as one containing two binders different in surface energy. One of the binders may include a material for preventing short-circuit such as ZnO, TaOx and $SiO_2$, and the other binder may include a material for controlling a surface energy, such as polysiloxane, a silane coupling agent, a surfactant and a fluorine-containing coupling agent.

Then, a production process of the liquid crystal panel of this (first) embodiment will be described with reference to FIGS. 4A–4F and FIGS. 5A–5F.

Figure 4A:
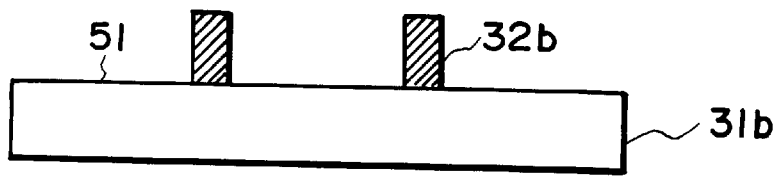
FIGS. 4A–4F and FIGS. 5A–5F are schematic sectional views for illustrating a series of steps involved in a process for producing the liquid crystal device of the present invention.
Figure 4B:
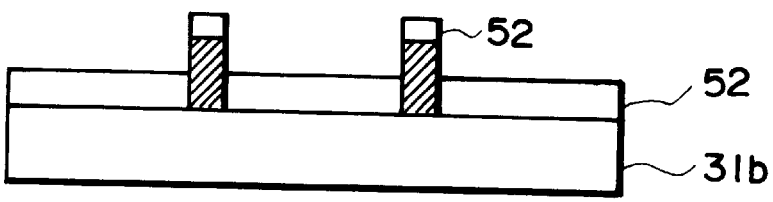

On the surface of a light-transmissive substrate 31b (hereinbelow called "wiring face"), a metal layer is formed by, e.g., vacuum vapor deposition or sputtering and coated with a photoresist (not shown), followed by light-exposure with a photomask, development and patterning thereof. Thereafter, the metal layer is patterned in a prescribed shape by etching treatment to form a plurality of auxiliary electrodes 32b on a wiring face 51 (FIG. 4A). Then, the photoresist (not shown) remaining on the auxiliary electrodes 32b is removed by using, e.g., a solvent therefor. On the wiring face 51 of the light-transmissive substrate 31b, an ink-receptive layer (ink rececetive resin) 52 are applied by a coating method, such as spin coating, roller coating, bar coating, spray coating, dipping printing, followed by drying thereof by heating or air blowing, as desired (FIG. 4B).

The ink-receptive layer 52 may comprise any resin if it has an ink-receptive property and is cured by, e.g., heat. Examples of such a resin may include a polymer obtained from hydroxyethyl acrylate or ethylene glycol diacrylate, acrylic resin, melamine resin, epoxy resin, silicone resin, and cellulose derivatives or modified cellulose, such as hydroxypropyl cellulose, hydroxyethyl cellulose, methyl cellulose and carboxymethyl cellulose, and copolymers thereof. These resins may be used singly or in combination of two or more species.

The above resins is used in a form of solution by using a hydrophilic solvent, such as water or alcohol, providing a relatively-high surface energy, singly or in combination. The resultant solution may preferably be applied by spin coating by decreasing a resin content to at most 50% thereby to lower the viscosity thereof.

Figure 4C:
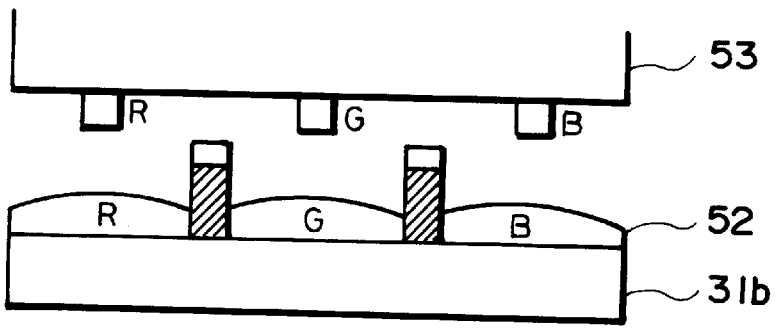
Figure 4D:
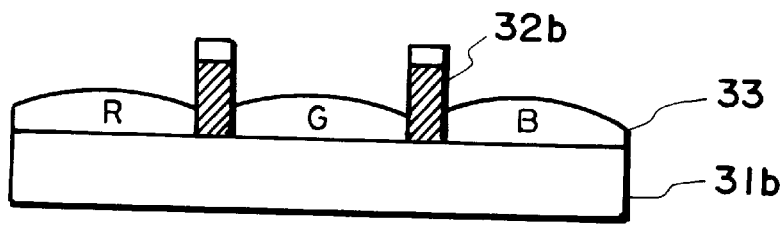

Then, the substrate 31b coated with the ink-receptive layer 52 is set in an ink jet image-forming apparatus (mfd. by Canon K.K.), followed by positioning of the ink-receptive layer 52 and a head 53 of the apparatus (FIG. 4C). Thereafter, respective color inks (R, G and B) are injected from the head 53 to the corresponding portions of the ink-receptive layer 52, followed by drying and post-baking to form color filters 33 of R, G and B (FIG. 4D). The ink jet apparatus may be one using an electothermal energy conversion element (device) (e.g., of a bubble jet-type) or one using a piezoelectric element (e.g., of a piezo jet-type). The colored area and pattern may appropriately be set.

Figure 4E:
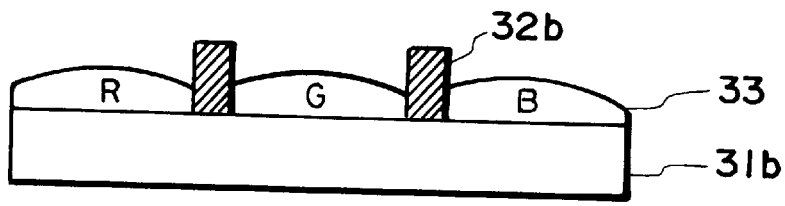

The ink-receptive layer 52 remaining on the auxiliary electrodes 32b (as shown in FIG. 4D) is then removed therefrom by polishing or machining to expose the surface of the auxiliary electrodes 32b (FIG. 4E). Such a polishing method may include a planar magnetic polishing, an EEM (Elastic Emission Machining), a local pitch polishing, lapping, a polishing (as disclosed in JP-A 2-28740), a tape polishing.

In this embodiment, the surface of the color filters 33 may be surface-treated with a silane coupling agent after the postbaking operation, as desired, so as to improve an adhesiveness between the color filters 33 and a polymeric material layer 35b formed later.

Figure 4F:
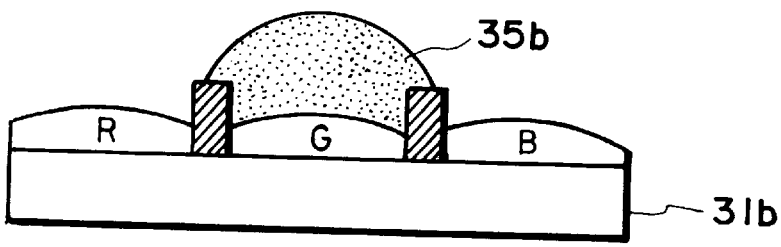

On the surface of the color filters 33 (and the auxiliary electrodes 32b), a polymeric material 35b is placed dropwise by a dispenser (not shown) (FIG. 4F).

Figure 5A:
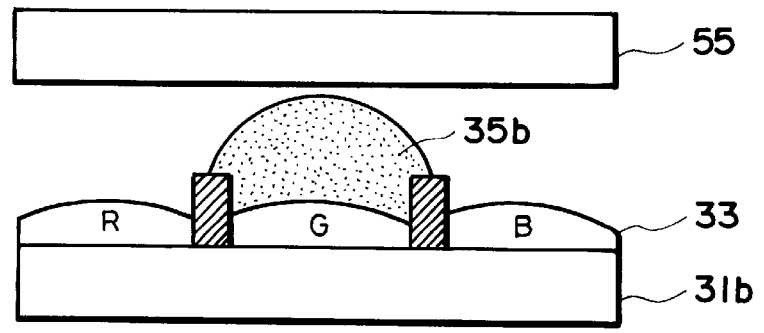
Figure 5B:
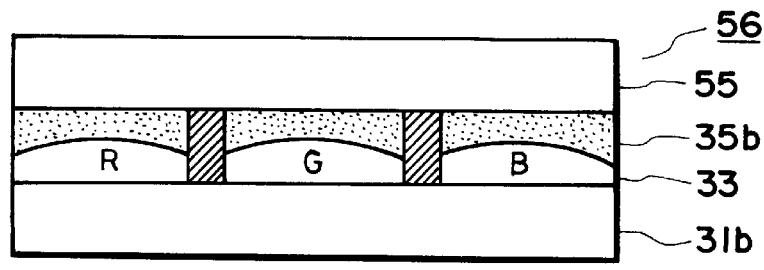

On the substrate 31b carrying the polymeric material 35b, an smooth plate 55 is gradually superposed so as not to incorporate air bubbles therebetween to provide a laminate 56 (FIGS. 5A and 5B).

The laminate 56 is set in a press (not shown) and is pressed thereby under a prescribed pressure, thus filling the polymeric material 35b to the spacings between the auxiliary electrodes 32b while removing the polymeric material 35b from the surface of the auxiliary electrodes 32b.

The smooth plate 55 may comprise any plate having a smooth (even) surface and also having a light-transmission property if the curing of the polymeric material 35b is performed by using, e.g., UV-rays. In this respect, a glass plate or a plastic plate may preferably be used.

The press (not shown) may include one using a hydraulic cylinder or air cylinder, a liquid-pressure press, and a roller press, if it can extend the polymeric material 35b over the entire region. In this instance, the laminate 56 may be heated by an electric heater or heated fluid, whereby the viscosity of the polymeric material 35b is effectively decreased to enhance a smooth extension thereof under pressure application.

Figure 5C:
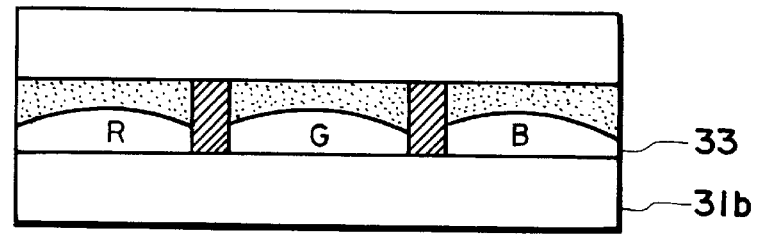

Then, the polymeric material 35b in the laminate 56 is cured by irradiation of light (FIG. 5C).

If the polymeric material 35b comprises a UV-curable resin, the UV-curable resin can be cured by irradiation with UV-rays by using a light source, such as a high- or (low-) pressure mercury vapor lamp or a xenon lamp providing an output (light energy) sufficient to cure the UV-curable resin. If the polymeric material 35b comprises one cured by irradiation with visible ray or infrared rays, a light source for emitting such rays may be employed.

Figure 5D:
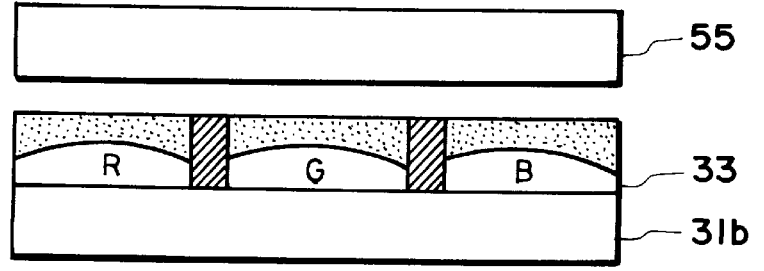
Figure 5E:
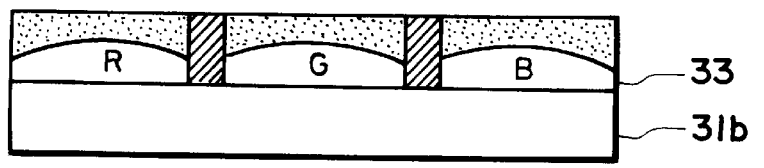

The laminate 56 after the curing of the polymeric material 35b is subjected to peeling of the smooth plate 55 therefrom by using a peeling (releasing) tool (not shown) (FIGS. 5D and 5E).

Figure 5F:
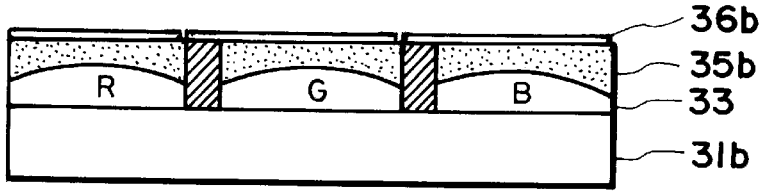

Thereafter, on the surface of the auxiliary electrodes 32b and the polymeric material layer 35b, a plurality of principal electrode 36b are formed so as to be electrically connected with the associated auxiliary electrodes 32b (FIG. 5F). On the principal electrodes 36b, an insulating film 10b is formed and is coated with an alignment film 11b to prepare an electrode plate 30b as shown in FIG. 3.

Another electrode plate 30a is prepared in the same manner as in the electrode plate 30b except for omitting the formation of the color filters 33.

Figure 3:
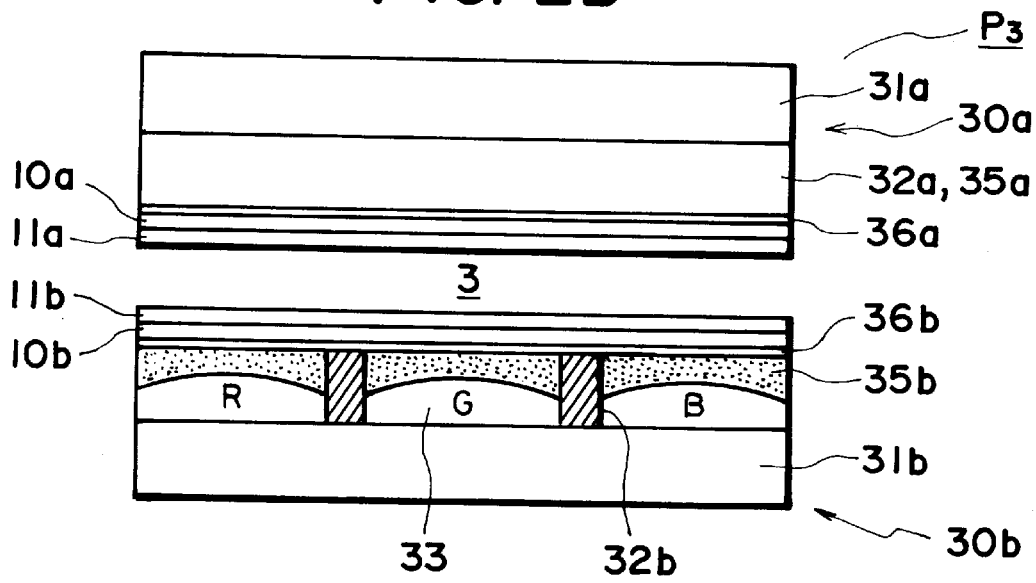
FIG. 3 is a schematic sectional view of a liquid crystal device in a first embodiment according to the present invention.

The thus prepared electrode plates 30a and 30b are applied to each other with a cell gap therebetween, which is filled with a liquid crystal composition 3 to provide a liquid crystal panel (device) P3 shown in FIG. 3.

According to this (first) embodiment, after the polymeric material (35a, 35b) is cured, the surface of the auxiliary electrodes (32a, 32b) is not coated with the polymeric material, whereby the step and apparatus for forming the through-holes (or elongated cut portions) employed in the conventional process can be omitted. As a result, the production process and cost are reduced that much, and it is possible to avoid a lowering in production yield.

Further, different from the conventional electrical connection via the through-holes, the auxiliary electrodes (32a, 32b) and the principal electrodes (36a, 36b) are electrically connected at the entire top surface of the auxiliary electrodes to ensure a larger contact area therebetween, thus allowing an effective electrical conduction state. Consequently, the problem of the voltage waveform distortion can readily be solved.

In this embodiment, the color filters 33 are protected by the polymeric material layer 35b from the influence of, e.g., heat in the production steps, thus preventing a change in color thereof.

Further, the polymeric material layer (35a, 35b) forms a substantially smooth (flat) surface together with the auxiliary electrodes (32a, 32b), thus leading to a substantially smooth surface of the alignment film (11a, 11b) contacting the liquid crystal composition 3. As a result, the aligning treatment of the alignment film can be conducted uniformly to provide a liquid crystal panel free from alignment defects therein.

In this embodiment, it is possible to employ thicker auxiliary electrodes (32a, 32b), thus effectively suppressing the voltage waveform distortion.

In this embodiment, the polymeric material layer 35b has a function of protecting the color filters 33 and a function of providing a flat surface in combination with the metal electrodes 32b as described above, the resultant electrode plate 30b has a simplified structure due to a simple production process, thus reducing a production cost. Further, the metal electrodes 32b functions as a color separation layer disposed at the spacings between the color filters 33, so that the resultant liquid crystal panel can effect clear color display.

Generally, when the liquid crystal composition 3 comprises a liquid crystal material providing a bookshelf structure or a structure close thereto, a chiral dopant having a large spontaneous polarization (Ps) may preferably be added to the composition 3 in order to increase an operation speed. As a result, the resultant liquid crystal composition 3 has a large Ps and accordingly is generally expected to make the voltage waveform distortion noticeable as described hereinabove based on the table.

According to this embodiment, however, the voltage waveform distortion can effectively be obviated as mentioned above. As a result, it is possible to take advantage of the liquid crystal material essentially providing the bookshelf structure to improve a brightness and contrast of display images, thus reducing a power consumption of a backlight unit (device). Such a liquid crystal material is also excellent in high-speed responsiveness, thus allowing a motion (moving) picture display. The liquid crystal material can also improve display quality since liquid crystal molecules are placed in a good alignment state.

Second Embodiment

A second embodiment of the present invention will be explained with reference to FIGS. 6–8.

Figure 6:
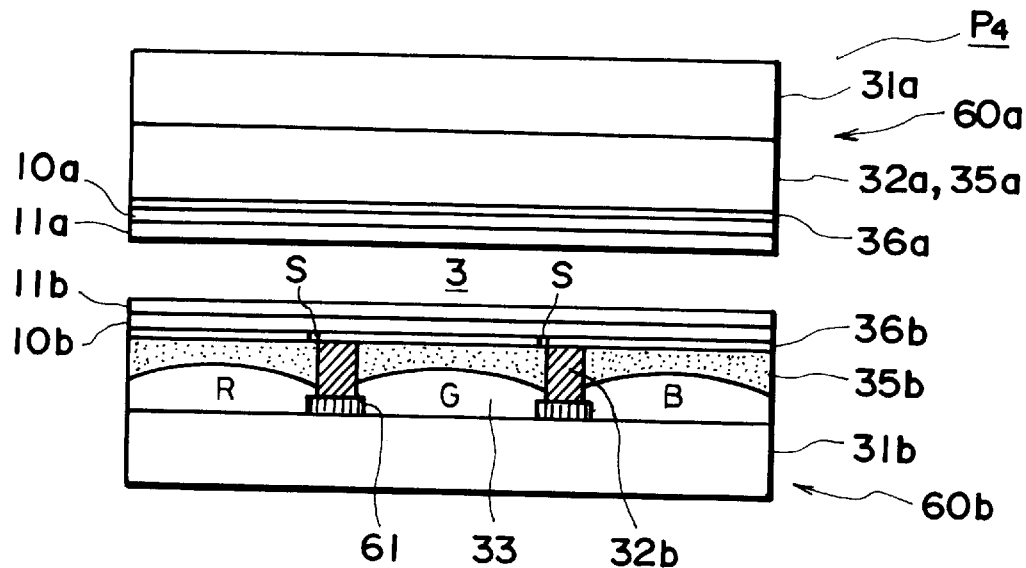
FIG. 6 is a schematic sectional view of a liquid crystal device in a second embodiment according to the present invention.

FIG. 6 shows a liquid crystal panel P4 according to this embodiment, which has a cell structure identical to the liquid crystal panel P3 of FIG. 3 according to the first embodiment except that a masking (light-interrupting) layer 61 is disposed between a light-transmissive substrate 31b and auxiliary electrodes 32b. More specifically, the liquid crystal panel P4 includes a pair of electrode plates 60a and 60b. The electrode plate 60b includes the masking layer 61 formed on the light-transmissive substrate 31b and coated with a narrower auxiliary electrodes 32b while leaving at least an elongated portion corresponding to an associated spacing S between principal electrodes 36b.

The masking layer 61 may comprise a non-electroconductive material or an electroconductive material if it has a masking (light-interrupting) property. Examples of the non-electroconductive material may include a resin colored with a colorant, such as an organic pigment, an inorganic pigment or a dye, dispersed therein. Examples of the electroconductive material may include a metal, such as Cr, Mo, Al, Ni or Cu, and alloys and oxides of these metals. Further, the masking layer 61 may be formed in a single layer or in plural layers of different materials.

FIGS. 7A–7E shows series of steps of producing the electrode plate 60b.

Figure 7A:
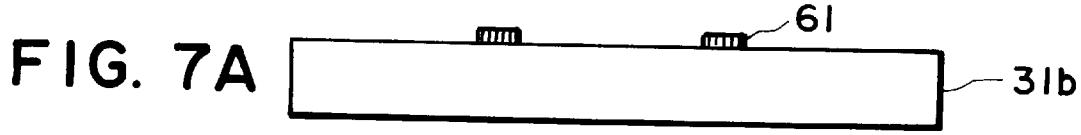
FIGS. 7A–7E are schematic sectional views for illustrating a series of steps involved in a process for producing the liquid crystal device.
Figure 7B:
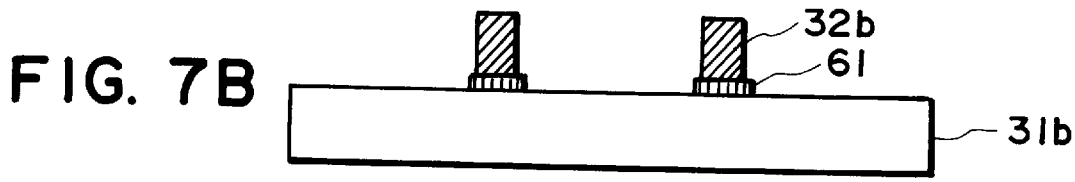
Figure 7C:
Figure 7D:
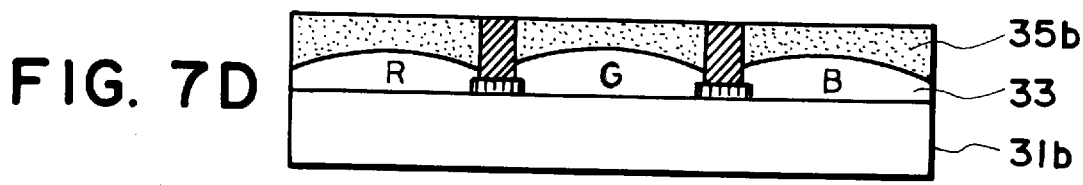
Figure 7E:
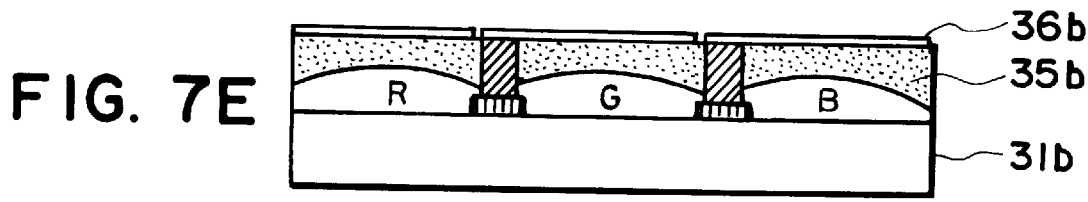

Referring to FIG. 7A, on the light-transmissive substrate 31b, the masking layer 61 is formed through a photolithographic process (including an etching step).

The subsequent steps shown in FIGS. 7B–7E are performed in the same manner as in First Embodiment (FIGS. 4A–5F) to prepare the electrode plate 60b.

Generally, as shown in FIG. 6, the adjacent principal electrodes 36 is electrically insulated from each other by the spacing S so as to prevent short-circuit therebetween, the liquid crystal composition 3 is kept in an initial alignment state without causing switching at a portion thereof corresponding to the spacing S. In the initial alignment state, liquid crystal molecules have different two molecular axes and thus constitute two (bright and dark) domains in mixture, thus being liable to cause leakage of light.

According to this embodiment, the above portion of liquid crystal composition 3 corresponding to the spacing S of the principal electrodes 36b is covered with the masking layer 61 (via the light-transmissive substrate 31b), whereby the light leakage is effectively suppressed to improve a contrast of a display area, thus enhancing a display quality.

In the case where a masking layer 61 is formed of an electroconductive material, an insulating film 63 of, e.g., $SiO_2$ may be disposed between the masking layer 61 and auxiliary electrodes 32b.

Figure 8A:
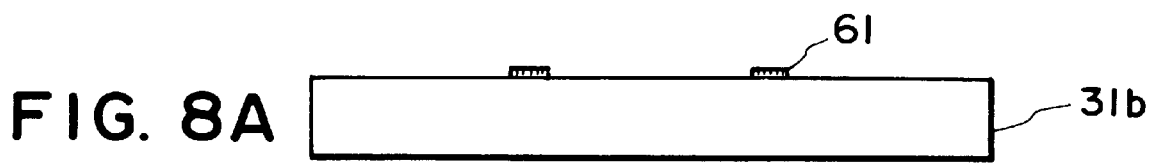
FIGS. 8A–8F are schematic sectional views for illustrating another series of steps involved in a process for producing the liquid crystal device.
Figure 8B:
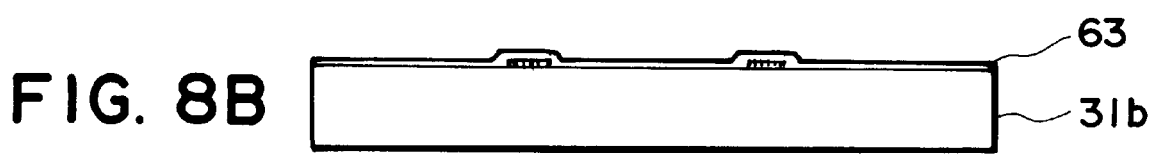

FIGS. 8A–8F shows a series of steps of producing an electrode plate using such an insulating film 63 similar to those (FIGS. 7A–7E) of producing the electrode plate 60b except for an additional step of forming the insulating film 63 shown in FIG. 8B. In this case, as shown in FIG. 8B, the insulating film 63 is formed on the entire surface of light-transmissive substrate 31b so as to cover the masking layer 61.

Third Embodiment

A third embodiment of the present invention will be explained with reference to FIGS. 9A–9H and FIGS. 10A–10G.

A liquid crystal panel in this embodiment has cell structure identical to that of the liquid crystal panel P3 in First Embodiment shown in FIG. 3 but is prepared through a production process different from that of First Embodiment.

More specifically, in the production process of this embodiment, similarly as in First Embodiment, auxiliary electrodes 32b are formed by applying a metal layer (electroconductive film) 70 onto a light-transmissive substrate 31b and patterning the metal layer 70 by etching via a positive-type photoresist 71 patterned after steps of exposing the photoresist 71 to light with a photomask 72 and developing the photoresist 71 as shown in FIGS. 9A–9D.

After the etching step, the photoresist 71 remaining on the auxiliary electrodes 32b is not removed therefrom in this embodiment different from First Embodiment.

Figure 9A:
FIGS. 9A–9H and FIGS. 10A–10G are schematic sectional views for illustrating a series of steps involved in a process for producing a liquid crystal device in a third embodiment according to the present invention.
Figure 9B:
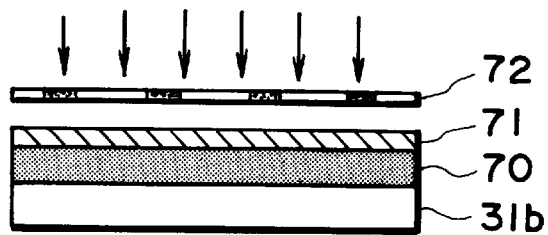
Figure 9C:
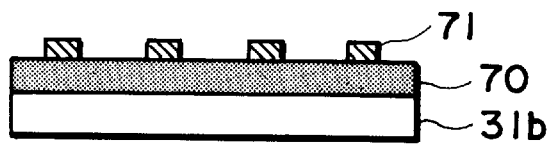
Figure 9D:
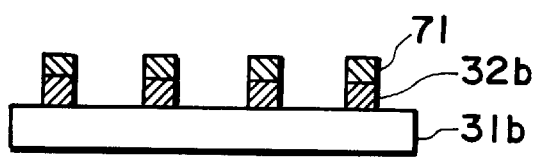
Figure 9E:
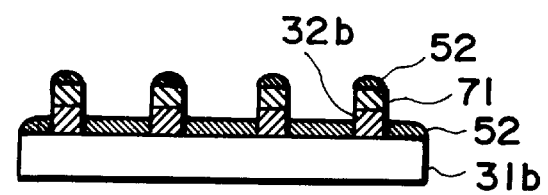

In such a state, an ink-receptive resin 52 is applied onto the light-transmissive substrate 31b similarly as in First Embodiment (FIG. 9E).

Figure 9F:
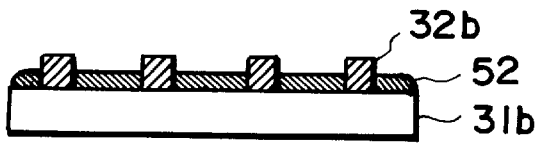

Thereafter, the photoresist layer 71 is removed from the auxiliary electrodes 32b together with a part of the ink-receptive resin remaining on the photoresist layer 71 by using a photoresist remover comprising, e.g., an organic solvent (FIG. 9F).

The subsequent steps are performed in the same manner as in the steps as shown in FIG. 4C to FIG. 5F in First Embodiment (FIG. 9G to FIG. 10G).

According to this embodiment, the removal of the ink-receptive resin 52 can be performed by a simple method without using the polishing apparatus, thus reducing the production cost that much.

Further, in this embodiment, the above-mentioned effects in First Embodiment are also obtained.

Fourth Embodiment

A fourth embodiment of the present invention will be explained with reference to FIG. 11A–11K.

FIGS. 11A–11K shows a series of steps of producing an electrode plate 90b having a structure similar to that of the electrode plate 30b shown in FIG. 3 in First Embodiment.

In this embodiment, color filters 93 is formed on a light-transmissive substrate 21b at spacings between auxiliary electrodes 32b by directly disposing respective colored inks 92 on the light-transmissive substrate 31b without using the ink-receptive layer 52 (used in First Embodiment).

A liquid crystal panel using the electrode plate 90b is prepared in the same manner as in First Embodiment except for omitting the step of forming the ink-receptive layer 52 (FIG. 4B).

In FIGS. 11A–11K, a reference numeral 95 represents a dispenser, a reference numeral 96 represents a laminate, and a reference numeral 97 represents a pair of pressing members of a press.

Each colored ink 92 used in this embodiment may comprise a liquid or solid ink consisting of a colorant, a binder resin and a solvent. As the colorant, a dye or a pigment may be used. The binder resin may preferably have several properties including a high dispersibility or solubility of the colorant therein, a good adhesiveness of the light-transmissive substrate 31b, and an excellent ink jet property. The solvent may preferably comprises one capable of dissolving the colorant and the binder and also having a high wettability against the light-transmissive substrate 31b.

In this embodiment, similarly as in Second Embodiment (FIGS. 6–8), a masking layer 61 may be employed.

According to this embodiments, the effects achieved by First Embodiment are also brought about.

Fifth Embodiment

A fifth embodiment of the present invention will be described with reference to FIGS. 12A–12H and FIGS. 13A–13I.

A liquid crystal panel prepared in this embodiment has a cell structure identical to that of the liquid crystal panel P3 (shown in FIG. 3) in First Embodiment.

A process for producing an electrode plate (corr. to the electrode plate 30b in First Embodiment) is illustrated in FIG. 12A to FIG. 13I.

Figure 12A:
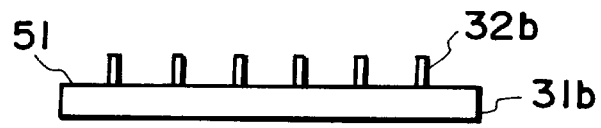
FIGS. 12A–12H and FIGS. 13A–13I are schematic sectional views for illustrating a series of steps involved in a process for producing a liquid crystal device in a fifth embodiment according to the present invention.

Referring to FIG. 12A, a plurality of auxiliary electrodes 32b are formed on a light-transmissive substrate 31b at a wiring face 51 thereof in the same manner as in First Embodiment.

On the wiring face 51 of the light-transmissive substrate 31b, a layer of an ink-receptive resin 52 are applied similarly as in First Embodiment.

Thereafter, the ink-receptive resin 52 remaining on the surface of the auxiliary electrodes 32b is removed by using a blade 100 though the steps shown in FIGS. 12C and 12D or FIGS. 12E and 12F.

Figure 12B:
Figure 12C:
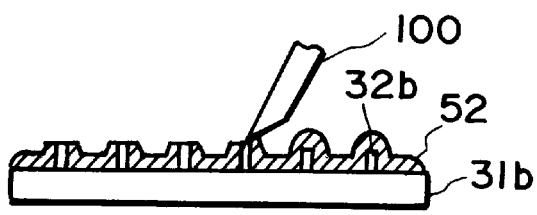
Figure 12E:
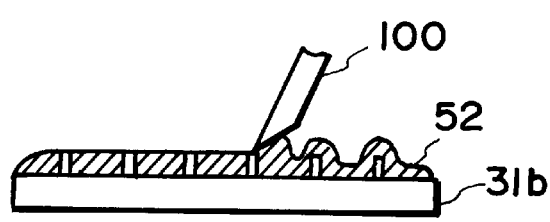
Figure 12D:
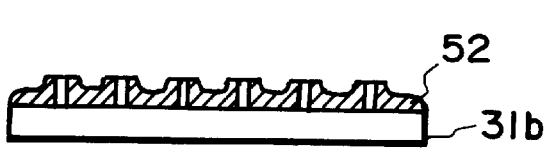
Figure 12F:
Figure 12G:
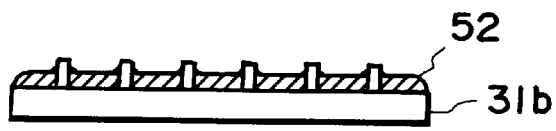

FIGS. 12C and 12D shows the case of using a resin 52 having a high solid content applied in a small thickness, and FIGS. 12E and 12F shows the case using a resin 52 having a low solid content applied in a large thickness (at a level identical to the auxiliary electrode 32b surface). In either case, the resin 52 is finally formed in a layer having a thickness as shown in FIG. 12G through the drying step using heating and air blowing.

In this embodiment, the removal of the resin 52 is performed by using the blade 100 as shown in FIG. 12C or 12E and means for moving the blade 100 (not shown).

As the blade 100, it is possible to use any blade as long as it can remove the resin 52. Examples of such a blade 100 may include a doctor blade generally used in gravure printing (having a thickness of, e.g., several hundred microns and made of metal sheet (or plate) having an cutting edge) and a blade of plastic plate made of polyurethane or polytetrafluoroethylene. The removal operation of the resin 52 may be performed by abutting (or pressing) the cutting edge of the blade 100 against the surface of the auxiliary electrodes 32b to such an extent that the blade is somewhat deflected or bent while moving the blade 100 along the auxiliary electrodes 32b in a width direction thereof. The blade 100 is required to have a cutting edge providing a high linearity an to be moved with high accuracy, whereby the cutting edge of the blade 100 is uniformly abutted on the entire auxiliary electrodes 32b to allow a sufficient removal of the resin 52 remaining on the auxiliary electrodes 32b.

In the above resin removal step, the direction of moving the blade 100 is not particularly limited as long as the blade 100 is moved along the auxiliary electrode surface. Specifically, the blade 100 may be moved in a longitudinal direction of the auxiliary electrodes 32b, a direction (as shown in FIGS. 12C or 12E) perpendicular to the longitudinal direction or other directions.

The subsequent steps are performed in the same manner in First Embodiment to prepare a liquid crystal panel according to this embodiment.

The thus prepared liquid crystal panel provides the advantageous effects as in First Embodiment.

Sixth Embodiment

A sixth embodiment of the present invention will be explained based on FIGS. 21A–21E.

A liquid crystal panel in this embodiment has a cell structure identical to the panel P3 shown in FIG. 3 and is prepared in the same manner as in Third Embodiment except that the positive-type photoresist 71 is changed to a water-repellent photoresist 101.

Figure 21A:
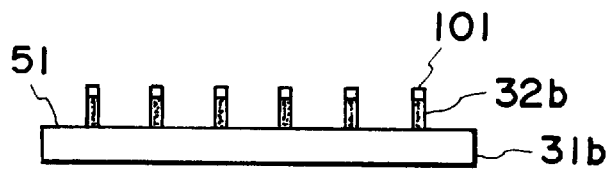
FIGS. 21A–21E are schematic sectional views for illustrating a series of steps involved in a process for producing a liquid crystal device in a sixth embodiment according to the present invention.

More specifically, as shown in FIG. 21A, on a light-transmissive substrate 31b, a plurality of patterned auxiliary electrodes 32b coated with the water-repellent photoresist 101 is formed in the same manner as in Third Embodiment.

The water-repellent photoresist 101 has a surface energy smaller than that of an ink-receptive resin 52 (used in the subsequent step). Specifically, the water-repellent photoresist may preferably have a surface energy of at most 45 dyn/cm$^2$ (in terms of a critical surface tension δc). Examples of the water-repellent photoresist 101 may include one having a molecular structure containing a fluorine atom, one mixed with a compound containing a fluorine atom, one having a molecular structure containing an organic silane group, one mixed with an organic silane compound, and one having a molecular structure free from a hydrophilic group (such as a hydroxyl group, an amino group, a carboxyl group or a carbonyl group) or having a molecular structure having less content of such a hydrophilic group.

Figure 21B:
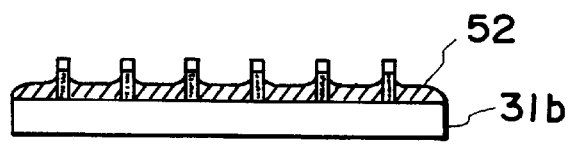

Then, an ink-receptive resin 52 is applied onto the light-transmissive substrate 31b in the same manner as in First Embodiment (FIG. 21B).

Figure 21C:
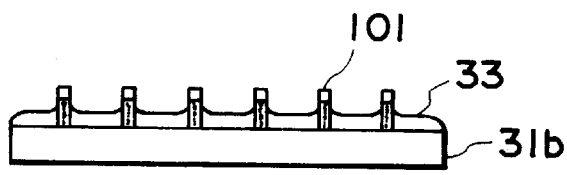

Then, the resin 52 is colored by using an ink jet apparatus (not shown) to form color filters 33 in the same manner as in First Embodiment (FIG. 21C).

Figure 21E:
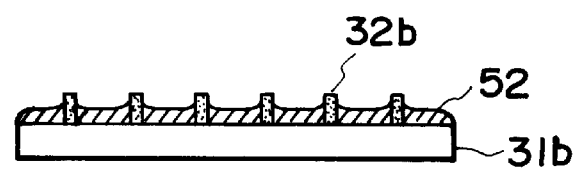
Figure 21D:
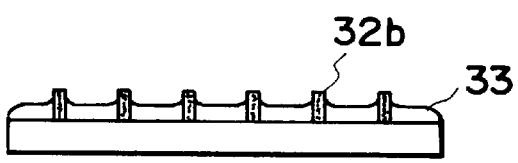

Thereafter, the water-repellent photoresist 101 is removed by using a photoresist remover comprising, e.g., an organic solvent (FIG. 21D).

In this embodiment, the removal of the water-repellent photoresist 101 may be performed before the coloring of the ink-receptive resin 52 as shown in FIGS. 21E and 21D.

The subsequent steps are performed in a similar manner as in First Embodiment to prepare a liquid crystal panel according to this embodiment.

In addition to the above-mentioned effects in First Embodiment, the process for producing the liquid crystal panel described in this embodiment makes the removal of the ink-receptive resin 52 (as in the preceding embodiments except for Third Embodiment) unnecessary since the ink-receptive resin 52 contains a hydrophilic solvent and thus is effectively repelled by the water-repellent photoresist 101 during the application of the resin 52, thus being accurately placed between the auxiliary electrodes 32b. As a result, the production process is simplified, thus leading to a cost reduction thereof. Further, in the case where the coloring of the resin 52 (FIG. 21D) is conducted after the removal of the photoresist 101 (FIG. 21E), the colored ink does not contact the photoresist 101, whereby it is possible to prevent the color filters 33 from changing in color, deteriorating and dissolving, thus resulting in the color filters excellent in color reproducibility.

Seventh Embodiment

A seventh embodiment of the present invention will be explained based on FIGS. 14A–14E and FIGS. 15A–15F illustrating a process for producing an electrode plate used as one of a pair of electrode plates in a liquid crystal panel.

The liquid crystal panel prepared in this embodiment has a similar cell structure as in First Embodiment.

The electrode plate used in the liquid crystal panel in this embodiment is prepared through the steps shown in FIG. 14A to FIG. 15F.

Figure 14A:
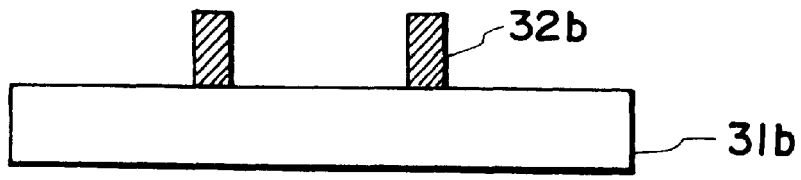
FIGS. 14A–14G and FIGS. 15A–15F are schematic sectional views for illustrating a series of steps involved in a process for producing a liquid crystal device in a seventh embodiment according to the present invention.

On a light-transmissive substrate 31b, a plurality of auxiliary electrodes 32b are formed similarly as in First Embodiment (FIG. 14A).

Figure 14B:
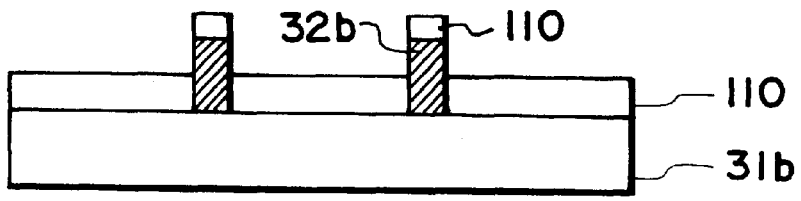

Then, in the same manner as in First Embodiment, a ca. 0.3–2 μm thick photosensitive resin 101 having an ink receptivity is applied onto a wiring face of the light-transmissive substrate 31b (FIG. 14B).

Examples of the photosensitive resin 110 may include a photosensitive acrylic resin, a photosensitive polyamide resin, a photosensitive polyimide resin, a photosensitive agent-containing natural compound (such as gelatin, casein or glue) and polyvinyl alcohol. In view of excellent physical properties, the photosensitive polyamide resin and the photosensitive polyimide resin may preferably be used.

Figure 14C:
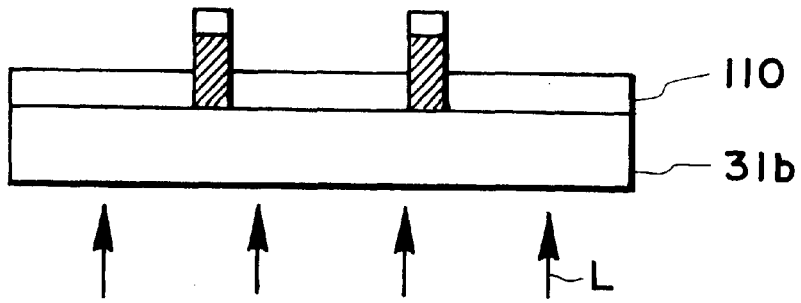
Figure 14D:
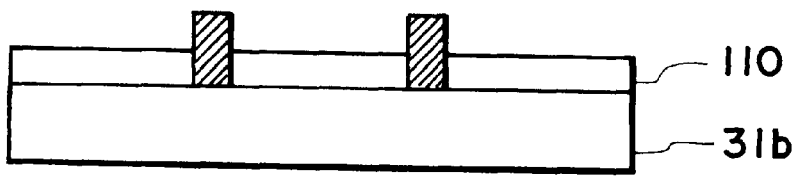

Then, in order to cure the photosensitive resin 110, the photosensitive resin 110 is irradiated with a light L having a particular waveform from the side opposite to the wiring face (FIG. 14C), whereby the resin 110 applied between the auxiliary electrodes 32b is cured but the resin 110 remaining on the auxiliary electrodes 32b is not cured. Thereafter, the resultant substrate is subjected to development, rinse and post-baking to provide the substrate as shown in FIG. 14D.

The subsequent steps (FIG. 14E to FIG. 15F) are conducted in a similar manner as in First Embodiment to prepare a liquid crystal panel according to this embodiment.

According to this embodiment, the photosensitive resin 110 remaining on the auxiliary electrodes 32b can readily be removed since such a resin 110 is not cured by the light irradiation, thus resulting in a simplified production process. Further, in this embodiment, the effects achieved in First Embodiment are similarly brought about.

In this embodiment, the masking layer 61 as shown in FIGS. 6–8 (Second Embodiment) may be used for preventing leakage of light.

Eighth Embodiment

An eighth embodiment of the present invention will be described with reference to FIGS. 16–19.

Figure 16:
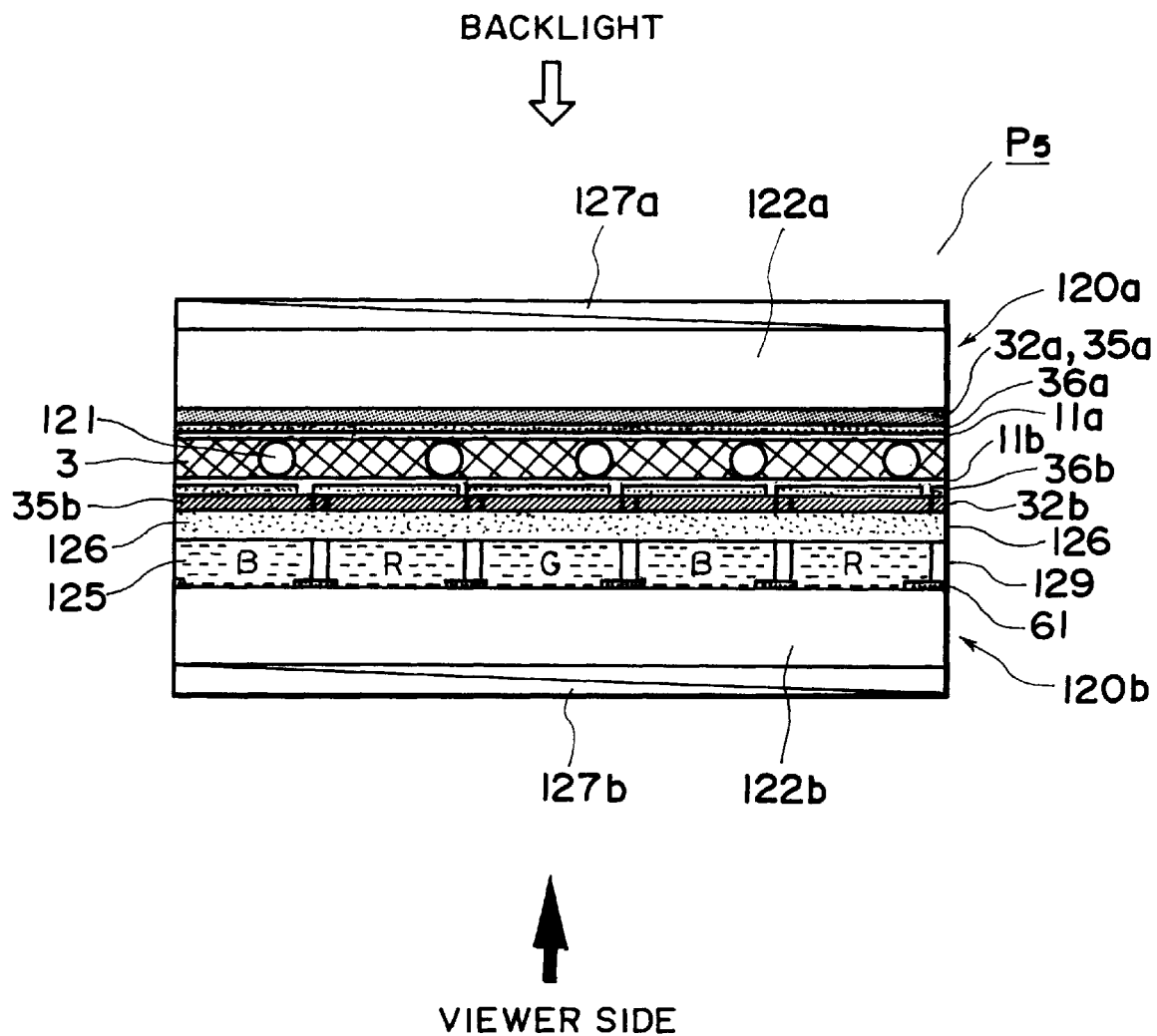
FIG. 16 is a schematic sectional view of a liquid crystal device in an eighth embodiment according to the present invention.

FIG. 16 is a schematic sectional view showing a cell structure of a liquid crystal panel P5 prepared in this embodiment.

Referring to FIG. 16, the liquid crystal panel P5 includes a pair of electrode plates 120a and 120b disposed substantially parallel to each other, and a liquid crystal composition 3 disposed between the electrode plates 120a and 120b together with spacer beads 121 and held by a sealing member (not shown) at the periphery of the electrode plates 120a and 120b. The spacer beads may generally comprise silica beads, alumina beads, a glass fiber and plastic beads. The liquid crystal composition 3 may generally comprise a ferroelectric liquid crystal showing a bistable alignment state and is disposed between the electrode plates 120a and 120b to provide a prescribed cell gap of, e.g., 0.1–3 μm, which is set to be sufficient to suppress or extinguish the helical structure of liquid crystal molecules in their bulk state.

The (lower) electrode plate 120b includes a light-transmissive substrate 122b, a masking layer 61 comprising plural masking portions disposed on the light-transmissive substrate 31b with prescribed spacings therebetween, color filters 125 of red (R), green (G) and blue (B) disposed on the light-transmissive substrate 122b at the spacings between the masking portions, and a protective layer 126 disposed so as to cover the color filters 125. On the protective layer 126, a plurality of auxiliary electrodes 32b are formed with spacings filled with a layer of polymeric material 35b to provide a flat surface in combination of the auxiliary electrodes 32b and the polymeric material 35b. On the flat surface, a plurality of principal electrodes 36b are formed along the associated auxiliary electrodes 32b so as to keep a good electrical conductance (contact state) therebetween and are coated with a auxiliary substrate 11b via an insulating film, as desired.

In the electrode plates 120b, a plurality of electrodes (comprising the principal electrodes 36b an the auxiliary electrodes 32b) are supplied with a data signal.

The (upper) electrode plate 120a includes a light-transmissive substrate 122a, a plurality of auxiliary electrodes 32a with spacings therebetween, a layer of a polymeric material 35 disposed at the spacings to form a flat surface in combination with the auxiliary electrodes 32a, a plurality of principal electrodes 36a disposed on the flat surface, and an alignment film 11a disposed on the principal electrodes 36a.

In the electrode plate 120a, a plurality of electrodes (comprising the principal electrodes 36a and the auxiliary electrodes 32a) are supplied with a scanning signal.

Outside the pair of electrode plates 120a and 120b, a pair of polarizers 127a an 127b are disposed in cross nicols to provide the liquid crystal panel P5.

Behind the liquid crystal panel P5 (outside the polarizer 127a), a light source (backlight unit) is disposed, and the liquid crystal panel P5 is viewed from the outside of the polarizer 127b (viewer side).

The liquid crystal panel P5 described above may generally be prepared by a process including steps shown in FIGS. 17A to 18B (for the electrode plate 122b) and FIGS. 19A–19H (for the electrode plate 122a).

Figure 17A:
FIGS. 17A–17G and FIGS. 18A–18G are schematic sectional views for illustrating a series of steps involved in a process for producing one of electrode plates used in the liquid crystal device.
Figure 17B:

More specifically, on the light-transmissive substrate 122b, the masking layer 123 is formed (FIG. 17A) and is coated with a layer of a resin 130 (FIG. 17B).

The resin 130 has a property of being cured by light or heat energy to lower its ink receptivity. The layer of the resin 130 may generally be applied by spin coating, roller coating, bar coating, spray coating, dip coating or printing, followed by pre-baking, if necessary.

Figure 17C:
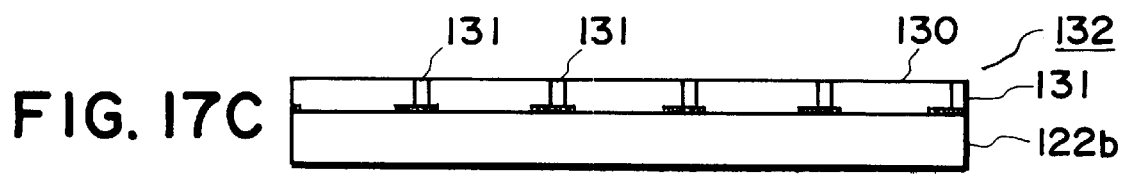

Then, the thus treated substrate 122b is subjected to pattern exposure to light with a photomask, whereby only portions 131 (129 in FIG. 16) masked by the photomask (masked portions) of the resin layer 130 are cured and lose the ink receptivity (FIG. 17C).

The thus treated plate 132 is set in an ink jet image-forming apparatus (mfd. by Canon K.K.) (not shown) having a head portion 53. After effecting positioning between the plate 132 and the head portion 53, prescribed color inks are injected into corresponding portions of the resin layer 130 to color the resin layer 130 an are dried, as desired, followed by light irradiation or heating to cure the resin layer 130, thus forming the color filters 125 of R, G and B (FIG. 17E).

The resin 130 may comprise a material identical to that for the resin 52 used in First Embodiment.

In order to promote a crosslinking reaction of the resin 130, a photopolymerization initiator (or crosslinking agent) may be used. Examples of such a photopolymerization initiator may include, a dichloromate, a bisazido compound, a radical initiator, a cationic initiator, and an anionic initiator. These initiators may be used alone or combinations of at least two species. Further, it is possible to use these initiators in combination with other sensitizing agents. In order to further accelerate the crosslinking reaction, heat treatment may be effected after the light irradiation. The resin 130 comprising the above composition (mixture) is very excellent in resistances to heat and water and also is capable of sufficiently withstanding high temperatures and washing (cleaning) steps in later steps.

Figure 18A:
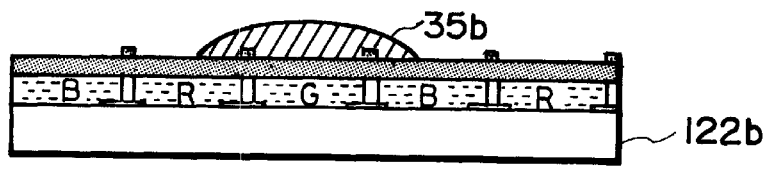
Figure 18B:
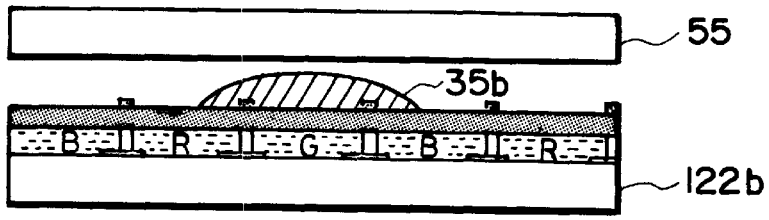
Figure 18C:
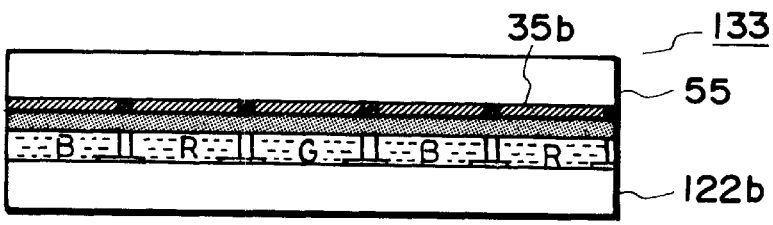
Figure 18D:
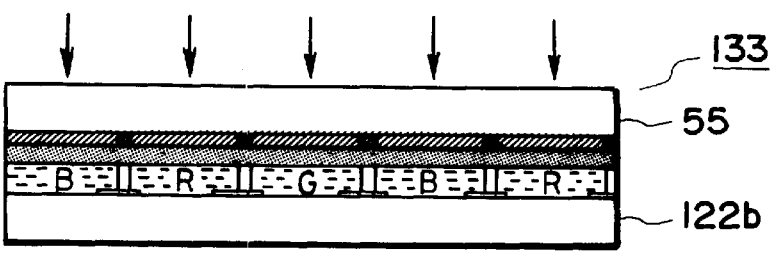
Figure 18E:
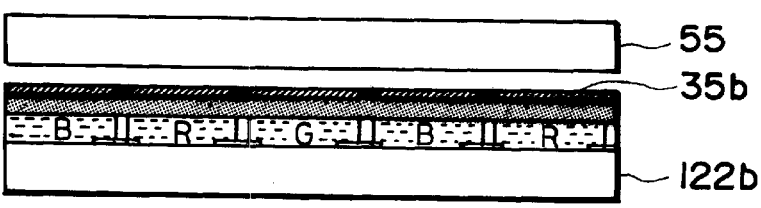
Figure 18F:
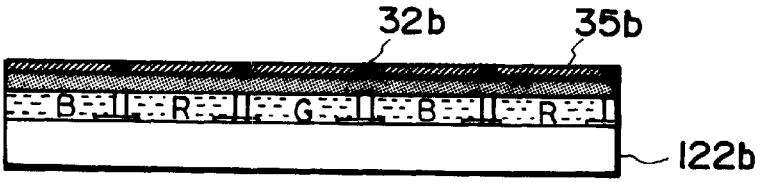

On the thus-prepared color filters 125, the protective layer 126 is formed (FIG. 18F).

The protective layer 126 may generally be formed by using a resinous composition of a photopolymerization-type, a thermosetting-type or a type employing light and heat in combination. In the case of using an inorganic material, the protective layer 126 may be formed by vapor deposition or sputtering. The protective layer 126 is required to have not only a light transmission property but also prescribed properties, such as resistances to heat, chemicals and washing (cleaning) so as to withstand the later steps of forming the electrodes and/or the alignment film.

Figure 18G:
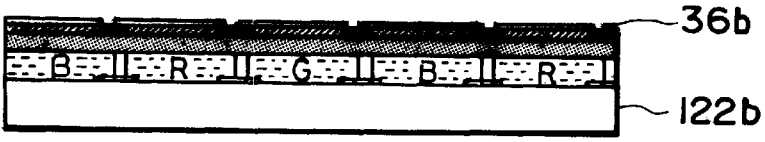

Then, on the surface of the protective layer 126, a metal layer is formed and subjected to patterning through a photolithographic process (etching) to provide a plurality of the auxiliary electrodes 32b (FIG. 18G). On the protective layer 126 provided with the auxiliary electrodes 32b, it is possible to effect an adhesiveness-imparting treatment with a silane coupling agent etc., as desired, in order to improve the adhesiveness with the layer of the polymeric material 35b formed in the next step.

The subsequent steps (FIGS. 19A–19G) for forming the electrode plate 120b are performed in the same manner as in First Embodiment to prepare the electrode plate 120b. In FIGS. 19C and 19D, a reference numeral 133 represents a laminate.

The other (upper) electrode plate 120a may generally be prepared through steps shown in FIGS. 19A–19H.

On the light-transmissive substrate 122a, a metal layer is formed an patterned in a prescribed shape by a photolithographic process (etching) to provide a plurality of the auxiliary electrodes 32a (FIG. 19A), followed by an adhesiveness-imparting treatment with a silane-coupling agent etc., for enhancing the adhesiveness with the layer of the polymeric material 35a, as desired.

Figure 19A:
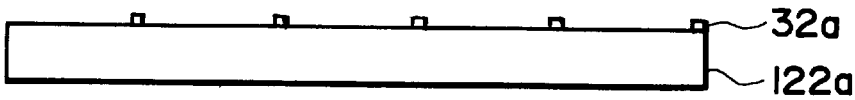
FIGS. 19A–19H are schematic sectional views for illustrating a series of steps involved in a process for producing the other electrode plate used in the liquid crystal device.
Figure 19B:
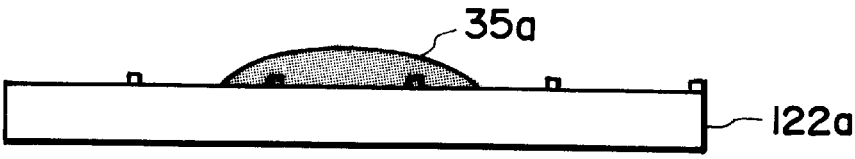
Figure 19C:
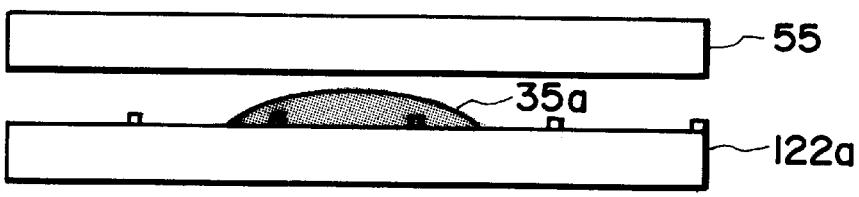
Figure 19D:
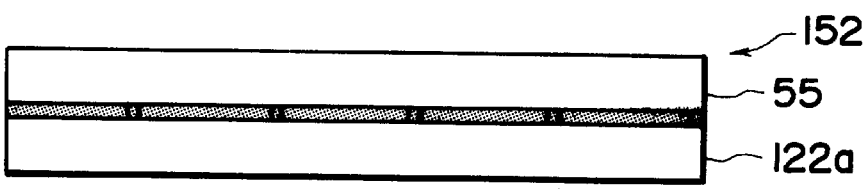
Figure 19E:
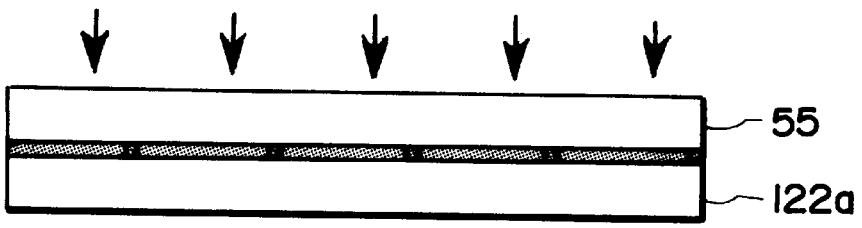

On the surface of the light-transmissive substrate (and the auxiliary electrodes 32a), the polymeric material 35a is placed dropwise by a dispenser (not shown) (FIG. 19B).

Figure 20A:
FIGS. 20A–20H are schematic sectional views for illustrating a series of steps involved in ai process for producing a liquid crystal device in a ninth embodiment according to the present invention.
Figure 20B:
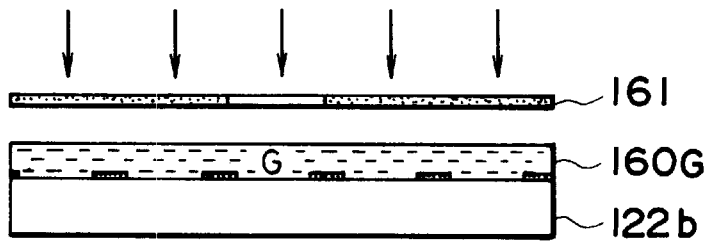
Figure 20C:
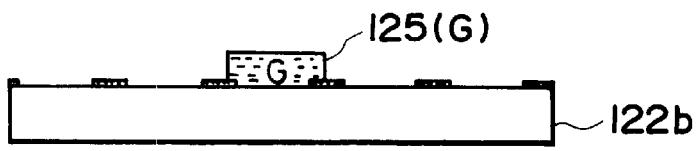
Figure 20D:
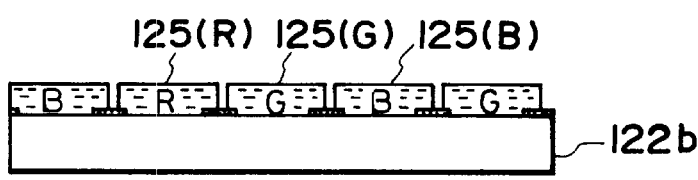
Figure 20E:
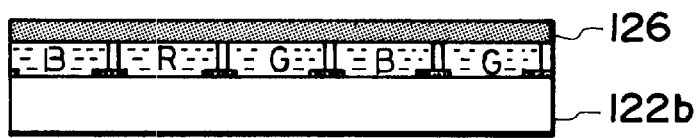
Figure 20F:
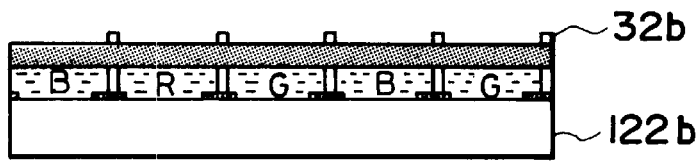
Figure 20G:
Figure 20H:

On the substrate 122a carrying the polymeric material 35a, an smooth plate 55 is gradually superposed so as not to incorporate air bubbles therebetween to provide a laminate 56 (FIGS. 20C and 20D).

The laminate 152 is set in a press (not shown) and is pressed thereby under a prescribed pressure, thus filling the polymeric material 35a to the spacings between the auxiliary electrodes 32a while removing the polymeric material 35a from the surface of the auxiliary electrodes 32a.

The smooth plate 55 and the press may e identical to those used for forming the (lower) electrode plate 120b described above.

Figure 19F:
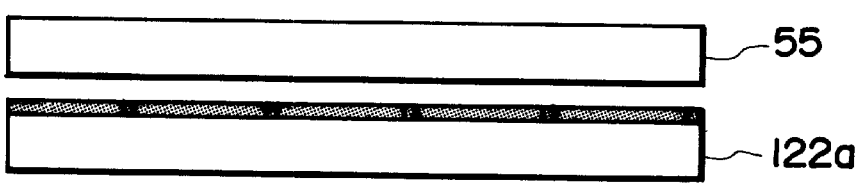
Figure 19G:
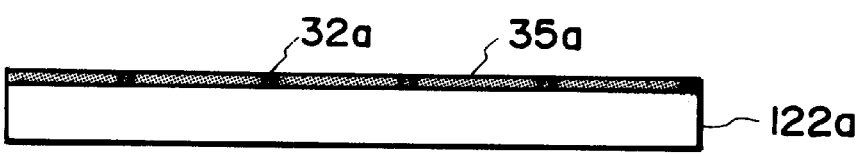

The laminate 152 after the curing of the polymeric material 35a is subjected to peeling of the smooth plate 55 therefrom by using a peeling (releasing) tool (not shown) (FIGS. 19F and 19G).

Figure 19H:
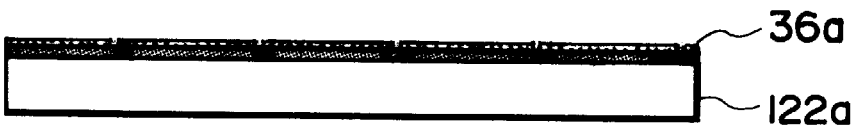

Thereafter, on the surface of the auxiliary electrodes 32a and the polymeric material layer 35a, a plurality of principal electrode 36a are formed so as to be electrically connected with the associated auxiliary electrodes 32a (FIG. 19H). On the principal electrodes 36a, an insulating film 10a is formed and is coated with an alignment film 11a to prepare the electrode plate 120a as shown in FIG. 16.

The thus prepared electrode plates 120a and 120b are applied to each other with a cell gap therebetween, which is filled with a liquid crystal composition 3 to provide a liquid crystal panel (device) P5 shown in FIG. 16.

According to this (eighth) embodiment, it is possible to achieve the similar effects as in First Embodiment described above.

Ninth Embodiment

A ninth embodiment of the present invention will be explained based on FIGS. 20A–20H.

In this embodiment, a liquid crystal panel has a cell structure identical to that of the liquid crystal panel P5 of Eighth embodiment and may be prepared in the same manner as in Eighth Embodiment except that color filters of R (125(R)), G (125(G)) and B (125(B)) are successively (independently) formed in the following manner.

First, on a light-transmissive substrate 122b, a masking layer 123 is formed. On the masking layer 123, a photosensitive color resin liquid of green 160G is applied in a prescribed thickness and pre-baked (FIG. 20A).

The resin liquid 160G is then subjected to exposure to light with a patterned photomask 161 (FIG. 20B), followed by treatments for developing, rinse and post-baking to form a color filter of green 125 (G) (FIG. 20C). Similarly, a color filter of red 125 (R) and a color filter of blue 125 (B) are successively formed (FIG. 20D).

The subsequent steps (e.g., shown in FIGS. 20E–20H) are performed in the same manner as in Eighth Embodiment to prepare a liquid crystal panel according to this embodiment.

The resin liquid (e.g., 160G) may comprise a resin and a colorant dispersed therein.

Examples of the resin may include one to which a photosensitivity is imparted, such as gelatin, casein, glue, polyvinyl alcohol, polyimide, polyimideamide, polyester imide, polyamide, polyester, polyparaxylylene, polycarbonate, polyvinyl acetal, polyvinyl acetate, polystyrene, cellulosic resin, melamine resin, urea resin, acrylic resin, epoxy resin, polyurethane, and polysilicone, and ordinary photosensitive resins. These resins may be used singly or in combination of two or more species.

Examples of the colorant (for coloring the resin) may include an organic pigment, an inorganic pigment and a dye, providing desired spectral characteristics. In this case, the colorant may be used singly or in combination of two or more species. In this embodiment, an organic pigment may preferably be used in view of coloring or other characteristics of the resultant color filters.

More specifically, examples of such an organic pigment may include: azo pigments of a soluble-type, an insolubletype, and a condensation-type; phthalocyanine pigments, polycondensation-type pigments containing compounds of indigo-type, anthraquinone-type, perylene-type, perinone-type, dioxazine-type, quinacridone-type, isoindolinon-type, phthalone-type, methine-type, azomethine-type, and other metal complexes; and mixtures of these compounds.

The photosensitive color resin liquid (e.g., 160G) may be formed by dispersing the above colorant in an amount of 10–50% by weight in a resin solution containing the above resin by means of, e.g., a ultrasonic generator or a mixer using three rollers in order to effect sufficient mixing operation. In this case, the thus dispersed colorant may preferably be formed in a uniform particle size by using a seive or a filter.

In this embodiment, it is possible to achieve the above effects as in First Embodiment.

Hereinbelow, the present invention will be described more specifically based on Examples. It is however to be understood that the present invention is not restricted to these Examples.

EXAMPLE 1

A liquid crystal panel (device) P3 including a pair of electrode plates 30a and 30b as shown in FIG. 3 was prepared through steps shown in FIGS. 4A–5F in the following manner.

First, the electrode plate 30b was formed as follows.

On a double side-polished blue plate glass substrate 31b (300×310×1.1 mm), a 2 μm-thick layer of Al was formed by sputtering and patterned in a width of 20 μm at a pitch of 320 μm by a photolithographic process including an etching step to form a plurality of auxiliary electrodes 32b as shown in FIG. 4A.

On the glass substrate 31b (and the auxiliary electrodes 32b), a 1 μm-thick layer of an ink-receptive resin 52 comprising 5 g of hydroxypropyl cellulose ("HPL-H", mfd. by Nippon Soda K.K.) and 5 g of a methylol melamine derivative ("Sumitech M-3", mfd. by Sumitomo Kagaku Kogyo K.K.) was formed by spin coating, followed by pre-baking at 90° C. for 10 min. (FIG. 4B).

Then, the resin 52 was colored by using an ink jet image-forming apparatus and dried at 90° C. for 10 min., followed by post-baking at 200° C. for 1 Hr to form color filters 33 (FIGS. 4C and 4D).

The thus treated substrate 31b was set in a polishing apparatus and the resin 52 remaining on the auxiliary electrodes 32b was removed by polishing using a surface plate of foamed polyurethane and a liquid containing abrasive particles of alumina (average particle size=0.3 μm) under a pressure of 50 g/cm² and rotation and oscillation for 3 min.

After the polishing (FIG. 4E), the resin 52 remaining on the auxiliary electrodes 32b was not confirmed.

On the surface (where the color filters 33 are formed) of the glass substrate 31b, a coupling treatment liquid comprising 1 wt. part of a silane coupling agent ("A-174", mfd. by Nippon Unicar K.K.) and 40 wt. parts of ethyl alcohol was applied by spin coating, followed by heat-treatment in an oven at 100° C. for 20 min.

On the thus-treated surface of the glass substrate 31b (provided with the auxiliary electrodes 32b and the color filters 33), an acrylic UV-curable resin 35b comprising a mixture of pentaerythritol triacrylate/neopentyl glycol diacrylate/1-hydroxycyclohexyl phenyl ketone (=50/50/2 by weight) was placed dropwise by using a dispenser as shown in FIG. 4F.

Further thereon, a smooth plate 55 (double side-polished blue plate glass; 300×310 mm) was gradually superposed so as not to generate air bubbles therebetween. Thereafter, the glass substrate 31b and the smooth plate 55 were pressed in a 1 ton roller press under a pressure of 700 kg at a feed rate of 30 cm/min. (FIGS. 5A and 5B). The laminate of the glass substrate and the smooth plate, after taking out from the roller press, was irradiated with UV rays for 2 min. by using a UV ray irradiation apparatus including four 100 W-high pressure mercury vapor lamps to curve the UV-curable resin (FIG. 5C).

Then, the smooth plate 55 was removed from the glass substrate 31b by using a releasing tool (FIGS. 5D and 5E).

On the auxiliary electrodes 32b and the UV-cured resin 35b formed on the glass substrate 31b, an ITO film was formed by sputtering, followed by patterning of the ITO film so as to be electrically connected to associated auxiliary electrodes 32b through a photolithographic-etching process to form a plurality of principal (transparent) electrodes 36b each having a width of 300 μm and a pitch of 320 μm (FIG. 5F).

The other electrode plate 30a was prepared in the same manner as in the above electrode plate 30b except that the color filters 33 were not formed.

Then, the electrode plate 30b (including the color filters 33) was coated with a 5 wt. %-solution in ethanol of a mixture of a silica binder and a polysiloxane (silica:polysiloxane=90:10 by weight) by spin coating at 1500 rpm for 15 sec., followed by pre-drying at 80° C. for 5 min. and hot baking at 200° C. for 1 hour to form a 15000 Å-thick layer.

The other electrode plate 30a (including no color filters 33) was coated with a 0.5 wt. %-solution of a polyimide precursor having a recurring unit represented by the formula shown below effecting by spin coating the times (1st: 500 rpm, 10 sec.; 2nd: 1500 rpm, 30 sec.), followed by pre-drying at 80° C. for 5 min. and hot baking at 250° C. for 1 hour to form a 50 Å-thick alignment control layer, which was then subjected to rubbing treatment with a nylon cloth to effect a uniaxial aligning treatment.

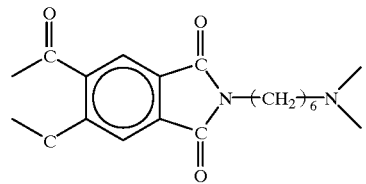

After silica beads (average particle size=2 μm) were dispersed on one of the electrode plates 30a and 30b, the electrode plates were applied to each other to form a blank cell, which was then filled with a ferroelectric (chiral smectic) liquid crystal composition 3 (Composition X) shown below in its isotropic liquid state under vacuum, followed by cooling to room temperature at a rate of 1° C./min. to prepare a liquid crystal device (panel) P3 as shown in FIG. 3.

Composition X

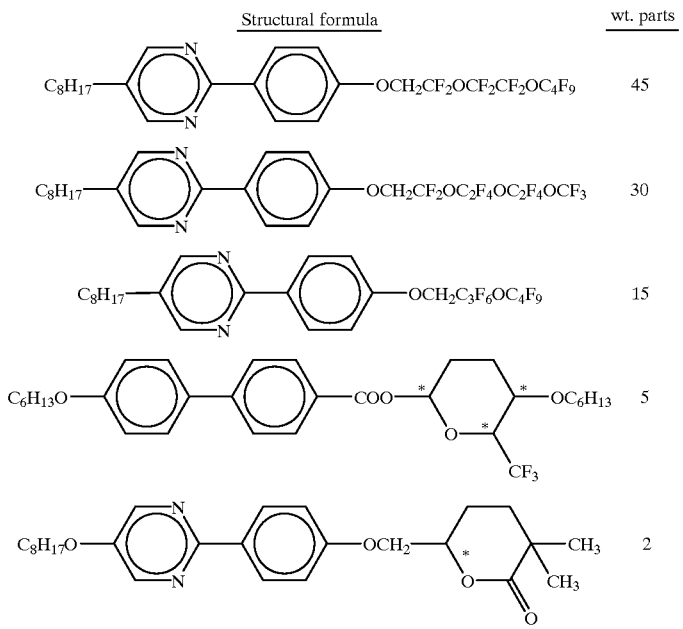

Phase Transition Temperatures (° C.)

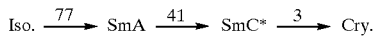

(Iso.: isotropic phase, SmA: smectic A phase, SmC*: chiral smectic C phase, Cry.: crystal)

Spontaneous polarization (Ps)=31.1 nC/cm$^2$ (30° C.)

Then, a pair of polarizers were applied (bonded) to both sides of the liquid crystal device P3 so as to provide a cross nicol relationship.

Behind the liquid crystal device (on the side closer to the electrode plate 30a including no color filters 33), a backlight device was disposed, thus preparing a liquid crystal display device to be viewed from the side of the electrode plate 30b including the color filters 33.

The thus prepared liquid crystal device provided advantageous effects as described in First Embodiment. For example, the production cost of the electrode plate 30b was reduced in half or below when compared with the conventional process. Further, when each electrode plate (30a, 30b) was subjected to measurement of an electrical resistance for all the patterned (stripe-shaped) electrodes, all the electrodes provided a lower electrical resistance of at most 300 ohm with respect to a length of 300 mm (pattern length). The transparent electrodes could be made thin in this example, thus avoiding a lowering in transmittance due to thicker transparent electrodes and recognition of the presence of the transparent electrodes per se. Further, the alignment film surface was made substantially smooth, thus preventing occurrences of an optical difference and a crosstalk.

Further, when the above-prepared liquid crystal device was driven, uniform inversion of liquid crystal molecules (uniform switching state) was confirmed, thus improving display qualities.

The liquid crystal composition (Composition X) used in this example stably provided a bookshelf layer structure or a layer structure close thereto having a small layer inclination angle and an excellent alignment state free from unevenness and not causing short circuit, thus leading to good display characteristics, such as a high contrast, an excellent high-speed responsiveness, a high resolution and a high brightness.

EXAMPLE 2

A liquid crystal device was prepared and evaluated in the same manner as in Example 1 except that the removal of the resin 52 was performed by using a tape polishing apparatus in the following manner.

In the tape polishing apparatus, a polishing tape (Al$_2$O$_3$-based #6000 polishing tape) was pressed against the auxiliary electrodes 32b five times under the conditions including a substrate feed rate of 75 mm/min., a tap feed rate of 300 mm/min., and a tape-pressing pressure of 5 kgf/cm$^2$.

When the surface of the polished auxiliary electrodes 32b was observed after the polishing operation, no resin 52 remaining on the auxiliary electrodes 32b was confirmed.

In addition, the above-mentioned effects as in Example 1 were also achieved in this example.

EXAMPLE 3

A liquid crystal device was prepared and evaluated in the same manner as in Example 1 except that the removal of the resin 52 was performed by using a polishing apparatus including a surface plate of #3000 foamed PVA (polyvinyl alcohol) having a flat reference surface in the following manner.

In the polishing apparatus, the surface of the auxiliary electrodes 32b was pressed against the surface plate at a pressure of 50 g/cm$^2$, followed by rotation and oscillation for 30 sec.

When the surface of the polished auxiliary electrodes 32b was observed after the polishing operation, no resin 52 remaining on the auxiliary electrodes 32b was confirmed.

In addition, the above-mentioned effects as in Example 1 were also achieved in this example.

EXAMPLE 4

A liquid crystal device (liquid crystal panel P4 shown in FIG. 6) was prepared and evaluated in the same manner as in Example 1 except that an additional step of forming a masking layer 61 was performed before the formation of the auxiliary electrodes 32b.

The masking layer 61 was formed in the following manner.

On a light-transmissive substrate 31b, a photosensitive resin ("Resin BM", mfd. by Shin-Nittetsu Kagaku K.K.) was applied by spin coating, followed by pre-baking at 80° C. for 10 min. Then, the thus-treated light-transmissive substrate 31b was subjected to exposure to light and shower development using a particular developer liquid for 10 sec., followed by post-baking at 200° C. for 30 min. to form a 1 μm-thick masking layer 61.

In this example, it was possible to obtain similar effects as in Example 1.

In addition, leakage of light from the spacings S between the principal electrodes 36b could be prevented by the above masking layer 61 to improve a contrast.

EXAMPLE 5

Figure 8C:
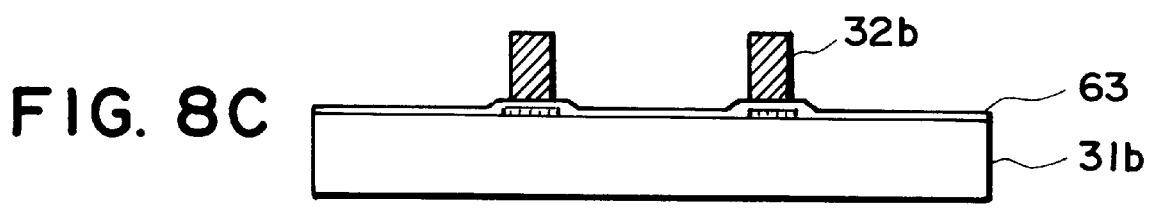
Figure 8D:
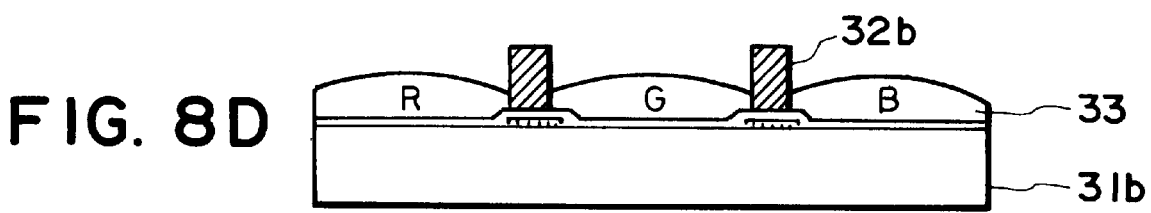
Figure 8E:
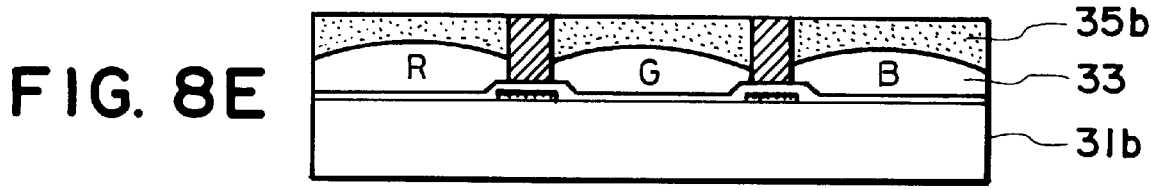
Figure 8F:
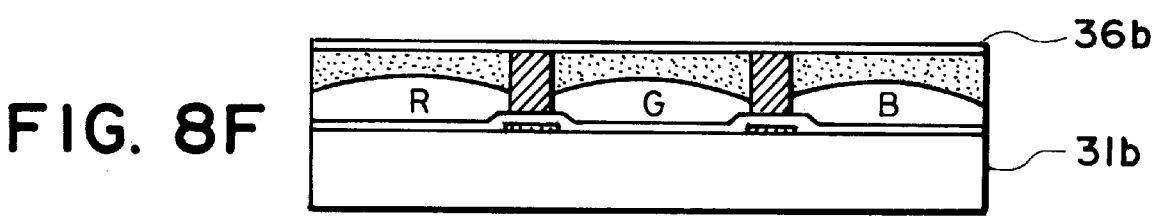

A liquid crystal device was prepared and evaluated in the same manner as in Example 4 except that the masking layer 61 was formed in the following manner and an additional step of forming an insulating layer 63 (shown in, e.g., FIG. 8C).

On a light-transmissive substrate 31b, a 800 Å-thick masking layer 61 of Cr was formed by sputtering and patterning through a photolithographic process (including etching). On the masking layer 61, a 1000 Å-thick insulating layer 63 of $SiO_2$ was formed by sputtering.

In this example, advantageous effects were achieved similarly as in Example 4.

EXAMPLE 6

A liquid crystal device was prepared and evaluated in the same manner as in Example 1 except that the electrode plate 30b was prepared through steps shown in FIGS. 9A to 10G in the following manner.

On a double side-polished blue plate glass substrate 31b (300×340×1.1 mm), a 2 μm-thick layer 70 of Al was formed by sputtering (FIG. 9A) and patterned in a width of 20 μm at a pitch of 300 μm by a photolithographic process including an etching step to form a plurality of auxiliary electrodes 32b.

More specifically, on the Al layer, a 1.8 μm-thick (after baking) positive photoresist ("HPR-1182", mfd. by Fuji Hunt Electronics Technology Co.) was applied and pre-baked at 100° C. for 30 min., followed by light-exposure with a photomask at an energy of 50 mJ/$cm^2$ by means of an exposure apparatus equipped with a ultra-high-pressure mercury vapor lamp (FIG. 9B) and dipping for 60 sec. in an MIF developer (mfd. by Fuji Hunt Electronics Technology Co.) to effect patterning of the photoresist (FIG. 9C).

Thereafter, the substrate 31b thus treated was dipped in a mixed acid (nitric acid/phosphoric acid/acetic acid) at 35° C. for 3 min., followed by washing with pure water and drying to effect etching of the Al layer, thus providing a plate as shown in FIG. 9D.

On the thus treated plate comprising the glass substrate 31b (provided with the auxiliary electrodes 32b and the photoresist layer 71 shown in FIG. 9D), a 1 μm-thick layer of an ink-receptive resin 52 comprising 5 g of hydroxypropyl cellulose ("HPL-H", mfd. by Nippon Soda K.K.) and 5 g of a methylol melamine derivative ("Sumitech M-3", mfd. by Sumitomo Kagaku Kogyo K.K.) was formed by spin coating (FIG. 9E), followed by pre-baking at 50° C. for 10 min. and dipping into ethyl cellosolve acetate for 3 min. to remove (lift off) the photoresist layer 71 and the resin 52 (FIG. 9F).

Figure 9G:
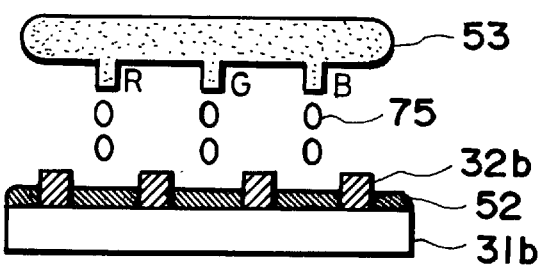
Figure 9H:
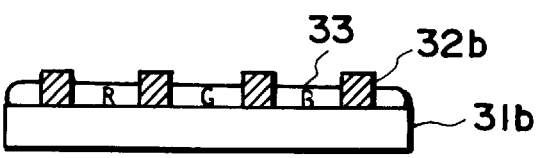

Then, the resin 52 was colored with a dye-based hydrophilic ink by using an ink jet image-forming apparatus and dried at 90° C. for 10 min., followed by post-baking at 200° C. for 1 Hr to form color filters 33 (FIGS. 9G and 9H).

On the surface (where the color filters 33 are formed) of the glass substrate 31b, a coupling treatment liquid comprising 1 wt. part of a silane coupling agent ("APZ-730", mfd. by Nippon Unicar K.K.) and 40 wt. parts of isopropyl alcohol was applied by spin coating, followed by heat-treatment in an oven at 150° C. for 20 min. to form a 1 μm-thick adhesive layer.

Figure 10A:
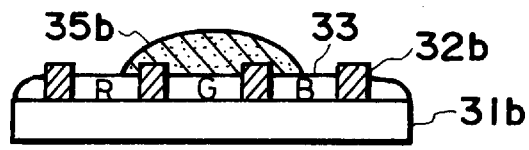

On the adhesive layer, an acrylic UV-curable resin 35b comprising a mixture of pentaerythritol triacrylate/neopentyl glycol diacrylate/1-hydroxycyclohexyl phenyl ketone (=50/50/2 by weight) was placed dropwise by using a dispenser (not shown) as shown in FIG. 10A.

Figure 10B:
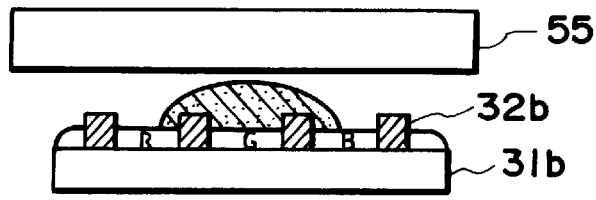
Figure 10C:
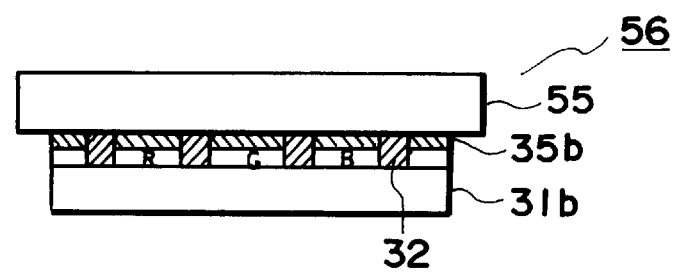
Figure 10D:
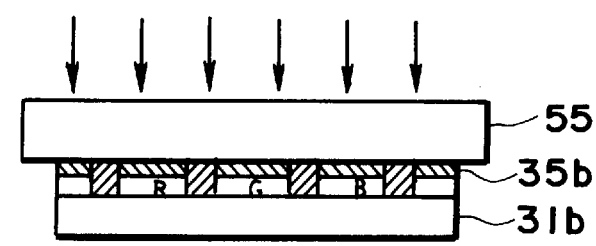

Further thereon, a smooth plate 55 (double side-polished blue plate glass; 300×340 mm) was gradually superposed so as not to generate air bubbles therebetween. Thereafter, the glass substrate 31b and the smooth plate 55 were pressed in a 30 ton press including a pair of pressing plates (400 mm square) each provided with a 3 mm-thick silicone rubber sheet under a pressure of ca. 5 kg/$cm^2$ at 60° C. (FIGS. 10B and 10C). The laminate 56 of the glass substrate 31b and the smooth plate 55, after taking out from the press, was irradiated with UV rays for 2 min. by using a UV ray irradiation apparatus including four 100 W-high pressure mercury vapor lamps to curve the UV-curable resin (FIG. 10D). At this time, the distance between the UV lamps and the laminate 56 was set to 10 cm.

Figure 10E:
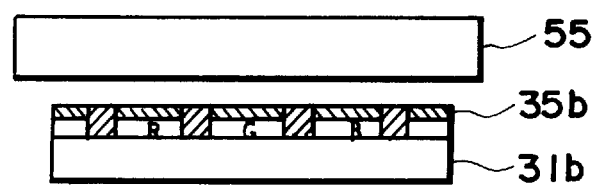
Figure 10F:
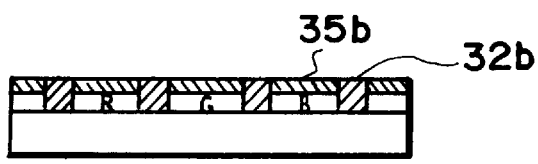
Figure 10G:
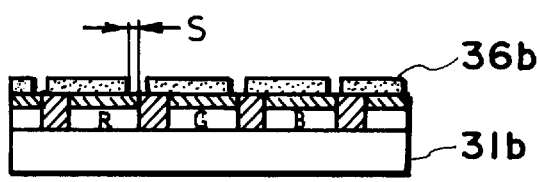

Then, the smooth plate 55 was removed from the glass substrate 31b by using a releasing tool (FIGS. 10E and 10F). The resultant (exposed surface provided on unevenness of at most 200 Å measured by a contact feeler (probe)-type unevenness-measuring apparatus.

On the auxiliary electrodes 32b and the UV-cured resin 35b formed on the glass substrate 31b, a 0.15 μm-thick ITO film was formed by sputtering, followed by patterning of the ITO film so as to be electrically connected to associated auxiliary electrodes 32b through a photolithographic-etching process to form a plurality of principal (transparent) electrodes 36b each having a width of 240 μm and a pitch of 300 μm (FIG. 10H).

In this example, the removal of the resin 52 remaining on the auxiliary electrodes 32b (via the photoresist layer 71) was readily performed without using the polishing apparatus, thus reducing the production cost.

Further, similar effects as in Example 1 were also achieved by the liquid crystal device and the production process thereof described in this example.

EXAMPLE 7

A liquid crystal device was prepared and evaluated in the same manner as in Example 6 except that an additional step of forming a masking layer 61 was performed in the same manner as in Example 4.

In this example, the surface formed by the auxiliary electrodes 32b and the UV-cured resin layer 35b provided an unevenness of at most 100 Å.

In addition, leakage of light from the spacings S between the principal electrodes 36b could be prevented by the above masking layer 61 to improve a contrast and display qualities. Further, when each electrode plate (30a, 30b) was subjected to measurement of an electrical resistance for all the patterned (stripe-shaped) electrodes, all the electrodes provided a lower electrical resistance of at most 300 ohm with respect to a length of 300 mm.

Further, it was also possible to have the above effects achieved in Example 6.

EXAMPLE 8

A liquid crystal device was prepared and evaluated in the same manner as in Example 6 except that an additional step of forming a masking layer 61 was performed in the same manner as in Example 5.

In addition, leakage of light from the spacings S between the principal electrodes 36b could be prevented by the above masking layer 61 to improve a contrast and display qualities. Further, when each electrode plate (30a, 30b) was subjected to measurement of an electrical resistance for all the patterned (stripe-shaped) electrodes, all the electrodes provided a lower electrical resistance of at most 300 ohm with respect to a length of 300 mm.

Further, it was also possible to have the above effects achieved in Example 6.

EXAMPLE 9

A liquid crystal device was prepared (through the steps shown in FIGS. 11A–11H) and evaluated in the same manner as in Example 6 except that color filters 93 were formed without using the ink-receptive layer 52 (shown in FIGS. 9E–9G) in the following manner.

Figure 11A:
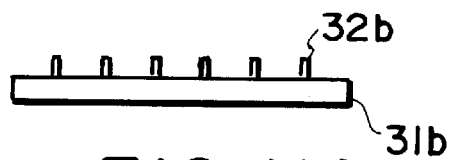
FIGS. 11A–11K are schematic sectional views for illustrating a series of steps involved in a process for producing a liquid crystal device in a fourth embodiment according to the present invention.
Figure 11G:
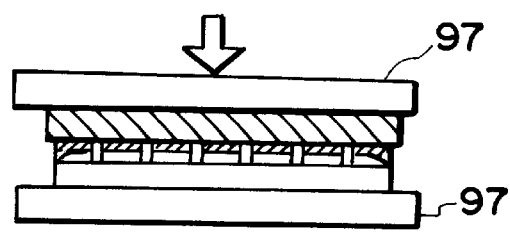
Figure 11B:
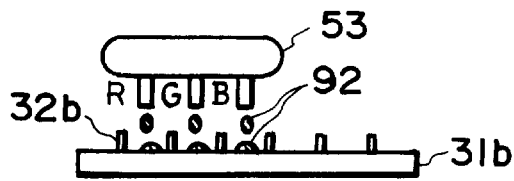
Figure 11H:
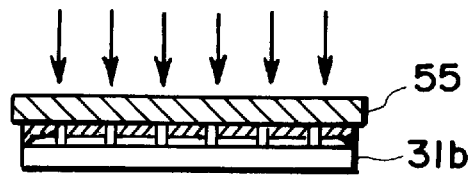
Figure 11C:
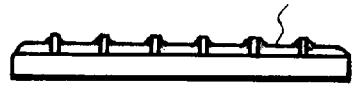
Figure 11I:
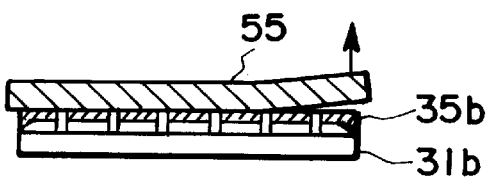
Figure 11D:
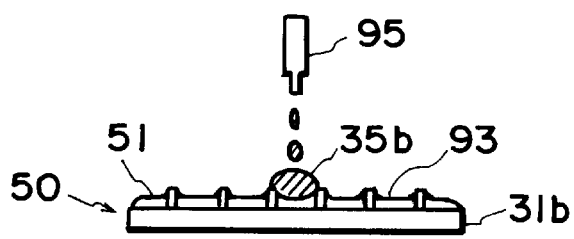
Figure 11J:
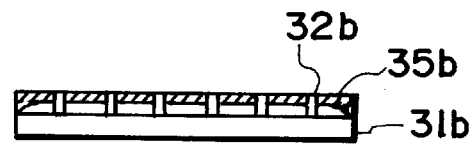
Figure 11E:
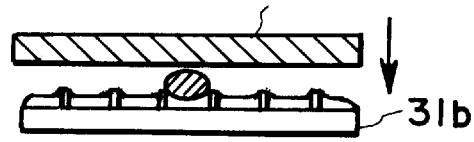
Figure 11K:
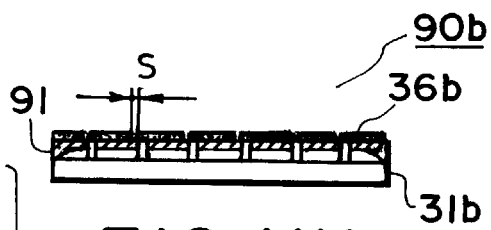
Figure 11F:
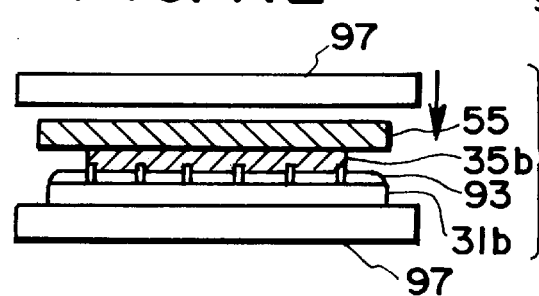

Then, the substrate 31b coated with the auxiliary electrodes 32b (FIG. 11A) was set in an ink jet image-forming apparatus (mfd. by Canon K.K.), followed by positioning of the substrate 31b and a head 53 of the apparatus (FIG. 11B). Thereafter, respective color inks (R, G and B) are injected from the head 53 to the corresponding portions on the surface of the light-transmissive substrate 31b at the spacings between the auxiliary electrodes 32b, followed by drying at 90° C. for 10 min. and post-baking at 200° C. to form 0.4 μm-thick color filters 93 of R, G and B (FIG. 11C).

The respective color inks for red (R), green (G) and blue (B) were prepared as follows.

Each color pigment having the composition shown below was dispersed in water in a sand mill and subjected to filtration with a 1 μm-aperture filter so as to provide particles having an average particle size of 0.01–0.4 μm in a proportion of 90% based on the entire particles.

(Red (R) pigment)

C.I. Pigment Red 168/C.I. Pigment Orange 36=23:8 (by weight)

(Green (G) pigment)

C.I. Pigment Green 36/C.I. Pigment Yellow 83 =15:4 (by weight)

(Blue (B) pigment)

C.I. Pigment Blue 60/C.I. Pigment Violet 23=9:3 (by weight)

Each color ink was prepared by mixing the following ingredients in the indicated proportions.

| Ingredients | Weight % |
| --- | --- |
| Ethylene glycol | 10 |
| Diethylene glycol | 15 |
| Pigment (R, G or B) | 4 |
| Styrene-maleic acid copolymer monoethanolamine salt (weight-average molecular weight = 30000, acid value = 300) | 0.6 |
| Water | 70.4 |

When each electrode plate (30a, 30b) was subjected to measurement of an electrical resistance for all the patterned (stripe-shaped) electrodes, all the electrodes provided a lower electrical resistance of at most 300 ohm with respect to a length of 300 mm.

Further, it was also possible to have the above effects achieved in Example 6.

EXAMPLE 10

A liquid crystal device was prepared and evaluated in the same manner as in Example 9 except that an additional step of forming a masking layer 61 was performed in the same manner as in Example 4.

In this example, leakage of light from the spacings S between the principal electrodes 36b could be prevented by the above masking layer 61 to improve a contrast and display qualities. Further, when each electrode plate (30a, 30b) was subjected to measurement of an electrical resistance for all the patterned (stripe-shaped) electrodes, all the electrodes provided a lower electrical resistance of at most 300 ohm with respect to a length of 300 mm.

Further, it was also possible to have the above effects achieved in Example 6.

EXAMPLE 11

A liquid crystal device was prepared and evaluated in the same manner as in Example 6 except that the electrode plate 30b was prepared through steps shown in FIGS. 12A to 13I in the following manner.

On a double side-polished blue plate glass substrate 31b (300×340×1.1 mm), a 3 μm-thick layer of Al was formed by sputtering (FIG. 9A) and patterned in a width of 20 μm at a pitch of 300 μm by a photolithographic process including an etching step to form a plurality of auxiliary electrodes 32b.

More specifically, on the Al layer, a photoresist was applied and pre-baked followed by light-exposure with a photomask to effect patterning of the photoresist.

Thereafter, the Al layer was etched with an etchant comprising a mixture of phosphoric acid and acetic acid to effect etching of the Al layer (FIG. 12A).

On the thus treated plate comprising the glass substrate 31b (provided with the auxiliary electrodes 32b), an ink-receptive resin 52 comprising 5 wt. parts of hydroxypropyl cellulose ("HPL-H", mfd. by Nippon Soda K.K.), 5 wt. parts of a methylol melamine derivative ("Sumitech M-3", mfd. by Sumitomo Kagaku Kogyo K.K.), and 50 wt. parts of isopropyl alcohol was formed by spin coating (FIG. 12B), followed by removal of the resin 52 remaining on the auxiliary electrodes 32b with a stainless steel-made doctor blade (400×40×0.1 mm) (FIGS. 12C and 12D or FIGS. 12E and 12F) and hot drying at 70° C. for 20 min. (FIG. 12G).

Figure 12H:
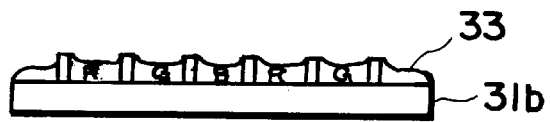

Then, the resin 52 was colored with a dye-based hydrophilic ink by using an ink jet image-forming apparatus and dried at 90° C. for 10 min., followed by post-baking at 200° C. for 1 Hr to form color filters 33 (FIG. 12H).

Figure 13A:
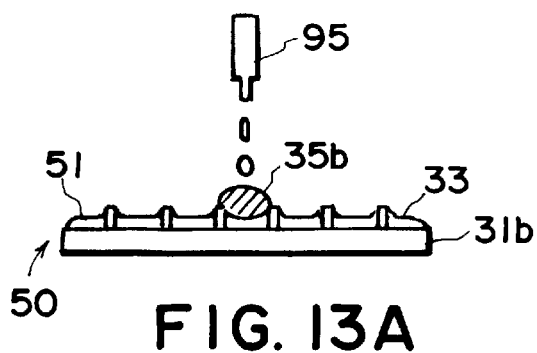

On the surface (where the color filters 33 are formed) of the glass substrate 31b, a two-component, epoxy resin 35b ("No. 1565", mfd. by Cemedine Co., Ltd.) was placed dropwise by using a dispenser 95 as shown in FIG. 13A.

Figure 13E:
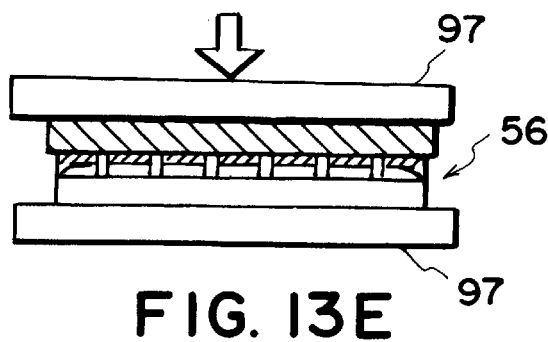
Figure 13B:
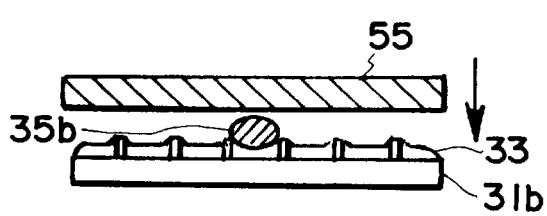
Figure 13F:
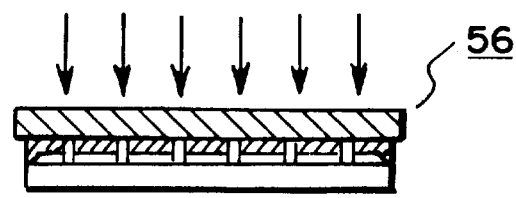
Figure 13C:
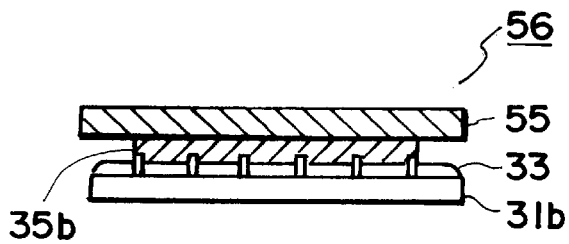
Figure 13G:
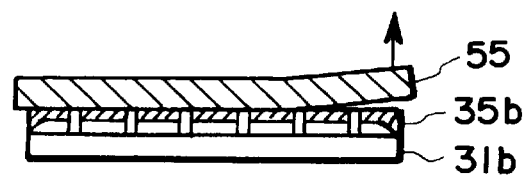
Figure 13H:
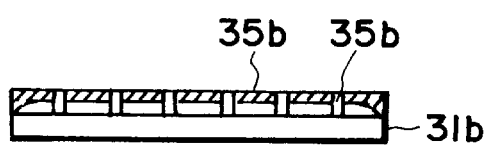
Figure 13D:
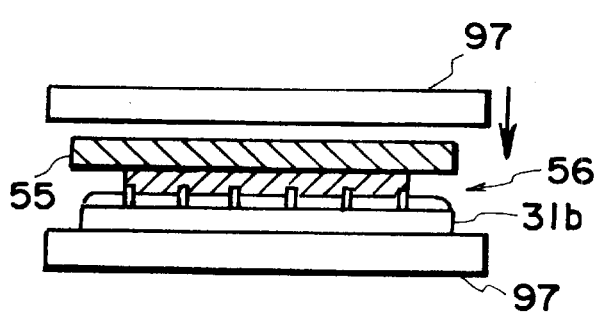
Figure 13I:
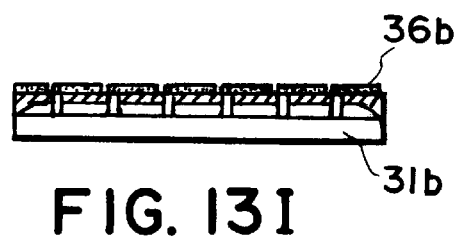

Further thereon, a smooth plate 55 (double side-polished blue plate glass; 300×340×1.1 mm) coated with a layer of release agent ("KBM-7803", mfd. by Shin-Etsu Kagaku K.K.) by spin coating was gradually superposed so as not to generate air bubbles therebetween (FIGS. 12B and 12C). Thereafter, the glass substrate 31b and the smooth plate 55 were pressed in a 30 ton press including a pair of pressing plates 97 (400 mm square) each provided with a silicone rubber sheet under a pressure of ca. 5 kg/cm$^2$ at 140° C. for 15 min. to cure the epoxy resin 35b (FIGS. 13D and 13E).

The subsequent steps were performed in the similar manner as in Example 6 to prepare a liquid crystal device.

When each electrode plate (30a, 30b) was subjected to measurement of an electrical resistance for all the patterned (stripe-shaped) electrodes, all the electrodes provided a lower electrical resistance of at most 300 ohm with respect to a length of 300 mm.

Further, it was also possible to have the above effects achieved in Example 6.

EXAMPLE 12

A liquid crystal device was prepared and evaluated in the same manner as in Example 6 except that the electrode plate 30b was prepared through steps shown in FIGS. 21A to 21D in the following manner.

On a double side-polished blue plate glass substrate 31b (300×340×1.1 mm), a 3 $\mu$m-thick layer of Al was formed by sputtering and patterned in a width of 20 $\mu$m at a pitch of 300 $\mu$m by a photolithographic process including an etching step to form a plurality of auxiliary electrodes 32b.

More specifically, on the Al layer, a 1.5 $\mu$m-thick (after baking) water-repellent photoresist (critical surface tension $\delta c$=28 dyn/cm$^2$) comprising a mixture of 100 wt. parts of positive photoresist ("AZ6112", mfd. by Hoechst Japan K.K.) and 2 wt. parts ("KBM 7803", mfd. by Shin-Etsu Kagaku K.K.) was applied and pre-baked at 100° C. for 30 min., followed by light-exposure with a photomask at an energy of 50 mJ/cm$^2$ by means of an exposure apparatus equipped with a ultra-high-pressure mercury vapor lamp and dipping for 60 sec. in an MIF developer to effect patterning of the photoresist).

Thereafter, the substrate 31b thus treated was dipped in a mixed acid (nitric acid/phosphoric acid/acetic acid) at 35° C. for 3 min., followed by washing with pure water and drying to effect etching of the Al layer, thus providing a plate as shown in FIG. 21B.

On the thus treated plate comprising the glass substrate 31b (provided with the auxiliary electrodes 32b and the photoresist layer 101 shown in FIG. 21B), a layer of an ink-receptive resin 52 identical to that used in Example 11 was formed by spin coating, followed by pre-baking at 70° C. for 20 min.

Then, the resin 52 was colored by using an ink jet image-forming apparatus and dipped into ethylcellosolve acetate for 3 min. to remove the photoresist layer 101, followed by drying at 90° C. for 10 min. and post-baking at 200° C. for 1 Hr to form color filters 33 (FIGS. 21C and 21D).

On the surface (where the color filters 33 are formed) of the glass substrate 31b, a coupling treatment liquid comprising a silane coupling agent ("APZ-730", mfd. by Nippon Unicar K.K.) diluted with isopropyl alcohol was applied by spin coating, followed by heat-treatment in an oven at 150° C. for 20 min. to form a 0.1 $\mu$m-thick adhesive layer.

On the adhesive layer, an acrylic UV-curable resin 35b comprising a mixture of pentaerythritol triacrylate/ neopentyl glycol diacrylate/1-hydroxycyclohexyl phenyl ketone (=50/50/2 by weight) was placed dropwise by using a dispenser (not shown).

Further thereon, a smooth plate 55 (double side-polished blue plate glass; 300×340 mm) was gradually superposed so as not to generate air bubbles therebetween. Thereafter, the glass substrate 31b and the smooth plate 55 were pressed in a 30 ton press including a pair of pressing plates (400 mm square) each provided with a 3 mm-thick silicone rubber sheet under a pressure of ca. 5 kg/cm$^2$ at 60° C. for 5 min. The laminate 56 of the glass substrate 31b and the smooth plate 55, after taking out from the press, was irradiated with UV rays for 2 min. by using a UV ray irradiation apparatus including four 100 W-high pressure mercury vapor lamps to curve the UV-curable resin. At this time, the distance between the UV lamps and the laminate 56 was set to 10 cm.

Then, the smooth plate 55 was removed from the glass substrate 31b by using a releasing tool.

On the auxiliary electrodes 32b and the UV-cured resin 35b formed on the glass substrate 31b, a 0.15 $\mu$m-thick ITO film was formed by sputtering, followed by patterning of the ITO film so as to be electrically connected to associated auxiliary electrodes 32b through a photolithographic-etching process to form a plurality of principal (transparent) electrodes 36b each having a width of 240 $\mu$m and a pitch of 300 $\mu$m.

When each electrode plate (30a, 30b) was subjected to measurement of an electrical resistance for all the patterned (stripe-shaped) electrodes, all the electrodes provided a lower electrical resistance of at most 300 ohm with respect to a length of 300 mm, thus preventing the voltage waveform distortion.

Further, it was also possible to have the above effects achieved in Example 6.

EXAMPLE 13

A liquid crystal device was prepared and evaluated in the same manner as in Example 12 except that the removal of the water-repellent photoresist layer 101 was performed before the coloring of the ink-receptive resin 52 as shown in FIGS. 21E and 21D.

In this example, the coloring of the resin 52 was conducted after the removal of the photoresist 101, whereby a change in color of the color filters 33 could be prevented, thus resulting in the color filters 33 excellent in color reproducibility.

When each electrode plate (30a, 30b) was subjected to measurement of an electrical resistance for all the patterned (stripe-shaped) electrodes, all the electrodes provided a lower electrical resistance of at most 300 ohm with respect to a length of 300 mm, thus preventing the voltage waveform distortion.

Further, it was also possible to have the above effects achieved in Example 6.

EXAMPLE 14

A liquid crystal device was prepared and evaluated in the same manner as in Example 6 except that the electrode plate 30b was prepared through steps shown in FIGS. 14A to 15F in the following manner.

On a double side-polished blue plate glass substrate 31b (300×310×1.1 mm), a 2 μm-thick layer of Al was formed by sputtering and patterned in a width of 20 μm at a pitch of 320 μm by a photolithographic process including an etching step to form a plurality of auxiliary electrodes 32b (FIG. 14A).

On the light-transmissive substrate 31b, a 1 μm-thick (after baking) layer 110 of an acrylic photosensitive resin ("V-259PA", mfd. by Shin-Nittetsu Kagaku K.K.) was formed by spin coating and pre-baked at 80° C. for 10 min. (FIG. 14B), followed by light-exposure from the outside of the light-transmissive substrate 31b opposite to the layer 110 side by means of a high-pressure mercury vapor lamp (FIG. 14C).

Thereafter, the photosensitive resin 110 was developed with a developer ($Na_2CO_3$ aqueous solution) to dissolve and remove an un-exposure part of the resin 110, followed by rinse treatment with pure water, thus providing a plate as shown in FIG. 14D wherein the resin 110 was disposed only at the spacings between the auxiliary electrodes 32b.

Figure 14E:
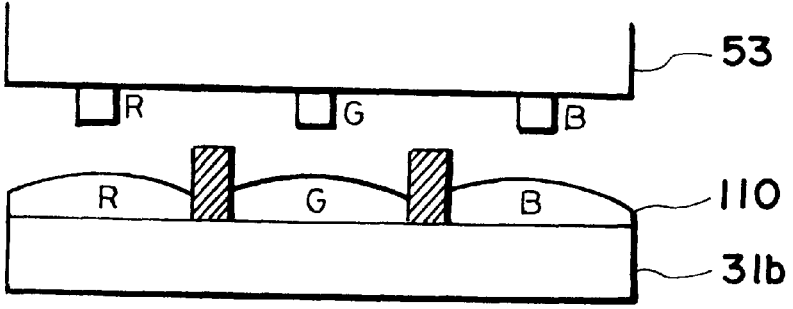
Figure 14F:
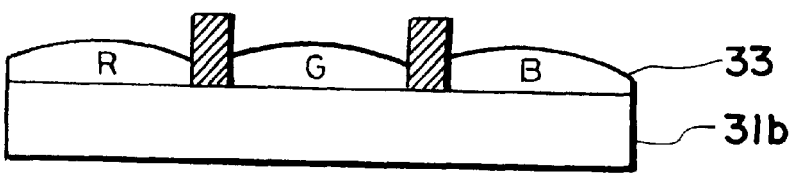

Then, the photosensitive resin 110 was colored by using an ink jet image-forming apparatus and dipped into ethyl-cellosolve acetate for 3 min. to remove the photoresist layer 101, followed by drying at 90° C. for 10 min. and post-baking at 200® C. for 1 Hr to form color filters 33 (FIGS. 14E and 14F).

On the surface (where the color filters 33 are formed) of the glass substrate 31b, a coupling treatment liquid comprising 1 wt. part of a silane coupling agent ("APZ-730", mfd. by Nippon Unicar K.K.) diluted with 40 wt. parts of ethyl alcohol was applied by spin coating, followed by heat-treatment in an oven at 150° C. for 20 min. to form an adhesive layer.

Figure 14G:
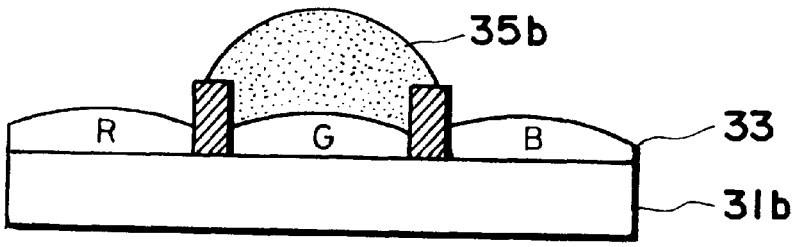

On the adhesive layer, an acrylic UV-curable resin 35b comprising a mixture of pentaerythritol triacrylate/ neopentyl glycol diacrylate/1-hydroxycyclohexyl phenyl ketone (=50/50/2 by weight) was placed dropwise by using a dispenser (not shown) as shown in FIG. 14G.

Figure 15A:
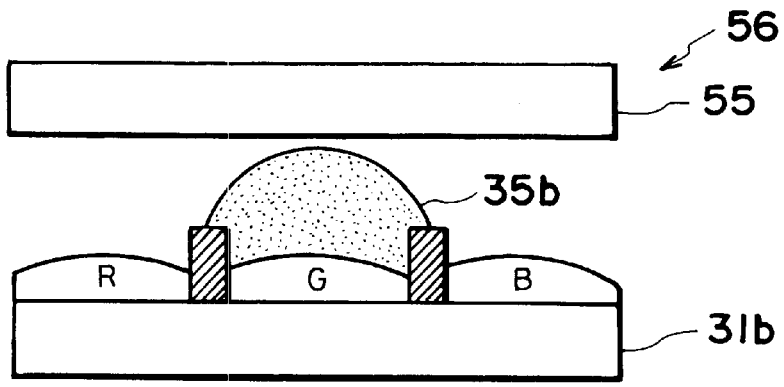
Figure 15B:
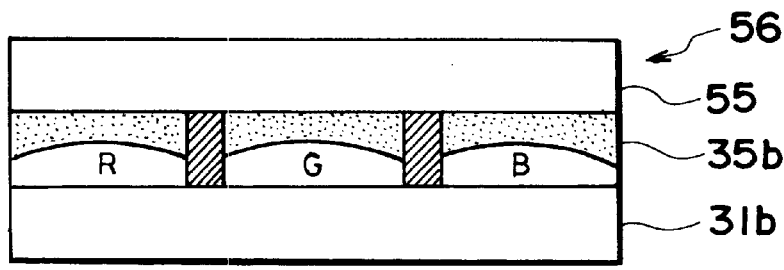
Figure 15C:
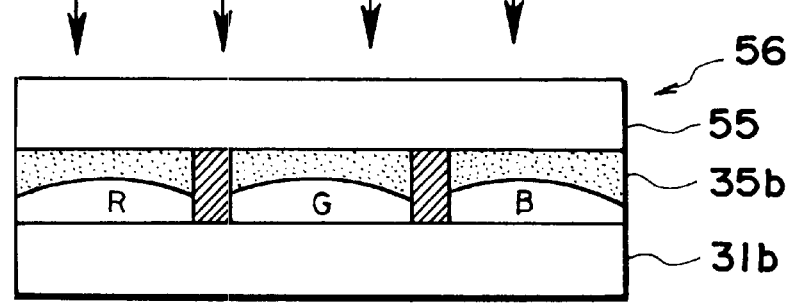
Figure 15D:
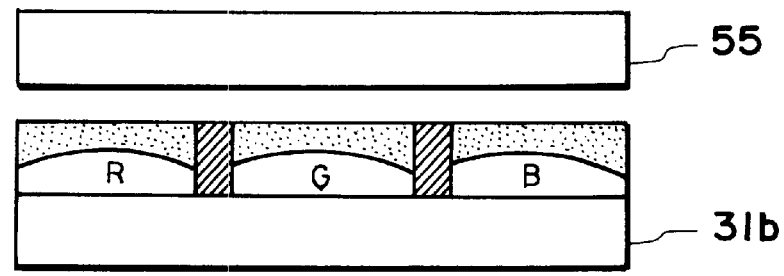
Figure 15E:
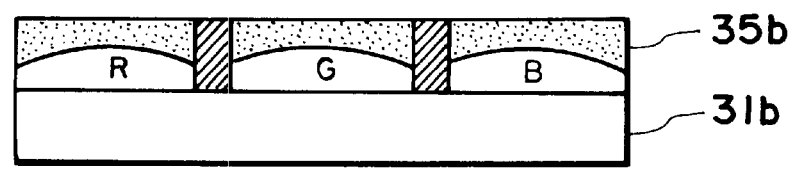
Figure 15F:
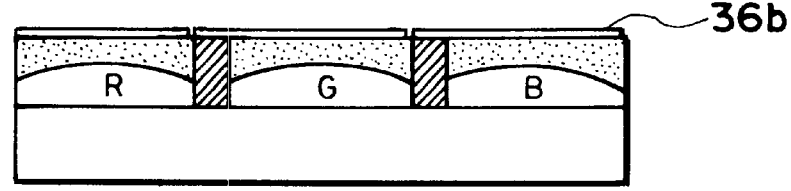

Further thereon, a smooth plate 55 (double side-polished blue plate glass; 300×310 mm) was gradually superposed so as not to generate air bubbles therebetween. Thereafter, the glass substrate 31b and the smooth plate 55 were pressed in a 1 ton roller press under a pressure of 700 kg at a feed rate of 30 cm/min. (FIGS. 15A and 15B). The laminate 56 of the glass substrate 31b and the smooth plate 55, after taking out from the roller press, was irradiated with UV rays for 2 min. by using a UV ray irradiation apparatus including four 100 W-high pressure mercury vapor lamps to curve the UV-curable resin (FIG. 15D). At this time, the distance between the UV lamps and the laminate 56 was set to 10 cm.

The subsequent steps (including those shown in FIGS. 15D–15F) was performed in the same manner as in Example 6 to prepare a liquid crystal device.

In this example, the removal of the resin 110 remaining on the auxiliary electrodes 32b was readily performed thus reducing the production cost.

Further, similar effects as in Example 6 were also achieved by the liquid crystal device and the production process thereof described in this example.

EXAMPLE 15

A liquid crystal device was prepared and evaluated in the same manner as in Example 14 except that the formation of the photosensitive layer 110 and the removal thereof remaining on the auxiliary electrodes 32b were performed in the following manner.

On the light-transmissive substrate provided with the auxiliary electrodes 32b as shown in FIG. 14A, a 1 μm-thick layer 110 of aromatic polyamide-based photosensitive resin ("PA-1000C", mfd. by Ube Kosan K.K.) was formed by spin coating and pre-baked at 80° C. for 10 min. (FIG. 14B), followed by exposure to light with a high-pressure mercury vapor lamp from the outside the light-transmissive substrate 31b opposite to the resin layer 110 side (FIG. 14C), ultrasonic development with a developer (comprising δ-butyrolactone as a main component) to dissolve and remove an un-exposure part of the photosensitive resin 110, and rinse treatment with a rinse liquid (comprising ethyl-cellosolve as a main component).

When the surface of the thus-treated auxiliary electrodes 32b was observed through a microscope, no photosensitive resin 110 remaining on the auxiliary electrode surface was confirmed.

In this example, it was also possible to have the above effects achieved in Example 14.

EXAMPLE 16

A liquid crystal device was prepared and evaluated in the same manner as in Example 14 except that an additional step of forming a masking layer 61 (as shown in FIG. 6) was performed before the formation of the auxiliary electrodes 32b.

The masking layer 61 was formed in the following manner.

On a light-transmissive substrate 31b, a photosensitive resin ("Resin BM", mfd. by Shin-Nittetsu Kagaku K.K.) was applied by spin coating, followed by pre-baking at 80° C. for 10 min. Then, the thus-treated light-transmissive substrate 31b was subjected to exposure to light and shower development using a particular developer liquid for 10 sec., followed by post-baking at 200° C. for 30 min. to form a masking layer 61.

In this example, it was also possible to obtain similar effects as in Example 14.

In addition, leakage of light from the spacings S between the principal electrodes 36b could be prevented by the above masking layer 61 to improve a contrast.

EXAMPLE 17

A liquid crystal device was prepared and evaluated in the same manner as in Example 14 except that the masking layer 61 was formed in the following manner and an additional step of forming an insulating layer 63 (shown in, e.g., FIG. 8C).

On a light-transmissive substrate 31b, a 800 Å-thick masking layer 61 of Cr was formed by sputtering and patterning through a photolithographic process (including etching). On the masking layer 61, a 1000 Å-thick insulating layer 63 of $SiO_2$ was formed by sputtering.

In this example, advantageous effects were achieved similarly as in Example 14.

EXAMPLE 18

A liquid crystal device (shown in FIG. 16) was prepared and evaluated in the same manner as in Example 1 except that the electrode plate 30b was prepared through steps shown in FIGS. 17 to 19 in the following manner.

On a light-transmissive substrate of blue plate glass 122b (300×310×1.1 mm) which has been subjected to double-side polishing, an 800 Å-thick Cr layer was formed by sputtering, followed by patterning through a photolithographic process (including etching) to form a masking layer 123 (FIG. 17A).

Thereafter, on the light-transmissive substrate 122b provided with the masking layer 123, a 2 μm-thick layer of a resin 130 comprising 5 g of hydroxypropyl cellulose ("HPL-H", mfd. by Nippon Soda K.K.) and 5 g of a methylol melamine derivative ("Sumitech M-3", mfd. by Sumitomo Kagaku Kogyo K.K.) was formed by spin coating, followed by pre-baking at 90° C. for 10 min. (FIG. 17B).

The resin layer 130 was subjected to pattern exposure to light with a photomask at an energy of 1 J/cm² so as to cure masked portions 131 of the resin layer 130, thus causing the masked portions 131 to loss their ink-receptivity (ink-absorptivity) (FIG. 17C).

Figure 17D:
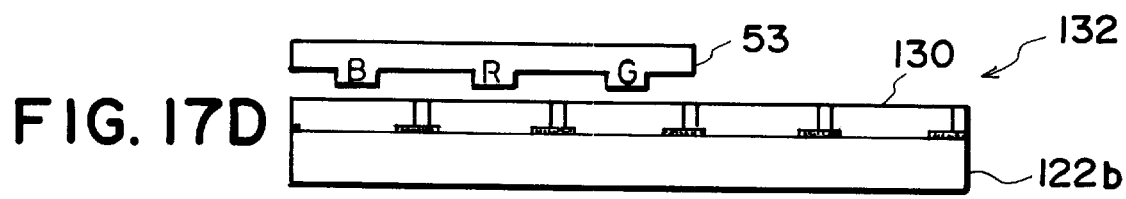
Figure 17E:
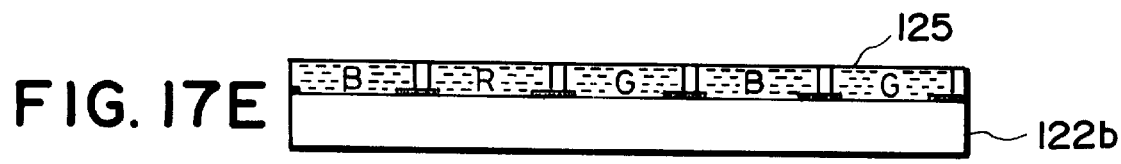

Then, the thus-treated resin layer 130 was colored with respective color inks for R, G and B (each comprising a dye, ethylene glycol, isopropyl alcohol and ion exchange water) by using an ink jet image-forming apparatus having a head portion 53 to form color filters 125 (FIGS. 17D and 17E).

The dye for red color ink comprised C.I. Acid Red 118, the dye for green color ink comprised C.I. Acid Green 25, and the dye for blue color ink comprised C.I. Acid Blue 113.

Figure 17F:
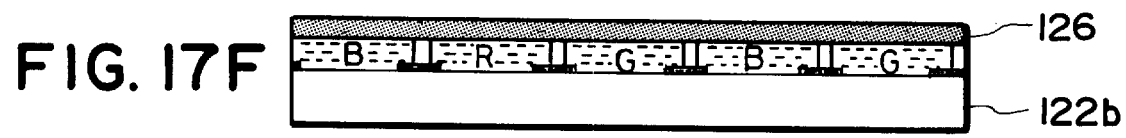

On the surface of the color filters 125, a 1 μm-thick protective layer of a thermosetting resin ("Hicoat LC-2001", mfd. by Sanyo Kasei Kogyo K.K.) was formed by spin coating and heat-treated at 200° C. for 1 hour (FIG. 17F).

Figure 17G:
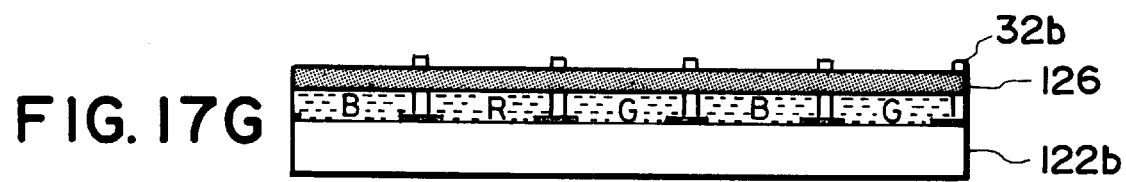

On the protective layer 126, a 2 μm-thick layer of Al was formed by sputtering and patterned in a width of 20 μm at a pitch of 320 μm by a photolithographic process including an etching step to form a plurality of auxiliary electrodes 32b as shown in FIG. 17G.

On the surface (where the auxiliary electrodes 32b were formed) of the glass substrate 122b, a coupling treatment liquid comprising 1 wt. part of a silane coupling agent ("APZ-730", mfd. by Nippon Unicar K.K.) and 40 wt. parts of ethyl alcohol was applied by spin coating, followed by heat-treatment in an oven at 150° C. for 20 min.

On the thus-treated surface of the protective layer 126 (provided with the auxiliary electrodes 32b), an acrylic UV-curable resin 35b comprising a mixture of pentaerythritol triacrylate/neopentyl glycol diacrylate/1-hydroxycyclohexyl phenyl ketone (=50/50/2 by weight) was placed dropwise by using a dispenser (FIG. 18A).

Further thereon, a smooth plate 55 (double side-polished blue plate glass; 300×310 mm) was gradually superposed so as not to generate air bubbles therebetween (FIGS. 18B and 18C). Thereafter, the glass substrate 31b and the smooth plate 55 were pressed in a 1 ton roller press under a pressure of 700 kg at a feed rate of 30 cm/min. The laminate 133 of the glass substrate 122b and the smooth plate 55, after taking out from the roller press, was irradiated with UV rays for 2 min. by using a UV ray irradiation apparatus including four 100 W-high pressure mercury vapor lamps to curve the UV-curable resin 35b (FIG. 18D).

Then, the smooth plate 55 was removed from the glass substrate 122b by using a releasing tool (FIGS. 18E and 18F).

On the auxiliary electrodes 32b and the UV-cured resin 35b formed on the glass substrate 122b, an ITO film was formed by sputtering, followed by patterning of the ITO film so as to be electrically connected to associated auxiliary electrodes 32b through a photolithographic-etching process to form a plurality of principal (transparent) electrodes 36b each having a width of 300 μm and a pitch of 320 μm (FIG. 18G).

The subsequent steps were performed in the similar manner as in Example 1 to prepare a liquid crystal device.

In this embodiment, it was possible to have the above-described effects achieved in Example 1.

Further, leakage of light through the spacings between the principal electrodes 36b was prevented by the masking layer 123 and reflection of external light (light issued from the viewer side) was also suppressed by the masking layer 123 and the color filters 125, thus providing a high contrast of at least 100.

EXAMPLE 19

A liquid crystal device was prepared and evaluated in the same manner as in Example 18 except that color filters 125(R), 125(G) and 125(B) were formed through the steps shown in FIGS. 20A–20H.

On the light-transmissive substrate 122b provided with the masking layer 123, a photosensitive resin solution 160G containing a blue pigment was applied by spin coating and pre-baked at 70° C. for 30 min. (FIG. 20A), followed by partial exposure to light with a photomask by using a high-pressure mercury vapor lamp (FIG. 20B).

Thereafter, the thus-treated photosensitive resin layer 160G was developed with a developer (comprising N-methyl-2-pyrrolidone as a main component) and ultra-sonic wave in combination to dissolve an un-exposed portion of the resin layer 160G, followed by rinse treatment with a rinse liquid (comprising 1,1,1-trichloroethane as a main component) and post-baking at 150° C. for 30 min. to form a 1.5 μm-thick green color filter 125(G) (FIG. 20C).

In a similar manner, a red color filter 125(R) and a blue color filter 125(G) were successively formed.

In this step, the photosensitive resin solution 160G for green comprised a 10%-solution of a photosensitive resin in N-methyl-2-pyrrolidone ("PA-1000", mfd. by Ube Kosan K.K.) and a green pigment ("Lionol Green GYK" (C.I. No. 74265), mfd. by Toyo Inki Seizo K.K.) dispersed therein in a ratio of pigment:resin=1:2. The photosensitive resin solution for red comprised a 10%-solution of a photosensitive resin in N-methyl-2-pyrrolidone ("PA-1000", mfd. by Ube Kosan K.K.) and a red pigment ("Irgagin Red BRT" (C.I. No. 71127), mfd. by Ciba-Geigy Corp.) dispersed therein in a ratio of pigment:resin=1:2. The photosensitive resin solution for blue comprised a 10%-solution of a photosensitive resin in N-methyl-2-pyrrolidone ("PA-1000", mfd. by Ube Kosan K.K.) and a blue pigment ("Heliogen Blue L7080" (C.I. No. 74160), mfd. by BASF Co.) dispersed therein in a ratio of pigment:resin=1:2.

The subsequent steps were performed in the similar manner as in Example 18 to prepare a liquid crystal device.

In this embodiment, it was possible to have the above-described effects achieved in Example 18.

EXAMPLE 20

A liquid crystal device was prepared and evaluated in the same manner as in Example 18 except that:
(a) a pair of electrode plates 120a and 120b were respectively provided with a 100 Å-thick polyimide film ("LQ1802", mfd. by Hitachi Kasei Kogyo K.K.) formed by printing and subjected to rubbing so that their rubbing axes were directed in an identical direction,
(b) the particle size (2.0 μm) of silica beads was changed to 1.5 μm, and (c) the liquid crystal composition (Composition X) was changed to a ferroelectric liquid crystal ("CS1014", mfd. by Chisso K.K.).

In this example, it was also possible to have the above-described effects achieved in Example 18.

EXAMPLE 21

A liquid crystal device was prepared and evaluated in the same manner as in Example 19 except that:

(a) a pair of electrode plates 120a and 120b were respectively provided with a 100 Å-thick polyimide film ("LQ1802", mfd. by Hitachi Kasei Kogyo K.K.) formed by printing and subjected to rubbing so that their rubbing axes were directed in an identical direction, (b) the particle size (2.0 μm) of silica beads was changed to 1.5 μm, and (c) the liquid crystal composition (Composition X) was changed to a ferroelectric liquid crystal ("CS1014", mfd. by Chisso K.K.).

In this example, it was also possible to have the above-described effects achieved in Example 19.

EXAMPLE 22

A liquid crystal device (including a pair of electrode plates 120a and 120b as shown in FIG. 16) was prepared in the same manner as in Example 20.

By using this liquid crystal device, display images were observed from the outside the (upper) electrode plate 120a on condition that a backlight unit (light source) was disposed outside the (lower) electrode plate 120b opposite to the arrangement shown in FIG. 16 (as in Example 20).

As a result, the contrast (at least 100 in Example 20) was lowered to 50 under the influence of reflection light from not only the boundary between the light-transmissive substrate 122a and the auxiliary electrodes 32a but also the side wall of the auxiliary electrodes 32a due to the thicker auxiliary electrodes 32a (2 μm in thickness).

In this case, when a masking layer was formed between the light-transmissive substrate 122a and the auxiliary electrodes 32a, a resultant contrast was increased to 90 but a resultant light transmittance was lowered due to a decrease in effective optical modulation area resulting from the additional masking layer. The formation of such an additional masking layer induced an increase in production cost (e.g., 2 times that in Example 20 with respect to the production of the electrode plate 120a and 1.5 times that in Example 20 with respect to the production of the liquid crystal device).

What is claimed is:

1. A liquid crystal device, comprising: a pair of electrode plates and a liquid crystal composition disposed between the electrode plates, wherein one of the electrode plates comprises a light-transmissive substrate, a plurality of electrodes including principal electrodes and auxiliary electrodes supported on the light-transmissive substrate, a plurality of color filters disposed on the light-transmissive substrate and an insulating layer disposed on the color filters; each auxiliary electrode being disposed between an associated principal electrode and the light-transmissive substrate so as to be electrically connected with at least a part of the associated principal electrode, and the auxiliary electrodes being disposed with spacings therebetween which are filled with the color filters and the insulating layer, each said auxiliary electrode and the insulating layer together form a substantially flat surface so that the associated principal electrode is disposed as a substantially flat film on the auxiliary electrode and the insulating layer, said auxiliary electrode exhibiting a volume resistivity lower than that of the associated principal electrode, and the liquid crystal composition comprises at least one species of a fluorine-containing mesomorphic compound comprising a fluorocarbon terminal portion and a hydrocarbon terminal portion, the terminal portions being connected with a central core, and having smectic mesophase or latent smectic mesophase.

2. A device according to claim 1, wherein said fluorocarbon terminal portion in the fluorine-containing mesomorphic compound is represented by the formula —$D^1$—$C_{xa}F_{2xa}$—X, where xa is 1–20; X is —H or —F; —$D^1$— is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N$(C_{pa}H_{2pa+1})$—$SO_2$— or —$(CH_2)_{ra}$—N$(C_{pa}H_{2pa+1})$—CO— where ra and rb are independently 1–20; and pa is 0–4.

3. A device according to claim 1, wherein said fluorocarbon terminal portion in the fluorine-containing mesomorphic compound is represented by the formula —$D^2$—$(C_{xb}F_{2xb}$—O$)_{za}$—$C_{ya}F_{2ya+1}$, where xb is independently 1–10 for each ($C_{xb}F_{2xb}$—O); ya is 1–10; za is 1–10; —$D^2$— is —CO—O—$C_{rc}H_{2rc}$, —O—$C_{rc}H_{2rc}$—, —$C_{rc}H_{2rc}$—, —O—($C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N$(C_{pb}H_{2pb+1})$—$SO_2$—, —$C_{rc}H_{2rc}$—N$(C_{pb}H_{2pb+1})$—CO—, or a covalent bond where rc and rd are independently 1–20; sa is independently 1–10 for each ($C_{sa}H_{2sa}$—O); ta is 1–6; and pb is 0–4.

4. A device according to claim 1, wherein said fluorine-containing mesomorphic compound is represented by the following general formula (I):

Formula (I):

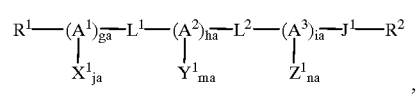

wherein $A^1$, $A^2$ and $A^3$ are each independently

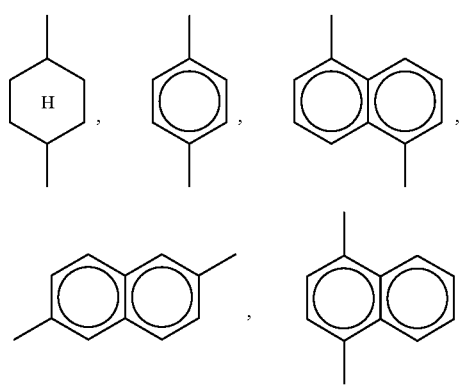

-continued

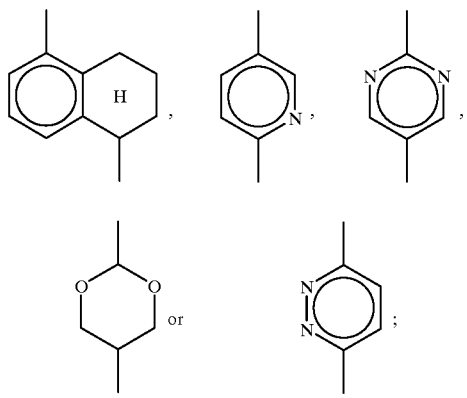

ga, ha and ia are independently an integer of 0–3 with the proviso that the sum of ga+ha+ia be at least 2;

$L^1$ and $L^2$ are independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —OCH$_3$, —CH$_3$, —CN or —NO$_2$;

each ja, ma and na are independently an integer of 0–4;

$J^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO— where ra and rb are independently 1–20, and pa is 0–4;

$R^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{2qa}$—R$^3$, —CO—O—C$_{qa}$H$_{2qa}$— R$^3$, or —O—CO—C$_{qa}$H$_{2qa}$—R$^3$ which may be either straight chain or branched where $R^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20; and $R^2$ is C$_{xa}$F$_{2xa}$—X, wherein X is —H or —F, xa is an integer of 1–20.

5. A device according to claim 1, wherein said fluorine-containing mesomorphic compound is represented by the general formula (II):

Formula (II):

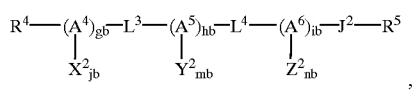

where $A^4$, $A^5$ and $A^6$ are each independently denote

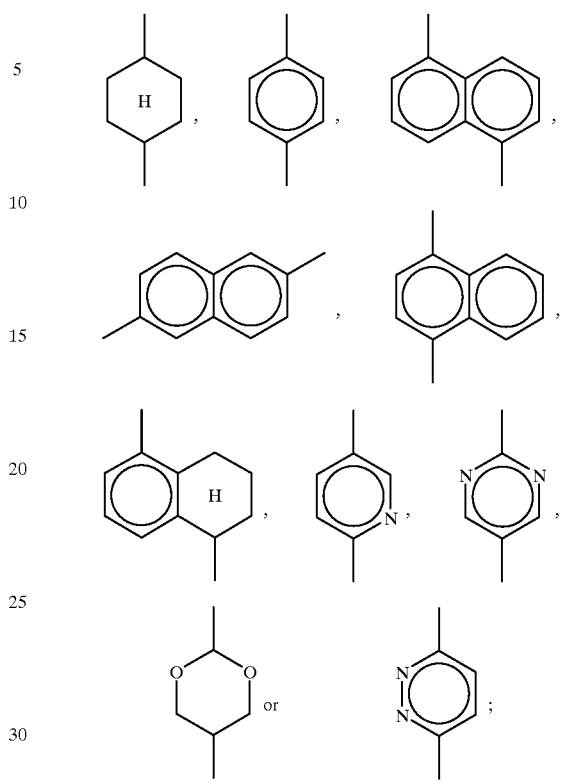

gb, hb and ib are each independently an integer of 0–3 with the proviso that the sum of gb+hb+ib be at least 2;

each $L^3$ and $L^4$ are independently a single bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X^2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO— where rc and rd are independently 1–20; sa is independently 1–10 for each (C$_{sa}$H$_{2sa}$—O), ta is 1–6; pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched where R is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently 1–20; wa is 1–10; and $R^5$ is (C$_{xb}$F$_{2xb}$—O)$_{za}$—C$_{ya}$F$_{2ya+1}$, where xb is independently 1–10 for each (C$_{xb}$F$_{2xb}$—O); ya is 1–10; and za is 1–10.

6. A device according to claim 1, wherein the insulating layer comprises a polymeric material.

7. A device according to claim 6, wherein the polymeric material comprises a ultraviolet-cured resin.

8. A device according to claim 1, wherein the principal electrodes comprise transparent electrodes.

9. A device according to claim 1, the principal electrodes comprise a film of indium tin oxide.

10. A device according to claim 1, wherein said one of the electrode plates further comprises a masking member including a plurality of masking portions disposed on the light-transmissive substrate, each masking portion being disposed so as to correspond to a spacing between associated adjacent principal electrodes.

11. A device according to claim 1, wherein the auxiliary electrodes comprise a layer of a metal or an alloy.

12. A device according to claim 1, wherein the auxiliary electrodes contain a metal selected from the group consisting of copper, silver, aluminum, chromium, molybdenum, tantalum and nickel.

13. A liquid crystal device, comprising: a pair of electrode plates and a liquid crystal composition disposed between the electrode plates, wherein one of the electrode plates comprises a light-transmissive substrate, a plurality of color filters disposed on the light-transmissive substrate, a protective layer disposed on the color filters, a plurality of electrodes including principal electrodes and auxiliary electrodes supported on the protective layer, and an insulating layer disposed on the protective layer; each auxiliary electrode being disposed between an associated principal electrode and the protective layer so as to be electrically connected with at least a part of the associated principal electrode, and the auxiliary electrodes being disposed with spacings therebetween which are filled with the color filters and the insulating layer, each said auxiliary electrode and the insulating layer together form a substantially flat surface so that the associated principal electrode is disposed as a substantially flat film on the auxiliary electrode and the insulating layer, said auxiliary electrode exhibiting a volume resistivity lower than that of the associated principal electrode, and the liquid crystal composition comprises at least one species of a fluorine-containing mesomorphic compound comprising a fluorocarbon terminal portion and a hydrocarbon terminal portion, the terminal portions being connected with a central core, and having smectic mesophase or latent smectic mesophase.

14. A device according to claim 13, wherein said fluorocarbon terminal portion in the fluorine-containing mesomorphic compound is represented by the formula $-D^1-C_{xa}F_{2xa}-X$, where xa is 1-20; X is $-H$ or $-F$; $-D^1-$ is $-CO-O-(CH_2)_{ra}-$, $-O-(CH_2)_{ra}-$, $-(CH_2)_{ra}-$, $-O-SO_2-$, $-SO_2-$, $-SO_2-(CH_2)_{ra}-$, $-O-(CH_2)_{ra}-O-(CH_2)_{rb}-$, $-(CH_2)_{ra}-N(C_{pa}H_{2pa+1})-SO_2-$ or $-(CH_2)_{ra}-N(C_{pa}H_{2pa+1})-CO-$ where ra and rb are independently 1-20; and pa is 0-4.

15. A device according to claim 13, wherein said fluorocarbon terminal portion in the fluorine-containing mesomorphic compound is represented by the formula $D^2-(C_{xb}F_{2xb}O-O)_{za}-C_{ya}F_{2ya+1}$, where xb is independently 1-10 for each $(C_{xb}F_{2xb}-O)$ ya is 1-10; za is 1-10; $-D^2-$ is $-CO-O-C_{rc}H_{2rc}-$, $-O-C_{rc}H_{2rc}-$, $-C_{rc}H_{2rc}-$, $-O-(C_{sa}H_{2sa}-O)_{ta}-C_{rd}H_{2rd}-$, $-O-SO_2-$, $-SO_2-$, $-SO_2-C_{rc}H_{2rc}-$, $-C_{rc}H_{2rc}-N(C_{pb}H_{2pb+1})-SO_2-$, $-C_{rc}H_{2rc}-N(C_{pb}H_{2pb+1})-CO-$, or a covalent bond where rc and rd are independently 1-20; sa is independently 1-10 for each $(C_{sa}H_{2sa}-O)$; ta is 1-6; and pb is 0-4.

16. A device according to claim 13, wherein said fluorine-containing mesomorphic compound is represented by the following general formula (I):

Formula (I):

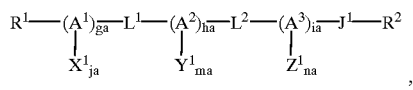

wherein $A^1$, $A^2$ and $A^3$ are each independently

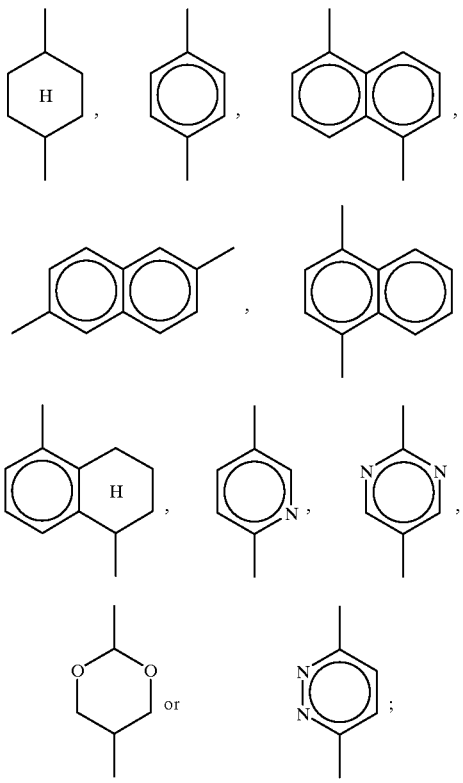

ga, ha and ia are independently an integer of 0–3 with the proviso that the sum of ga+ha+ia be at least 2;

$L^1$ and $L^2$ are independently a covalent bond, $-CO-O-$, $-O-CO-$, $-COS-$, $-S-CO-$, $-CO-Se-$, $-Se-CO-$, $-CO-Te-$, $-Te-CO-$, $-CH_2CH_2-$, $-CH=CH-$, $-C\equiv C-$, $-CH=N-$, $-N=CH-$, $-CH_2O-$, $-O-CH_2-$, $-CO-$ or $-O-$;

$X^1$, $Y^1$ and $Z^1$ are each a substituent of $A^1$, $A^2$ and $A^3$, respectively, and each $X^1$, $Y^1$ and $Z^1$ are independently $-H$, $-Cl$, $-F$, $-Br$, $-I$, $-OH$, $-OCH_3$, $-CH_3$, $-CN$ or $-NO_2$;

each ja, ma and na are independently an integer of 0–4;

$J^1$ is $-CO-O-(CH_2)_{ra}-$, $-O-(CH_2)_{ra}-$, $-(CH_2)_{ra}-$, $-SO_2-$, $-SO_2-(CH_2)_{ra}-$, $-O-(CH_2)_{ra}-O-(CH_2)_{rb}-$, $-(CH_2)_{ra}-N(C_{pa}H_{2pa+1})-SO_2-$ or $-(CH_2)_{ra}-N(C_{pa}H_{2pa+1})-CO-$ where ra and rb are independently 1-20, and pa is 0-4;

$R^1$ is $-O-C_{qa}H_{2qa}-O-C_{qb}H_{2qb+1}$, $-C_{qa}H_{2qa}-O-C_{qb}H_{2qb+1}$, $-C_{qa}H_{2qa}-R^3$, $-O-C_{qa}H_{2qa}-R^3$, $-CO-O-C_{qa}H_{2qa}-R^3$, or $-O-CO-C_{qa}H_{2qa}R^3$ which may be either straight chain or branched where $R^3$ is $-O-CO-C_{qb}H_{2qb+1}$, $-CO-O-C_{qb}H_{2qb+1}$, —H, —Cl, —F, —CF$_3$, —NO$_2$ or —CN; and qa and qb are independently 1–20; and R$^2$ is C$_{xa}$F$_{2xa}$—X, wherein X is —H or —F, xa is an integer of 1–20.

17. A device according to claim 13, wherein said fluorine-containing mesomorphic compound is represented by the general formula (II):

Formula (II):

$$R^4 - (A^4)_{gb} - L^3 - (A^5)_{hb} - L^4 - (A^6)_{ib} - J^2 - R^5$$
$$X^2_{jb} \qquad Y^2_{mb} \qquad Z^2_{nb},$$

where A$^4$, A$^5$ and A$^6$ are each independently denote

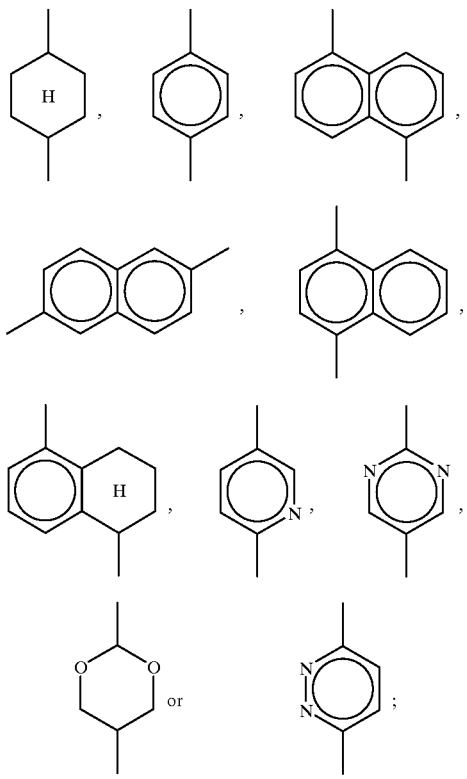

gb, hb and ib are each independently an integer of 0–3 with the proviso that the sum of gb+hb+ib be at least 2;

each L$^3$ and L$^4$ are independently a single bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH═CH—, —C≡C—, —CH═N—, —N═CH—, —CH$_2$—O—, —O—CH$_2$—, —CO— or —O—;

X$^2$, Y$^2$ and Z$^2$ are each a substituent of A$^4$, A$^5$ and A$^6$, respectively, and each X$_2$, Y$_2$ and Z$_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

J$^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO— where rc and rd are independently 1–20; sa is independently 1–10 for each (C$_{sa}$H$_{2sa}$—O), ta is 1–6; pb is 0–4;

R$^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched where R$^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently 1–20; wa is 1–10; and R$^5$ is (C$_{xb}$F$_{2xb}$—O)$_{za}$—C$_{ya}$F$_{2ya+1}$, where xb is independently 1–10 for each (C$_{xb}$F$_{2xb}$—O); ya is 1–10; and za is 1–10.

18. A device according to claim 13, wherein the insulating layer comprises a polymeric material.

19. A device according to claim 18, wherein the polymeric material comprises a ultraviolet-cured resin.

20. A device according to claim 13, wherein the principal electrodes comprise transparent electrodes.

21. A device according to claim 13, the principal electrodes comprise a film of indium tin oxide.

22. A device according to claim 21, wherein said one of the electrode plates further comprises a masking member including a plurality of masking portions disposed on the light-transmissive substrate, each masking portion being disposed so as to correspond to a spacing between associated adjacent principal electrodes.

23. A device according to claim 13, wherein the auxiliary electrodes comprise layer of a metal or an alloy.

24. A device according to claim 13, wherein the auxiliary electrodes contain a metal selected from the group consisting of copper, silver, aluminum, chromium, molybdenum, tantalum and nickel.

25. A process for producing a liquid crystal device according to either of claims 1 or 13, the steps comprising:

forming a plurality of auxiliary electrodes on a light-transmissive substrate, disposing a layer of an ink-receptive resin on the light-transmissive substrate and auxiliary electrodes, coloring the ink-receptive resin layer by means of an ink jet apparatus, removing the ink-receptive resin remaining on the auxiliary electrodes so as to leave color filters comprising the colored ink-receptive resin layer at spacings between the auxiliary electrodes, forming an insulating layer on the color filters, and forming a plurality of principal electrodes on the insulating layer and the auxiliary electrodes so that at least a part of each principal electrode is electrically connected with an associated auxiliary electrode.

26. A process according to claim 25, wherein the removal of the ink-receptive resin is performed by a polishing apparatus.

27. A process according to claim 25, wherein the removal of the ink-receptive resin is performed by scraping off the ink-receptive resin on the auxiliary electrodes with a blade.

28. A process according to claim 27, wherein the blade comprises a doctor blade made of a metal or plastic and provided with a cutting edge.

29. A process according to claim 28, wherein the cutting edge the doctor blade is caused to abut against the surface of the auxiliary electrodes in such a state that the doctor blade is deflected while moving the doctor blade along the surface of the auxiliary electrodes.

30. A process according to claim 25, wherein the step of forming the auxiliary electrodes comprises: forming an electroconductive film on the light-transmissive substrate, applying a photoresist onto the electroconductive film, patterning the photoresist through exposure to light with a photomask and development, and patterning the electroconductive film through etching to provide a plurality of auxiliary electrodes, and the step of forming the color filters comprises: forming the ink-receptive resin layer on the light-transmissive substrate at the spacings between the auxiliary electrodes in such a state that the photoresist remains on the auxiliary electrodes, removing the photoresist together with the ink-receptive resin remaining thereon by using a photoresist remover to expose the surface of auxiliary electrodes, and coloring the ink-receptive resin layer between the auxiliary electrodes by means of the ink jet apparatus.

31. A process according to claim 30, wherein the removal of the photoresist resin is performed before the coloring of the ink receptive resin layer.

32. A process according to claim 30, wherein the removal of the photoresist resin is performed after the coloring of the ink-receptive resin layer.

33. A process according to claim 30, wherein the photoresist comprises a water-repellent photoresist.

34. A process according to claim 33, wherein the water-repellent photoresist has a critical surface tension of at most 45 dyn/cm$^2$.

35. A process according to claim 34, wherein the water-repellent photoresist comprises a compound selected from the group consisting of a compound containing a fluorine atom, a compound containing an organic silane group, and a compound free from a hydroxyl group, an amino group, a carboxyl group and a carbonyl group.

36. A process according to claim 25, wherein the color filters are formed by applying a photosensitive resin onto the light-transmissive substrate and the auxiliary electrodes and exposing the photosensitive resin to light so as to cure the photosensitive resin only at spacings between the auxiliary electrodes without curing a part of the photoresist resin disposed on the surface of auxiliary electrodes.

37. A process according to claim 36, wherein the photosensitive resin disposed only at the spacings between the auxiliary electrodes is cured by irradiating the photosensitive resin with light through the light-transmissive substrate.

38. A process according to claim 25, further comprises the step of forming a masking layer at a position corresponding to spacings between the principal electrodes.

* * * * *

UNITED STATES PATENT AND TRADEMARK OFFICE
CERTIFICATE OF CORRECTION

PATENT NO.     : 6,154,265
DATED          : November 28, 2000
INVENTOR(S)    : Masaru Kamio et al.

It is certified that error appears in the above-identified patent and that said Letters Patent is hereby corrected as shown below:

Title page,
Item [56] References Cited, FOREIGN PATENT DOCUMENTS,

"228740" should read -- 2-28740 --;
"263019" should read -- 2-63019 --;
"2142753" should read -- 2-142753 --;
"619497" should read -- 6-19497 --; and
"6347810" should read -- 6-347810 --.

Column 1,
Line 37, "is" should read -- are --.

Column 3,
Line 13, "represents" should read -- represents --.

Column 7,
Line 49, "ai" should read -- a --.

Column 8,
Line 31, "36b" should read --36a--.

Column 9,
Line 11, "possesses" should read -- possess --;
Line 47, "–O–$C_{rc}H_{2rc}$– –$C_{rc}H_{2rc}$–, should read -- –0–$C_{rc}H_{2rc}$–, –$C_{rc}H_{2rc}$–, --; and
Line 61, " ´COO–," should read -- –C00–, --.

Column 12,
Line 7, "–C–C–," should read -- –C≡C–, --;
Line 17, "–$SO_2$–$C_{rc}H_{2rc}$," should read -- –$SO_2$–$C_{rc}H_{2rc}$–, --; and
Line 21, " ($C_{sa}H_{2sa}$–0) " should read -- ($C_{sa}H_{2sa}$–0), --.

Column 21,
Line I-56, "–$C_7H_{15}$" should read -- –$C_5H_{11}$ --;

UNITED STATES PATENT AND TRADEMARK OFFICE
CERTIFICATE OF CORRECTION

PATENT NO. : 6,154,265
DATED : November 28, 2000
INVENTOR(S) : Masaru Kamio et al.

Page 2 of 4

It is certified that error appears in the above-identified patent and that said Letters Patent is hereby corrected as shown below:

Column 25,
Line I-76, "$C_5F_{11}CH_2-$" should read -- $C_5F_{11}CH_2O-$ --.

Column 28,
Line 50,  should read

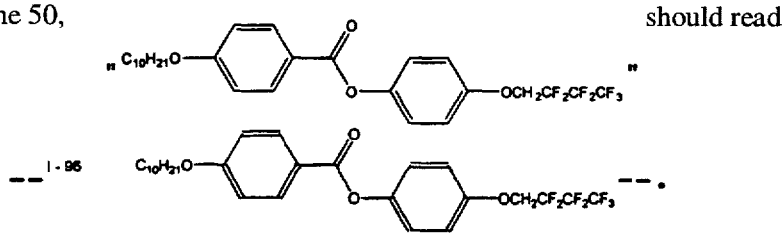

-- I-96 --.

Column 33,
Line II-18, "$C_5H_{11}O-$" should read -- $C_5H_{11}-$ --.

Column 35,
Line II-32, "$-OCH_2C_2F_4OC_8F_{13}$" should read -- $-OCH_2C_2F_4OC_6F_{13}$ --; and
Line II-33, "$-OCH_2C_2F_4OC_6F_{17}$" should read -- $-OCH_2C_2F_4OC_8F_{17}$ --.

Column 40,
Line 3, "electrode" should read -- electrodes --.

Column 41,
Line 45, "is" should read -- are --.

Column 43,
Line 5, "comprises" should read -- comprise --;
Line 10, "this" should read --these--.

Column 46,
Line 38, "an" should read -- and --.

Column 47,
Line 1, "an" should read -- and --;
Line 12, "or" should read -- or in --; and
Line 51, "an" should read -- and --.

UNITED STATES PATENT AND TRADEMARK OFFICE
CERTIFICATE OF CORRECTION

PATENT NO. : 6,154,265
DATED : November 28, 2000
INVENTOR(S) : Masaru Kamio et al.

It is certified that error appears in the above-identified patent and that said Letters Patent is hereby corrected as shown below:

Column 48,
Line 3, "may e" should read -- may be --;
Line 12, "electrode" should read -- electrodes --;
Line 30, "embodiment" should read -- Embodiment --;
Line 51, "polyimideamide,"should read -- polyamide-amide, --

Column 49,
Line 44, "1 Hr" should read -- 1 hour --.

Column 54,
Line 9, "1 Hr" should read -- 1 hour --; and
Line 39, "(exposed surface provided on" should read -- exposed surface provided an --.

Column 57,
Line 2, "1 Hr" should read -- 1 hour --;
Line 47, "photoresist)." should read -- photoresist. --; and
Line 63, "1 Hr" should read -- 1 hour --.

Column 59,
Line 24, "200® C." should read -- 200°C.--; and "Hr" should read -- hour --.

Column 60,
Line 7, "the" (second occurrence) should read -- of the --.

Column 61,
Line 13, "loss" should read -- lose --.

Column 63,
Line 29, "the" (second occurence) should read --of the--.

Column 64,
Line 18 , "$C_{xa}F^{2xa}$" should read -- $C_{xa}F_{2xa}$ --.

Column 66,
Line 1, "denote" should be deleted; and
Line 43, "$X^2$," should read -- $X_2$, --.

UNITED STATES PATENT AND TRADEMARK OFFICE
CERTIFICATE OF CORRECTION

PATENT NO. : 6,154,265
DATED : November 28, 2000
INVENTOR(S) : Masaru Kamio et al.

It is certified that error appears in the above-identified patent and that said Letters Patent is hereby corrected as shown below:

Column 67,
Line 5, "claim 1," should read --claim 1, wherein--;
Line 58, "$D^2-$" should read -- $-D^2-$ --; and
Line 60, "$C_{xb}F_{2xb}-O)ya$" should read -- $(C_{xb}F_{2xb}-O)$ ; ya --.

Column 68,
Line 57, "$-SO_2-$," (first occurrence) should read -- $-O-SO_2-$, -- .

Column 69,
Line 14, "denote" should be deleted.

Column 70,
Line 17, "claim 13," should read -- claim 13, wherein --.

Signed and Sealed this

Twenty-second Day of January, 2002

*Attest:*

JAMES E. ROGAN
*Attesting Officer*    *Director of the United States Patent and Trademark Office*